United States Patent
Santos et al.

(10) Patent No.: US 12,508,598 B2
(45) Date of Patent: Dec. 30, 2025

(54) ROLLER CRUSHER AND METHOD FOR OPERATION THEREOF

(71) Applicant: Metso USA Inc., Brookfield, WI (US)

(72) Inventors: Kristen Santos, Mechanicsburg, PA (US); Nicholas Joseph Mayfield, Monkton, MD (US); Julian Arnold Bublitz, Hillarys (AU); Brandon John Schuerman, York, PA (US); Vadim Reznitchenko, Mechanicsburg, PA (US)

(73) Assignee: METSO USA INC., Brookfield, WI (US)

( * ) Notice: Subject to any disclaimer, the term of this patent is extended or adjusted under 35 U.S.C. 154(b) by 209 days.

(21) Appl. No.: 18/330,532

(22) Filed: Jun. 7, 2023

(65) Prior Publication Data
US 2024/0408608 A1 Dec. 12, 2024

(51) Int. Cl.
*B02C 4/40* (2006.01)
*B02C 4/02* (2006.01)

(52) U.S. Cl.
CPC . *B02C 4/40* (2013.01); *B02C 4/02* (2013.01)

(58) Field of Classification Search
CPC .. B02C 4/28; B02C 4/283; B02C 4/02; B02C 4/30; B02C 4/40
See application file for complete search history.

(56) References Cited

U.S. PATENT DOCUMENTS

| 1,072,195 A | 9/1913 | Townsend |
| 1,092,026 A | 3/1914 | John |
| 1,204,450 A | 11/1916 | Joseph |
| 1,618,942 A | 2/1927 | Brien et al. |

(Continued)

FOREIGN PATENT DOCUMENTS

| AU | 2018264756 A1 | 12/2019 |
| AU | 2018264756 B2 | 9/2021 |

(Continued)

OTHER PUBLICATIONS

Translation of CN-218459658.*

(Continued)

*Primary Examiner* — Bobby Yeonjin Kim
(74) *Attorney, Agent, or Firm* — Andrus Intellectual Property Law, LLP

(57) ABSTRACT

A scraper device for a roller crusher including a rotatable multi head scraper unit having at least two scrapers arranged tangentially about the multi head scraper unit at a radial distance from a rotational axis. The scraper device further includes a rotation actuator to rotate the multi head scraper unit to allow use of one of scrapers at a time. The scraper device further includes at least one brake arrangement to prevent and/or restrict rotation of the multi head scraper unit during operation of the one of the scrapers. Each of the scrapers includes a scraping element having a scraping surface formed from a polycrystalline diamond (PCD). Each scraping surface at least partly faces in a tangential direction defined at the scraper surface and directed along a reference rotational direction of the rotatable multi head scraper unit. A roller crusher including the scraper device and a method for operating the roller crusher is also provided.

26 Claims, 21 Drawing Sheets

(56) References Cited

U.S. PATENT DOCUMENTS

| | | |
|---|---|---|
| 1,963,781 A | 6/1934 | Evans |
| 2,111,535 A | 3/1938 | Miller |
| 2,124,008 A | 7/1938 | Ernst |
| 2,560,837 A | 7/1951 | Alciati et al. |
| 2,969,193 A | 1/1961 | Ball |
| 2,991,019 A | 7/1961 | Highley |
| 3,255,285 A | 6/1966 | Chilson |
| 4,134,673 A | 1/1979 | Fisher |
| 4,173,177 A | 11/1979 | Davis |
| 4,357,287 A | 11/1982 | Schoenert |
| 4,434,522 A | 3/1984 | Linzberger |
| 4,906,335 A | 3/1990 | Goodnow et al. |
| 5,054,701 A | 10/1991 | Durinck |
| 5,257,510 A | 11/1993 | Cox |
| 5,408,720 A | 4/1995 | Miles |
| 5,980,692 A | 11/1999 | Goodnow |
| 9,033,270 B2 | 5/2015 | Vantrease |
| 11,618,034 B2 | 4/2023 | Mark |
| 2012/0199402 A1* | 8/2012 | Rupp ............... E21B 10/46 51/307 |
| 2013/0175379 A1 | 7/2013 | Vantrease |
| 2015/0251222 A1 | 9/2015 | Walling |
| 2023/0126189 A1* | 4/2023 | Reznitchenko ........... B02C 4/40 241/25 |

FOREIGN PATENT DOCUMENTS

| | | |
|---|---|---|
| CL | 69077 | 8/2022 |
| CL | 69078 | 8/2022 |
| CN | 203281336 U | 11/2013 |
| CN | 104607268 A | 5/2015 |
| CN | 106540776 A | 3/2017 |
| CN | 106733110 A | 5/2017 |
| CN | 106975535 A | 7/2017 |
| CN | 108126786 A | 6/2018 |
| CN | 106179585 B | 8/2018 |
| CN | 108855346 A | 11/2018 |
| CN | 109046576 A | 12/2018 |
| CN | 109174284 A | 1/2019 |
| CN | 106881169 B | 8/2019 |
| CN | 210304685 U | 4/2020 |
| CN | 113976221 A | 1/2022 |
| CN | 217140526 U | 8/2022 |
| CN | 217341537 U | 9/2022 |
| CN | 115254297 A | 11/2022 |
| CN | 217856344 U | 11/2022 |
| CN | 218459658 U * | 2/2023 |
| CN | 116889903 A | 10/2023 |
| CN | 117654693 A | 3/2024 |
| DE | 102014104038 A1 | 9/2015 |
| DE | 102017208014 A1 | 11/2018 |
| DE | 102019209514 A1 | 12/2020 |
| EP | 2653229 A1 | 10/2013 |
| EP | 3572153 A1 | 11/2019 |
| JP | 3379672 B2 | 2/2003 |
| WO | 2018206200 A1 | 11/2018 |
| WO | 2020226651 A1 | 11/2020 |
| WO | 2020226653 A1 | 11/2020 |
| WO | 2020260307 A1 | 12/2020 |

OTHER PUBLICATIONS

International Search Report and Written Opinion for International Application No. PCT/US2022/019686 mailed Jul. 14, 2022.
Wire wheel (from 2017); https://www.amazon.com/dp/B08KDFHSVS, website accessed Feb. 16, 2023.
International Search Report and Written Opinion for PCT/US2022/049185, mailed Mar. 21, 2023.
Office action for U.S. Appl. No. 17/197,346, mailed Feb. 27, 2023.
Final office action for U.S. Appl. No. 17/197,346, mailed Sep. 7, 2023.
International Search Report and Written Opinion for PCT/US2024/028301, mailed Jun. 26, 2024.
International Search Report and Written Opinion for International Application No. PCT/US2023/072881, mailed Jan. 9, 2024.
Office action for U.S. Appl. No. 17/546,215, mailed Aug. 31, 2023.
International Search Report and Written Opinion for PCT/US/2024/028297, mailed Jun. 26, 2024.
International Search Report & Written Opinion for International Application No. PCT/ US2024/028301, mailed Jun. 26, 2024.
Office Action and Search Report for Chinese Patent Application No. 202210233929.3, issued Sep. 30, 2024.
Office Action for U.S. Appl. No. 17/940,139, dated Aug. 1, 2024.
Office Action for U.S. Appl. No. 17/940,139, mailed Jul. 8, 2025.
Office Action for U.S. Appl. No. 18/330,529, mailed Jun. 4, 2025.
Office action for Chinese Utility Model Application No. 2024213052592, mailed Apr. 10, 2025.
Search Report and Examiner's Report for Chilean Patent Application No. 202401590, dated Sep. 24, 2025.

* cited by examiner

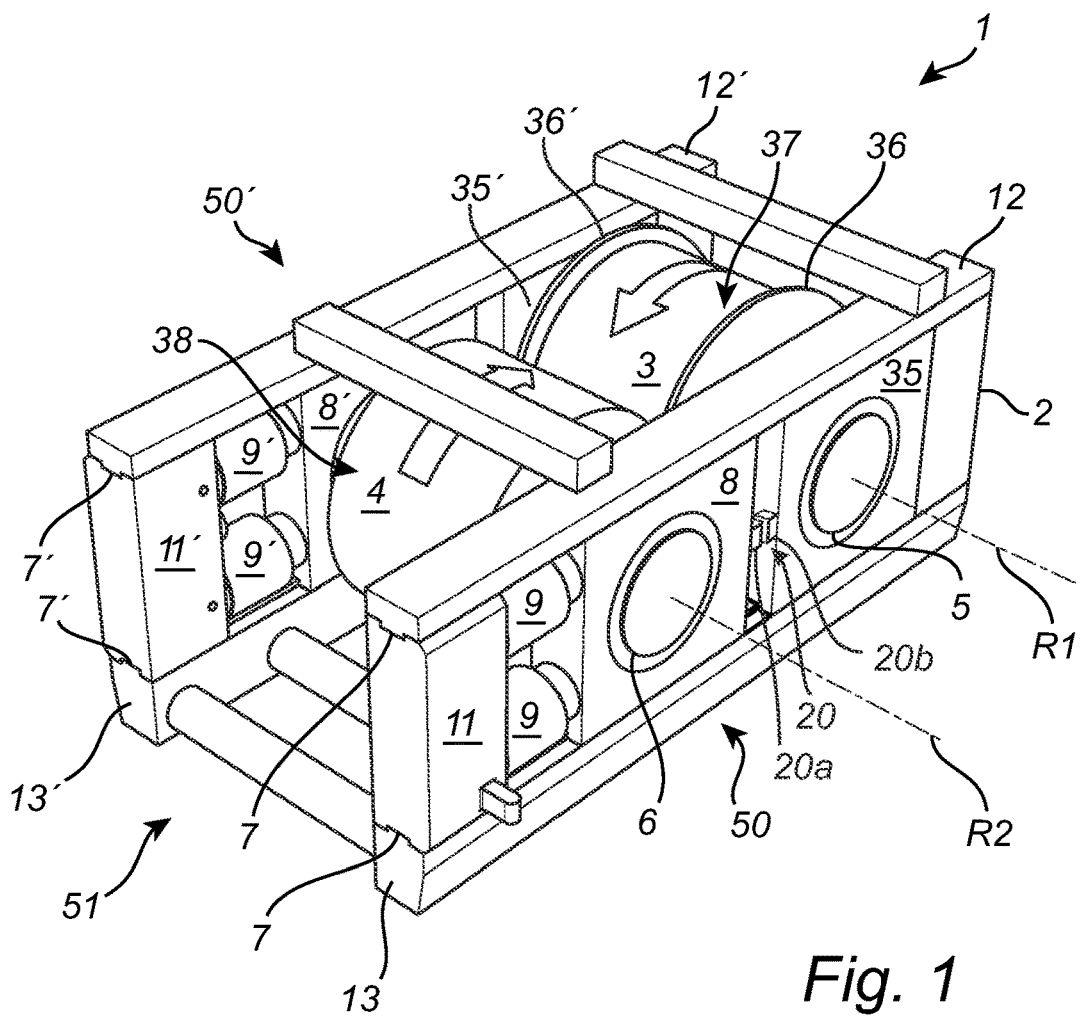
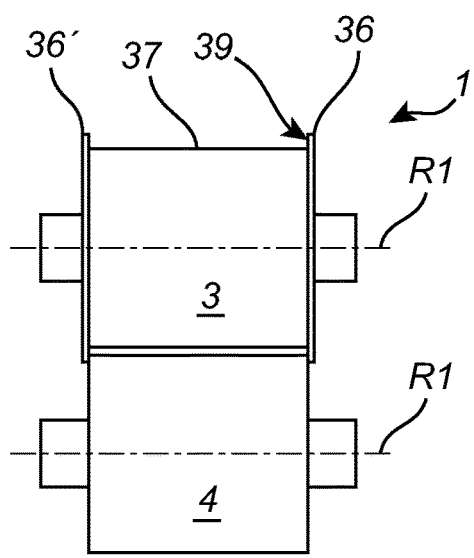
Fig. 2A
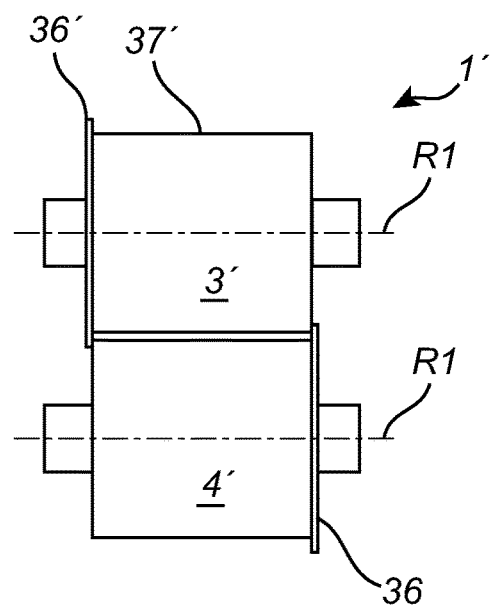
Fig. 2B

ROLLER CRUSHER AND METHOD FOR OPERATION THEREOF

FIELD OF THE INVENTION

The present disclosure relates to a scraper device for a roller crusher, a roller crusher having two generally parallel rollers, wherein the roller crusher comprises a flange attached to at least one of the ends of one of the rollers, and a method for operating the roller crusher.

BACKGROUND

When crushing or grinding rock, ore, cement clinker and other hard materials, roller crushers may be used having two generally parallel rolls which rotate in opposite directions, and which are separated by a gap. The material to be crushed is then fed into the gap. One type of roller crusher is called high pressure grinding rollers or high-pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases may be achieved. This crushing technique is called interparticle crushing. Here, the material to be crushed or pulverized is crushed, not only by the crushing surfaces of the rolls, but also by particles in the material to be crushed, hence the name interparticle crushing. U.S. Pat. No. 4,357,287 specifies that such agglomeration may be achieved by using much higher compression forces then what was previously done. As an example, forces up to 200 kg/cm2 were previously used, whereas the solution in U.S. Pat. No. 4,357,287 suggests to use forces of at least 500 kg/cm2 and up to 1500 kg/cm2. In a roller crusher having a roller diameter of 1 meter, 1500 kg/cm2 would translate into a force of more than 200000 kg per meter length of the rollers whereas previously known solutions could, and should, only achieve a fraction of these forces. Another property of the interparticle crushing is that a roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained.

Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In order to maintain crushing effect all along the length of the grinding rollers, flanges may be arranged to ends of the crushing rolls; one flange at each end of one roll, or one flange at one end of each roll, but on opposite ends of the roller crusher. With such an arrangement, it is possible to create a more efficient and uniform roll feed entry. The flanges will allow for material being fed such that a preferred material pressure is created over the entire length of the crusher rolls. It has been shown that it is possible to increase capacity of a given roller crusher with up to 20%, or sometimes even more, by using flanges. A general problem associated with grinding rollers without flanges is that the ratio between the roller diameter and the roller width is very important due to a significant edge effect, i.e. the crushing result is reduced at the edges of the rollers. This is because of the fact that material may escape over the edges of the rollers thereby reducing the crushing pressure on the material towards the gap at the edges of the rollers. Without flanges, it is thus necessary to recycle both material escaping the rolls and some of the material having passed the gap at the edges of the crusher rolls due to a lower pressure resulting in reduced breakage at the edges.

However, during operation of a grinding crusher with flanges, the flanges and also edges of opposite crusher roller is under a lot of stress and wear, and build-up material will gather in the transition between the crusher roller surface and the flange. Such excessive build-up material needs to be removed consistently during operation of the grinding crusher.

Prior art has suggested a scraper element for removing build-up material in the transition between the crusher roller surface and the flange, see for example AU2018264756 or U.S. Pat. No. 5,054,701.

Proceeding therefrom, it is an object of the present disclosure to provide a scraper device, and a roller crusher comprising such scraper device with reduced maintenance time. A further object of the present disclosure is to provide a scraper device, and a roller crusher comprising such scraper device, with a simplified procedure for scraper replacement.

SUMMARY

According to a first aspect of the disclosure, this and other objects are achieved, in full or at least in part, by a scraper device for a roller crusher, which scraper device comprises a rotatable multi head scraper unit having at least two scrapers arranged tangentially about the rotatable multi head scraper unit at a respective radial distance from a rotational axis of the rotatable multi head scraper unit. The scraper device further comprises a rotation actuator arranged to selectively rotate the rotatable multi head scraper unit to allow operative use of one of the at least two scrapers at a time, and at least one brake arrangement configured to prevent and/or restrict rotation of the rotatable multi head scraper unit during operation of the one of the at least two scrapers. Each of the at least two scrapers comprises a scraping element having a scraping surface which scraping surface comprises a polycrystalline diamond (PCD), and the rotatable multi head scraper unit is structured and arranged such that each scraping surface at least partly faces in a tangential direction defined from the scraper surface and directed along a reference rotational direction of the rotatable multi head scraper unit.

With the phrase "each scraping surface at least partly faces in a tangential direction defined from the scraper surface and directed along a reference rotational direction of the rotatable multi head scraper unit" it is meant that the scraping surface has a projection in a plane orthogonal to said tangential direction which projection is larger than zero. As readily appreciated by the person skilled in the art, this achieves the effect that when the scraper device is arranged on a roller crusher, the scraping surface of the active scraper may be arranged such that it at least partially faces the material to be removed. Since each scraper surface is arranged generally in the same manner along the reference rotational direction, each of the scraping surfaces may at least partly act as an impact surface when the scraper having said each scraping surface is the active scraper. The scraping surface may be planar, or non-planar. If the scraping surface is planar, its normal may be parallel or substantially parallel with the tangential direction. However, if the scraping surface is planar, its normal may alternatively form an acute angle with the tangential direction. As readily appreciated by the person skilled in the art, both these alternatives achieve a non-zero projection in the plane being orthogonal to the tangential direction, and both these alternatives achieves the effect that when the scraper device is arranged on a roller crusher, the scraping surface of the active scraper may be arranged such that it at least partially faces the material to be removed. The reference rotational direction should be construed as a reference only. Thus, even if the rotatable multi head scraper unit may be rotated along the reference rotational direction in order to replace a worn-out scraper to a new scraper as the active scraper, it is equally conceivable that the rotatable multi head scraper unit may be rotated counter to the reference rotational direction in order to replace a worn-out scraper to a new scraper as the active scraper.

A first advantage of having scraping surfaces comprising a polycrystalline diamond (PCD) is that the wear life of the scraper is considerably prolonged. Normally such scraping surfaces would comprise wear resistant material such as ceramic or composite materials comprising Tungsten carbide, Titanium carbide, or Vanadium carbide, but with a scraping surface comprising polycrystalline diamond (PCD), the wear life may be prolonged with up to about 50 times in comparison with only comprising e-g- a composite material comprising Tungsten carbide.

It is conceivable to provide further surfaces of the scraper element with a polycrystalline diamond (PCD). For example, side surfaces of the scraper element may comprise a polycrystalline diamond (PCD). Termed in an alternative way, the scraping surface may extend to encompass also side surfaces of the scraper element. Thus, it should be understood that the current inventive concept should not be construed as limited to scrapers only having a frontward facing surface comprising a polycrystalline diamond (PCD).

According to one embodiment, the scraping element further comprises a wear resistant material in which the polycrystalline diamond (PCD) is at least partly embedded.

The polycrystalline diamond (PCD) may in an alternative embodiment be attached to a surface of a wear resistant material of the scraper.

The wear resistant material may comprise a ceramic material, such as Titanium carbide, Vanadium carbide or Tungsten carbide; a metal ceramic composite material, such as cemented carbides, e.g. Titanium carbide, Tungsten carbide or Vanadium carbide with cobalt as a binder; or a metal matrix composite material comprising Titanium carbide, Tungsten carbide or Vanadium carbide.

In one embodiment, the wear resistant material is a cemented carbide comprising Tungsten carbide and, as a binder, cobalt in which the binder content may be 10-15 wt %.

In one embodiment, the polycrystalline diamond (PCD) is embedded in Tungsten carbide, Vanadium carbide, or Titanium carbide.

According to one embodiment, the scraping surface of the scraper element may comprise a layer of polycrystalline diamond (PCD). The layer of polycrystalline diamond (PCD) may have a thickness of 0.4 to 3.2 mm, or 1.0 to 2.0 mm, or 1.35 to 1.8 mm, or 1.4 to 1.6 mm, or about 1.5 mm.

According to one embodiment, the scraping surface of the scraper element may comprise two or more layers of polycrystalline diamond (PCD). The two or more layers may be attached to each other e.g. by an adhesive. The number of layers and/or the thickness of individual layers may depend on grain size and/or the application for which it is used.

The diamond grain size of the polycrystalline diamond (PCD) of the impact surface may be 0.8 to 30 µm, as determined by image analysis using a Scanning Electron Microscope (SEM).

The grain size of diamond may be measured by various measurement techniques, such as laser size analysers or by scanning electronic microscopes (SEM). One example of a laser size analyser is a Malvern Particle size analyser equipment which is based on laser diffraction. The values determined using the laser size analyser may be the initial diamond grain size that for some embodiments may later be subjected to High Pressure High Temperature Sintering. When the diamond particles have been sintered and compacted to form the polycrystalline diamond (PCD) of the impact surface, an image analysis by means of scanning electron microscopy is used to determine the end microstructural grain size distribution, i.e. the diamond grain size of the polycrystalline diamond (PCD) of the impact surface.

One advantage of the scraper device disclosed is that such an arrangement enables a compact scraper arrangement, which reduces required space for assembling to a roller crusher. Another advantage is that it reduces maintenance time for exchange of a worn scraper, wherein a non-used, new scraper on the rotatable multi head scraper unit may be repositioned into operation position simply by rotating the rotatable multi head scraper unit, instead of having to perform a complete shutdown of the roller crusher for an exchange of scraper. A further advantage of the scraper device is that it allows for an easier replacement procedure once the scrapers needs to be replaced. The rotatable multi-head scraper unit may be prefabricated and pre-assembled, and the replacement procedure may therefore be limited to removing the old rotatable multi-head scraper unit, and attaching a new one in its place, thus effectively replacing two or more individual scrapers in one replacement operation.

A yet further advantage is that the rotatable multi-head scraper unit allows for a completely automated scraper exchange procedure. In contrast to prior art solutions, the rotation actuator may be actuated by a drive unit, such as e.g. an electrical motor, which drive unit may be controlled by a control system. Thus, the scraper device of the inventive concept allows for exchanging worn scrapers without manual intervention from an operator.

A yet further advantage of the scraper device is that the rotatable multi-head scraper unit allows for adjusting a distance between the scraper which performs a scraping operation, herein termed "operating scraper", and the envelope surface of the roller by adjusting the angular position of the rotatable multi-head scraper unit. This built-in adjustment ability of the scraper device may allow adjusting the thickness of the build-up material allowed to remain on the envelope surface of the roller. It may also remove the need to mount all scrapers to the rotatable multi head scraper to have exactly the same radial distance from the rotational axis. Furthermore, it may allow compensating for scraper wear, as will be detailed later.

The term "brake arrangement" as used herein should be construed broadly. The term is used here to represent any arrangement structured and arranged to prevent and/or restrict rotation of the rotatable multi head scraper unit during operation of the one of the at least two scrapers. The term "brake arrangement" therefore naturally encompasses typical brake systems such as friction brakes and clutches. However, the term "brake arrangement" must also be interpreted to encompass mechanical systems such as e.g. gear trains and any other mechanical linkage which, independent on if they are intended to perform additional tasks in the device, additionally are structured and arranged to prevent and/or restrict rotation of the rotatable multi head scraper unit during operation of the one of the at least two scrapers. A "brake arrangement" may be configured to prevent and/or restrict rotation of the rotatable multi head scraper unit to different degree. Some brake arrangements of the inventive concept may be configured to provide a counteracting moment on the rotatable multi head scraper unit which is strong enough to prevent an unwanted rotation thereof during normal operation, but still selected so as to allow the rotatable multi head scraper unit to rotate in a case where excessive material build-up impacts a scraper of the rotatable multi head scraper unit. This may be advantageous as it provides a means for the rotatable multi head scraper unit to be released from the operating position in a case where the impact force would be high enough to cause damage to the scraper device. That said, it is also conceivable that a "brake arrangement" of the inventive concept is configured to lock, by a locking engagement, the rotatable multi head scraper unit in the operating position thereof.

As readily appreciated by the person skilled in the art, the rotation of the rotatable multi head scraper unit is provided for repositioning the individual scrapers of the rotatable multi head scraper unit with respect to the roller surface. This implies that no rotation of the rotatable multi head scraper unit is performed during scraping operation. In other words, the scraper device is configured to prevent and/or restrict the rotatable multi head scraper unit from rotating so as to be stationary with respect to the roller crusher during crushing operation.

According to one embodiment, the rotatable multi head scraper unit is arranged at a first end of the scraper device, and the rotation actuator is arranged at a second, opposite, end of the scraper device, and wherein the rotatable multi head scraper unit extends in a reference plane which is orthogonal to the rotational axis.

According to one embodiment, each of the at least two scrapers has a surface facing the rotation actuator, which surface comprises a polycrystalline diamond (PCD). Alike with the polycrystalline diamond (PCD) on the scraping surface, also on this surface facing the rotation actuator, the polycrystalline diamond (PCD) may be at least partially embedded in a wear resistant material, as defined above.

According to one embodiment, each scraping surface of the at least two scrapers is arranged to incline in a relation to a normal of the reference plane, as defined in front of the scraping surface, and incline such that a distance between the normal and the scraping surface decreases towards the rotation actuator. An advantage of a scraping surface with such an arrangement is that, upon arranging and operating the scraper device in a roller crusher, the material removed from the position in the corner formed by the outer surface of the roller and an inner surface of the flange will be prone to flow along this surface facing the flange, and as the distance is increasing away from and downstream of the scraping surface, the removed material will be allowed to be removed towards the center of the roller instead of being squeezed and compacted between the scraper and the inner surface of the flange. The normal is defined as a line which is orthogonal to the reference plane.

According to one embodiment, the scraping surface may be substantially planar. Therefore, the varying distance as described hereinabove may, according to this embodiment, be further expressed in terms of an angle $\alpha$ defined between the scraping surface and the normal of the reference plane, wherein the angle $\alpha$ is defined within a tangential plane of the scraper which is orthogonal to the reference plane. This angle $\alpha$ may be 1 to 15°, or 2 to 10°, or 3 to 8°, or 4 to 6°, or 5°.

With "tangential plane of the scraper" is herein meant a plane which is parallel with the tangential direction of the scraper, as defined at the scraper surface and directed along a reference rotational direction of the rotatable multi head scraper unit, and which plane is orthogonal to the reference plane. Thus, each scraper of the at least two scrapers have an associated tangential plane, which are all angled with respect of each other as a result from the scrapers being arranged tangentially about the rotatable multi head scraper unit.

According to one embodiment, each of the at least two scrapers has a surface facing the rotation actuator, which surface has an extension from the scraping element tangentially towards a rear end thereof, wherein the scraper is structured and arranged such that a distance between the surface facing the rotation actuator and the rotation actuator decreases towards the scraping element over at least a part of the extension. With the expression, "which surface has an extension from its scraping element tangentially towards a rear end thereof", it is meant that the scraper has an extension on a back side of the scraper element. When the scraper device is arranged on a roller crusher, the surface facing the rotation actuator will thus, for the active scraper, be located downstream of the scraping surface. Thus, the "extension [ . . . ] tangentially"-phrasing should be construed broadly and be read to encompass any surface which has an extension, or dimension, which is substantially parallel with a tangential direction at the position of the scraper element. This extension does not have to be the main extension of the scraper, as will be further described in the enabling disclosure. An advantage with providing a surface facing the rotation actuator with such an arrangement is that, upon arranging and operating the scraper device in a roller crusher, the material removed from the position in the corner formed by the outer surface of the roller and the inner surface of the flange will be allowed to easily be removed when the distance between the inner surface of the flange and the rotatable multi head scraper unit increases away from the scraping surface and towards a rear end thereof, and flow towards the centre of the roller instead of being squeezed and compacted between the rotatable multi head scraper unit and the inner surface of the flange.

According to one embodiment, the surface facing the rotation actuator is substantially planar. Therefore, the varying distance as described hereinabove may, according to this embodiment, be further expressed in terms of an angle $\beta$ defined between the surface facing the rotation actuator and the reference plane, wherein the angle $\beta$ is defined within a tangential plane of the scraper which is orthogonal to the reference plane. The angle $\beta$ may be 1 to 45°, 1 to 40°, 1 to 30°, 5 to 25°, or 5 to 20°, or 5 to 15°, or 8 to 12°, or 10°.

According to one embodiment, each of the at least two scrapers has a surface facing away from the rotation actuator, which surface has an extension from its scraping element tangentially towards a rear end thereof, wherein the scraper is structured and arranged such that a distance between the surface facing away from the rotation actuator and the rotation actuator decreases towards the scraping element over at least a part of the extension. On the at least two scrapers, the surface facing away from the rotating actuator is opposite to the surface facing the rotating actuator. As readily appreciated by the person skilled in the art, a distance defined between a surface facing away from the rotation actuator and the rotation actuator itself must inevitably be defined as going through the scraper which presents said surface. In the context of defining the distance, the term "surface" should thus be construed as a mathematical or geometrical surface. Again, upon arranging and operating the scraper device in a roller crusher, the scraper provides a surface which will urge the removed material to be moved towards the centre of the roller, which is beneficial.

According to one embodiment, the surface facing away from the rotation actuator includes a surface which is substantially planar. Therefore, the varying distance as described hereinabove may, for this embodiment, be further expressed in terms of an angle $\gamma$ defined between the surface which faces away from the rotation actuator and the reference plane, wherein the angle $\gamma$ is defined within a tangential plane of the scraper which is orthogonal to the reference plane. The angle $\gamma$ may be 1 to 45°, or 1 to 40°, or 1 to 30°, or 5 to 45°, or 5 to 25°, or 5 to 20°, or 5 to 15°, or 8 to 12°, or 10°. Although preferably angled such that the distance between the surface facing away from the rotation actuator and the rotation actuator decreases towards the scraping surface over at least a part of the extension, it is also conceivable to provide a scraper having a surface facing away from the rotation actuator arranged such that the distance between said surface facing away from the rotation actuator and the rotation actuator increases towards the scraping surface over at least a part of the extension. As readily appreciated by the person skilled in the art, this will for a substantially planar surface be defined using negative angles $\gamma$ using the above definition. For such embodiments, the angle $\gamma$ may hence be −1 to −45°, or −1 to −40°, or −1 to −30°, or −5 to −25°, or −5 to −20°, or −5 to −15°, or −8 to −12°, or −10°.

According to one embodiment, the at least two scrapers are arranged to form axial protrusions on one or both sides of the rotatable multi head scraper unit. Phrased in a different way, the at least two scrapers are arranged such that they axially protrude outside one or both axial end(s) of the remaining part of the rotatable multi head scraper unit. Thus, when the scraper device is arranged in a roller crusher and the at least two scrapers have an axial protrusion towards the flange, then the distance between the active scraper and the flange is narrower than the distance between the remaining part of the rotatable multihead scraper unit and the flange. An advantage with this is that, upon arranging and operating the scraper device in a roller crusher, the material removed will, as soon as it has flown past along the surface of the scraper facing the flange, easily be removed via the wider gap between the inner surface of the flange and the remaining part of the rotatable multi head scraper unit, and flow towards the centre of the roller instead of being squeezed and compacted between the rotatable multi head scraper unit and the inner surface of the flange.

According to one embodiment, the axial protrusions have axial extensions within the range up to 75 mm, or 5 to 50 mm, or 10 to 40 mm. Although the above disclosed ranges are currently preferred, it is contemplated that axial extensions could also be larger than 75 mm. The axial extension may depend on the roller crusher, the operating conditions and the material to be crushed etc. Thus, the axial extension must be chosen based on parameters such as, but not limited to, the crushing gap, the size of the crushing rolls, and the size of the build-up material to be removed. A bigger material build-up may require a bigger axial extension.

According to one embodiment, each scraper of the at least two scrapers extends in the reference plane along a scraper axis towards the scraping element, and wherein the scraper axis forms a first acute angle along a reference rotational direction with a radial axis of the rotatable multi head scraper unit which radial axis intersects with the scraping element. An advantage with this is that the forces acting upon the scraping element will become substantially aligned with the scraping element axis during operation and will more likely be absorbed in the direction of the scraping element axis, which is well supported and attached by the rotatable multi head scraper unit.

According to one embodiment, each scraping surface of the at least two scrapers extends in a plane which has a normal which forms an acute angle along the reference direction with the scraper axis. Again, an advantage with this is that the forces acting upon the scraping element become even more substantially aligned with the scraper axis during operation and will more likely be absorbed in the direction of the scraper axis, which is well supported and attached by the rotatable multi head scraper unit.

According to one embodiment, each of the at least two scrapers has a surface facing away from the rotation actuator and a surface facing the rotation actuator, and wherein at least one of the surface facing away from the rotation actuator and the surface facing the rotation actuator comprises ceramic inserts. Arranging ceramic inserts on these surfaces will prolong the wear life of the at least two scrapers.

According to one embodiment, the rotatable multi head scraper unit has an annular engagement portion and wherein each scraper of the at least two scrapers is releasably arranged to the annular engagement portion. The term "annular engagement portion" should be construed as an annularly shaped part of a structure, which could consist of one element or an assembly of elements, which forms an outer periphery onto which the at least two scrapers can be releasably arranged. The annular engagement portion could e.g. be the peripheral annular portion of a rotatable disc. The provision of releasable scrapers may be advantageous as it allows selectively replacing individual scrapers. Thus, if e.g. one scraper is damaged, remaining scrapers may be left untouched and replacement only undertaken for the damaged element.

According to one embodiment, the rotatable multi head scraper unit further comprises a main support structure and at least two scraper support structures, wherein the at least two scraper support structures are releasably arranged with respect to the main support structure and shaped as circular ring sectors which together form a circular ring, and which circular ring presents the annular engagement portion. In principle, the rotatable multi head scraper unit may comprise any number of scraper support structures. Thus, it is also conceivable to provide a single scraper support structure. However, the provision of at least two scraper support structures has the advantage that it allows mounting on a main support structure which is rotatable arranged on a through-going shaft. The at least two scraper support structures may have the same dimensions. Thus, for an embodiment having two scraper support structures, each of the scraper support structures may constitute a 180 degree circular ring sector. Alternatively, for an embodiment having three scraper support structures, each of the scraper support structures may constitute a 120 degree circular ring sector.

Alternatively, for an embodiment having four scraper support structures, each of the scraper support structures may constitute a 90 degree circular ring sector. It is also conceivable that the two or more scraper support structures have different dimensions. Every embodiment will however have one thing in common: The at least two scraper support structures will together form a circular ring, and the circular ring will present the annular engagement portion. These example embodiments may be advantageous as they provide a modularity to the design, hence facilitating easier and faster maintenance. By the provision of the at least two scraper support structures, a complete module including several scrapers may be removed from the scraper device in a single operation. This may also improve the speed and reliability when replacing scrapers on a scraper device, since every scraper may be replaced by replacing only the at least two scraper support structures.

According to one embodiment, each scraper of the at least two scrapers is releasably arranged in the annular engagement portion by a geometrical locking engagement. This may be advantageous as it allows making the construction impact resistant. During operation, the scraper in operation will repeatedly make impact with material build-up on the roller having a flange, which will result in a torsional load on in the connection region between the scraper and the annular engagement portion. By the provision of a locking engagement, this load may be at least partly absorbed by the structures themselves, hence reducing load on fasteners, such as e.g. bolts, screws and nuts, which are typically used to provide said releasable arrangement of the scrapers to the annular engagement portion. The geometrical locking engagement may be embodied in different ways as will be detailed hereinbelow.

According to one embodiment, the geometrical locking engagement is at least partly defined by a protruding structure of the scraper being inserted into an associated recess of the annular engagement portion, wherein the protruding structure and the associated recess has complementary shapes.

This is regarded as a preferred way of providing the locking engagement. It is achieved by the provision of complementary shapes on the at least two scrapers and the annular engagement portion, respectively. Such complementary shapes may be a protrusion that locks, by its mere shape, to a recess when inserted therein. A simple example may be a rod protruding into a bore. One conceivable way of providing a locking engagement could be to provide a plurality of bores directed radially inwardly on the periphery of the annular engagement portion and allow the scrapers protruding into these bores. They may then be secured to the annular engagement portion by bolting. As readily appreciated by the person skilled in the art, the bolts will not absorb a majority of the torsional loads, which will instead be absorbed by the bore-protrusion arrangement having the complementary shapes.

According to one embodiment, the associated recess of the annular engagement portion is defined on a side surface thereof. This may be advantageous as it allows easier replacement. The provision of the recesses on a side surface of the annular engagement portion may reduce the risk of jam between the annular engagement portion and the scrapers as a result from dust and contamination entering into the recesses.

According to one embodiment, each scraper of the at least two scrapers comprises a scraper main body, and wherein the protruding structure forms a part of the scraper main body. This may be advantageous as it allows an even more modular system. The dedicated scraper, termed herein as "active scraper" allows for individual replacement without having to replace the rest of the scraper (i.e. the scraper main body). However, during replacement, it is conceivably easier to replace the whole scraper to a new one, including thus both the active scraper and the scraper support structure. Once a scraper has been removed, it may however be taken to a workshop or other dedicated facility, at which the worn-out active scraper can be replaced by a new one on the scraper main body. Thus, the same scraper main body may be used many times.

According to one embodiment, the scraper device further comprising wear shields structured and arranged to protect at least parts of the rotatable multi head scraper unit. The wear shields may be advantageous as they allow protecting the rotatable multi head unit from the harsh environment in which it is intended to operate. During crusher operation in general, and in particular during removal of build-up material from the roller with a flange, there will be a high density of high-velocity stone, sand and dust constantly impinging on surfaces of the rotatable multi head scraper unit, hence increasing the risk of wear on the parts, as well as damage due to penetration into cavities and gaps, which may also increase the complexity of maintenance and replacement.

According to an embodiment of the scraper device, the rotatable multi head scraper unit is releasably arranged in the scraper device, to allow exchange of the rotatable multi head scraper unit. Such an exchange of the rotatable multi head scraper unit may for example be performed when all of the at least two scrapers have been worn down.

According to an embodiment of the scraper device, the rotatable multi head scraper unit comprises at least three, or at least four, or at least five scrapers arranged tangentially about the rotatable multi head scraper unit at a respective radial distance from the rotational axis. As readily appreciated by the person skilled in the art, a larger number of scrapers on the rotatable multi head scraper unit will prolong the operation time of the scraper device before having to replace the rotatable multi head scraper unit after all scrapers having been worn down. The maximum number of scrapers arranged on the rotatable multi head scraper unit depends on a radial extension of the rotatable multi head scraper unit. Thus, the larger radial extension of the rotatable multi head scraper, the larger number of scrapers may be arranged on the rotatable multi head scraper unit. The size thereof is design in relation to the roller crusher to which is intended to be used in and the available space at the end of a roller having a flange.

According to an embodiment of the scraper device, a first-in-line scraper and a last-in-line scraper are positioned such that these are separated with an angle of at least 120 degree upstream of the first-in-line scraper.

The phrasing "first-in-line scraper" means the scraper which is arranged on the rotatable multi head scraper unit to be used first of the at least two scrapers in operation when a scraper device has been installed into the roller crusher, or when a new rotatable multi head scraper unit has been arranged on the scraper device. It should be understood that the term is not necessarily used to distinguish a particular scraper of the at least two scrapers on a rotatable multi head scraper unit. The first-in-line scraper may be any one of the at least two scrapers. Instead, the first-in-line scraper will be the one scraper which is first out to perform scraping operation. For some embodiments of the rotatable multi head scraper unit, the at least two scrapers may be positioned such that one scraper will be a natural first-in-line scraper. This is applicable for rotatable multi head scraper units where the at least two scrapers are non-uniformly distributed over the rotatable multi head scraper unit.

The phrasing "last-in-line scraper" means the scraper which is arranged on the rotatable multi head scraper unit to be used last of the at least two scrapers in operation when a scraper device has been installed into the roller crusher, or when a new rotatable multi head scraper unit has been arranged on the scraper device. Thus, the second-in-line scraper is a last-in-line scraper when two scrapers are arranged on the rotatable multi head scraper unit, or the third-in-line scraper is the last-in-line scraper when three scrapers are arranged on the rotatable multi head scraper unit, or the fourth-in-line scraper is the last-in-line scraper when four scrapers are arranged on the rotatable multi head scraper unit, and so forth.

The phrasing "upstream of the first-in-line scraper" means an area in front of a scraping surface of the first-in-line scraper, which scraping surface will encounter any build-up material when a roller of the roller crusher rotates during operation of the roller crusher. Thus, the "stream" in this case would correspond to the build-up material at the flange which typically extends annularly around the roller surface of the roller at the flange and which therefore, often continuously, impinges as a "stream" of material on the scraper surface during crushing operation. However, as readily appreciated by the person skilled in the art, the term "upstream" is used here to define a direction only, and the wording should therefore not be construed as limiting the material distribution at the flange in any particular way.

One advantage with such an arrangement is that any build-up material being scraped off by the first-in-line scraper will have little or no impact with a backside surface of the last-in-line scraper. This may be beneficial as it reduces the wear of the scrapers and hence prolongs the life of the scraper device.

According to one embodiment of the scraper device, a wear protective liner is arranged on a backside surface of the last-in-line scraper.

One advantage with such an arrangement is that should any build-up material being scraped off by the first-in-line scraper have impact on a backside surface of the last-in-line scraper, such a wear protective liner will protect the last-in-line scraper from being damaged before being used during operation.

According to one embodiment of the scraper device, the first-in-line scraper and the last-in-line scraper are positioned such that these are separated with an angle of at least 140 degree upstream of the first-in-line scraper.

According to one embodiment of the scraper device, the first-in-line scraper and the last-in-line scraper are positioned such that these are separated with an angle of at least 160 degree upstream of the first-in-line scraper.

According to one embodiment of the scraper device, the first-in-line scraper and the last-in-line scraper are positioned such that these are separated with an angle of at least 180 degree upstream of the first-in-line scraper.

One advantage with such an arrangement is that the scraper device may be arranged in relation to the roller crusher such that build-up material being scraped off by the first-in-line scraper will have no or low impact on a backside surface of the last-in-line scraper as the build-up material being scraped off will pass the rotatable multi head scraper unit at an area where no scrapers are arranged tangentially at radial distance from the rotational axis of the rotatable multi head scraper unit. Further, when the first-in-line scraper has been worn out, a second-in-line scraper will be rotated in position for operation. In operation of the second-in-line scraper build-up material being scraped off will have an impact on a backside surface of a first-in-line scraper, but as it has already worn out, it will need to be replaced anyhow, so it does not matter that a backside surface thereof is worn when a second-in-line scraper is in operation. Further, when a second-in-line scraper has been worn out, a possible third-in-line scraper will be rotated in position for operation. In operation of the possible third-in-line scraper, build-up material being scraped off will have an impact on a backside surface of the second-in-line scraper, but as it has already been worn out, it will need to be replaced anyhow, so it does not matter that a backside surface thereof is worn when a possible third-in-line scraper is in operation. The same is true for a possible fourth-in-line or a possible fifth-in-line scraper should these number of scrapers be arranged on the rotatable multi head scraper unit as the at least two scrapers.

Typically, the at least two scrapers are arranged at the same radial distance from a rotational axis of the rotatable multi head scraper unit. In other words, the respective radial distances may be equal to each other. However, it is also conceivable that at least one scraper of the at least two scrapers is arranged at a radial distance different from the radial distance at which the other one(s) of the at least two scrapers are arranged. It is also conceivable that the at least two scrapers are arranged at mutually different radial distances from the rotational axis of the rotatable multi head scraper unit.

The purpose of providing different distances may be to allow a convenient way of selecting the degree of scraping. For example, there may be situations where build-up material may be tolerated to a higher degree than in other situations. This may for example be when the roller crusher is operated with a relatively large crushing gap. In such situations, the rotatable multi head scraper unit may be rotated to exchange a scraper being located close to the roller with another scraper located further away from the roller.

According to one embodiment, the scraper device may further comprise a shaft member having a first and a second end and being rotatably arranged, wherein the rotatable multi head scraper unit is attached at the first end of the shaft member, and wherein the rotation actuator is arranged at the second end of the shaft member.

This may be advantageous as it allows controlling the rotatable multi head scraper unit from a distance. This may be especially beneficial on a roller crusher where the rotatable multi head scraper unit must be disposed at a flange region of a roller, a region which is not always easily accessible from the outside. The shaft member may for example be arranged to protrude through a wall or structure of the roller crusher such that the rotatable multi head scraper unit is disposed on a first side of the wall/structure, and the rotation actuator is arranged on the other side of the wall/structure.

The rotatable multi head scraper unit may be releasably attached to the shaft member. This may be achieved in many alternative ways. For example, the rotatable multi head scraper unit may be releasably attached to the shaft member by means of a releasable fastening device such as e.g. a flange connection or a bushing. The bushing may be e.g. a tapered bushing, an XT bushing, or a QD bushing.

According to one embodiment, the scraper device further comprises a support arrangement arranged to at least partially encircle the shaft member and further arranged to be connected to a frame of the roller crusher. This implies that the rotatable multi head scraper unit may be supported by the shaft member which in turn is supported by the support arrangement. This may be advantageous as it allows replacing the rotatable multi head scraper unit without having to interact with the support arrangement.

As readily appreciated by the person skilled in the art, it is not essential that the support arrangement completely encircles the shaft member. As a non-limiting example only, the shaft member may be supported by two concave elements which engages the shaft member from opposite directions.

According to one embodiment, a first brake arrangement of the at least one brake arrangement is supported by the support arrangement, and wherein the first brake arrangement comprises a friction element configured to selectively engage the shaft member, or an engagement element attached thereto, to thereby prevent and/or restrict a rotation of the rotatable multi head scraper unit.

The friction element may be elastomeric. The friction element may be made from rubber or polyurethane. Alternatively, the friction element may be attached to a further element which is elastomeric. The further element may be made from rubber or polyurethane. The use of an elastomeric element may be advantageous as it allows providing a more uniform pressure exertion on the shaft member or the engagement element in response to the elastomeric element being exposed to an external force.

According to one embodiment, the friction element is elastomeric or is attached to a supporting element which is elastomeric, and wherein the first brake arrangement further comprises a supporting structure structured and arranged to at least partially enclose the friction element or the supporting element.

This may be advantageous as it allows initiating an engagement with the shaft member or the engagement element by exposing the elastomeric friction element or elastomeric supporting element to a compression force having an arbitrary direction in relation to the shaft. This technical effect occurs since the elastomeric friction element will, as a result from its elastic properties, exert a pressure on the shaft member or the engagement element in response to any attempt to compress the elastomeric friction member or the elastomeric supporting member within the supporting structure. Thus, it is not required to provide a compression force onto the elastomeric element which is substantially parallel to the direction at which the elastomeric element engages the shaft member or engaging element. As long as the elastomeric element is compressed, it will expand in the direction towards the shaft member or the engaging element and thereby exert pressure thereto.

According to one embodiment, the at least one brake arrangement comprises a locking arrangement configured to selectively lock the rotation of the rotatable multi head scraper unit during operation of the one of the at least two scrapers. The locking arrangement is releasable, and may comprise a first structure having a first set of though-holes and a second structure having a second set of through-holes, wherein the first structure is connected to the rotatable multi-head scraper unit and the second structure is configured to be connected to a frame of a roller crusher, and one or more bolts for rotationally locking the first and second structures in relation to each other by inserting the one or more bolts through overlapping associated ones of the first set of though-holes and the second set of though-holes.

According to one embodiment, the rotation actuator comprises a gear box.

The phrasing "gear box" means a part of a transmission system which comprises a gear train including at least one drive gear to which a torque is provided, and one driven gear, which is mechanically coupled to the drive gear and which delivers torque from the gear box. A simple gear box may consist of only the drive gear and the driven gear. In such a gear box, the drive gear engages the driven gear directly. A gear box may optionally comprise one or more further intermediary gears, also termed idler gears, which interconnects the drive gear with the driven gear so as to provide a mechanical linkage between the drive gear and the driven gear. Any kind of gears are conceivable for a gear box according to the disclosure. Such gears include spur gears, bevel gears, worm gears etc.

The provision of a gear box may be advantageous as it allows for providing a suitable gear ratio for selectively rotating the rotatable multi head scraper unit. It is conceivable that many embodiments of the scraper device as disclosed herein will require a significant torque to be provided in order to rotate the rotatable multi head scraper unit. By the provision of a gear box, it may be possible to maneuver the rotatable multi head scraper unit manually by hand, for example by means of a maneuvering wheel or crank. Another advantage of the gear box may be that it allows providing the torque in a direction which is non-parallel with the rotational axis of the rotatable multi head scraper unit. This may be achieved by the gear box including gear arrangements such as worm drives, hypoid gears, crossed helical gears, or the like.

According to one embodiment, the gear box is configured to act as a second brake arrangement of the at least one brake arrangement.

As previously mentioned with reference to the first aspect, a brake arrangement of the disclosure must not be limited to what is conventionally referred to as a brake. Rather, the term brake arrangement should be construed as encompassing all devices configured to prevent and/or restrict rotation. As readily appreciated by the person skilled in the art, a gear box will always have a degree of frictional resistance, which will provide a degree of brake power to the mechanical system to which the gear box is engaged. The brake power will increase with increasing frictional forces within the gear train.

According to one embodiment, the gear box comprises a gear train having a gear ratio larger than 1. Alternatively, the gear train may have a gear ratio larger than 10, or larger than 20 or larger than 40.

The gear ratio of the gear train is defined as the ratio between the number of rotations of the drive gear and the number of rotations of the driven gear. This implies that a gear ratio larger than 1 will allow a larger number of revolutions caused by applying a lower torque to the drive gear to be transformed into a lower number of revolutions with a higher torque on the driven gear.

A gear box having a gear train with a gear ratio larger than 1 may be beneficial for several reasons. Firstly, as previously mentioned, it provides a means for transforming a low-torque rotation to a high torque rotation. This may be advantageous as it allows to maneuver the rotatable multi head scraper unit manually by hand, for example by means of a maneuvering wheel or crank. Furthermore, the gear ration will also affect the level of brake power that the gear box may provide to the rotatable multi head scraper unit. Specifically, the brake power will increase with increasing gear ratio of the gear train.

According to one embodiment, a third brake arrangement of the at least one brake arrangement is a ratchet arrangement.

The ratchet arrangement is configured to prevent rotational movement in one rotational direction and allow rotational movement in the opposite rotational direction. A ratchet arrangement may comprise a ratchet wheel in the form of a toothed gear having uniform but asymmetrical teeth, with each tooth having a moderate slope on one edge and a much steeper slope on the other edge. The ratchet arrangement may further comprise a pivoting, often spring-loaded finger sometimes termed pawl, which engages the teeth. When the teeth are moving in the unrestricted (i.e. forward) direction, the pawl easily slides up and over the gently sloped edges of the teeth, with a spring forcing it into the depression between the teeth as it passes the tip of each tooth. When the teeth move in the opposite (backward) direction, however, the pawl will catch against the steeply sloped edge of the first tooth it encounters, thereby locking it against the tooth and preventing any further motion in that direction.

The ratchet arrangement may be advantageous as it serves to restrict movement to only one rotational direction, which allows for better control of the scraper device. The ratchet arrangement may be configured to prevent rotation in a rotational direction opposite to the rotational direction of the roller having a flange. This may be advantageous as it may prevent the one of the at least two scrapers from being forced backwards in response to an impact from build-up material at the flange. It is however conceivable that a release mechanism is available for cases where the impact force exceeds a maximum allowable impact force. Therefore, the ratchet arrangement may comprise a torque limiter configured to disable the ratchet mechanism so as to allow rotational movement along both rotational directions.

According to one embodiment, the scraper device comprises two rotatable multi head scraper units arranged at opposite ends of a roller having two flanges attached to the opposite ends, each rotatable multi head scraper unit having at least two scrapers arranged tangentially about the rotatable multi head scraper unit at a respective radial distance from a rotational axis of the rotatable multi head scraper unit, and wherein the rotation actuator is arranged to selectively rotate both rotatable multi head scraper units together.

This may be advantageous as it would allow controlling dual scrapers using one single actuator mechanism.

According to one embodiment, the scraper device further comprises a drive unit arranged to provide kinetic energy to the rotation actuator for the selectively rotation of the rotatable multi head scraper unit.

This may be advantageous as it allows for remotely controlling scraper exchange.

According to one embodiment, the scraper device has rotary indexing capability for selectively rotating the rotatable multi head scraper unit between predefined angular positions.

The rotary indexing capability may be advantageous as it facilitates selection of appropriate operating positions. The rotary indexing capability may for example be beneficial when exchanging the operating scraper, which is achieved by rotating the rotatable multi head scraper unit such that the one of the at least two scrapers is exchanged with another one of the at least two scrapers at the end of the roller having a flange. The rotary indexing capability may also be beneficial when adjusting the position of the operating scraper without exchanging it. The multi head scraper unit may be rotated such that the operating scraper is moved from a first operating position to a second operating position, which operating positions has different distances to the envelope surface. The rotary indexing capability may be used to define a plurality of predetermined operating positions for the operating scraper, each operating position corresponding to an associated predefined angular position of the rotatable multi head scraper unit.

The rotary indexing capability may be realised by an integrated motion system. Such integrated motion systems may typically comprise motors and mechanical power transmission devices along with encoders, sensors and controllers. Thus, the scraper device may further comprise at least one sensor for determining the angular position of the rotatable multi head scraper unit and/or the position of one or more of the at least one scraper. The scraper device may further comprise at least one drive unit for rotating the rotatable multi head scraper unit. The scraper device may further comprise at least one control unit for rotating the rotatable multi head scraper unit.

According to an embodiment, a periphery of the rotatable multi head scraper unit, as seen between a pair of adjacent scrapers of the two or more scrapers, has a radial extension being at least 20 mm smaller than a smallest radial distance of the pair of adjacent scrapers.

With "periphery of the rotatable multi head scraper unit" is herein meant a radial extension of the rotatable multi head scraper unit as defined transverse to the rotational axis.

The provision of a periphery being at least 20 mm smaller than the smallest radial distance of the pair of adjacent scrapers may be advantageous as it makes it easier for removed build-up material to leave the rotatable multi head scraper unit. If the periphery of the rotatable multi head scraper unit, as seen between the pair of adjacent scrapers of the two or more scrapers, is too close to the smallest radial distance of the pair of adjacent scrapers, there is a risk that removed build-up material may get jammed between said periphery and the envelope surface of the roller.

The smallest difference between the radial extension of the periphery of the rotatable multi head scraper unit as seen between the pair of adjacent scrapers, and the smallest radial distance of the pair of adjacent scrapers may be a function of roll diameter. The reason for this is that the crushing gap typically increases with the roll diameter thereby resulting in more excessive build-up material with a larger thickness accumulated on the flange and/or on the envelope surface at an end portion of the roller adjacent the flange. It is contemplated that the above-defined smallest difference must exceed the thickness of the build-up material. Therefore, the above-defined difference may have to be larger than 20 mm for roller crushers having large crushing rolls. The radial extension may be within the range 20 to 150 mm smaller than a smallest radial distance of the pair of adjacent scrapers.

According to a second aspect of the disclosure, this and other objects are achieved, in full or at least in part, by a roller crusher having two generally parallel rollers arranged to rotate in opposite directions, and separated by a gap, each roller having two ends, the roller crusher comprising: a flange attached to one of the ends of one of the rollers, the flange extending in a radial direction of the roller, and the flange having an extension (E1) past an envelope surface of the roller. The roller crusher further comprises a scraper device as disclosed in the first aspect of this disclosure, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller to thereby at least partially allow removal of material accumulated on the flange and/or on the envelope surface at an end portion of the roller adjacent the flange.

According to one embodiment, the scraper device is arranged such that an active scraper is arranged at a distance to the flange and/or to the outer surface at the end of the roller.

At this position of the active scraper, the roller crusher may be in operation for economically acceptable time periods before the scraper has been worn down to an extent at which the distance between the scraper and the outer surface of the roller will become close to the minimum gap between the rollers used for crushing, and the scraper has to be either adjusted in position or replaced. A minimum gap between the rollers is set by a movement blocking arrangement which physically prevent the rollers from getting closer to each other than what is specified by the predetermined minimum gap.

The distances between the active scraper and the roller surface and/or flange may alternatively be defined using a minimum roller distance and a minimum flange distance, respectively. The minimum roller distance is defined as the minimum distance between an active scraper and the outer surface of the roller. Similarly, the minimum flange distance is defined as the minimum distance between an active scraper and an inner surface of the flange.

According to one embodiment of the second aspect, the roller crusher comprises two flanges attached to opposite ends of one of the rollers, and wherein a scraper device according to the first aspect is arranged at each ends of the roller with the flanges.

According to one embodiment of the second aspect, the roller crusher comprises two flanges attached to opposite ends of one of the rollers, and a scraper device comprising two rotatable multi head scraper units, each rotatable multi head scraper unit having at least two scrapers arranged tangentially about the rotatable multi head scraper unit at a respective radial distance from a rotational axis of the rotatable multi head scraper unit, and wherein the rotation actuator is arranged to selectively rotate both rotatable multi head scraper units together, and wherein the scraper device is arranged such that the two rotatable multi head scraper units are arranged at opposite ends of the roller having two flanges attached to the opposite ends.

According to one embodiment of the second aspect, the roller crusher further comprises a sensor system for monitoring the condition of the scraper device, and a controller operatively connected to the sensor system and to the drive unit.

This is advantageous as it allows to automatically determine when there is a need for exchanging a worn-out scraper. It is contemplated that this exchange operation is available during operation of the roller crusher, hence removing a need for a roller crusher shut down. Moreover, the sensor system may allow for an improved prediction as to when the roller crusher has to be shut down for a replacement of a completely worn out rotatable multi head scraper unit. For example, the sensor system may be configured to determine how many scrapers of the at least two scrapers are still available for scraping.

The second aspect is generally associated with the same advantages as the first aspect. Moreover, the embodiments disclosed for the first aspect are equally well applicable for the second aspect.

According to a third aspect of the disclosure, this and other objects are achieved, in full or at least in part, by a method for operating a roller crusher for grinding granular material, wherein the roller crusher has two generally parallel rollers arranged to rotate in opposite directions, and separated by a gap, each roller having two ends, the roller crusher comprising: a flange attached to one of the ends of one of the rollers, the flange extending in a radial direction of the roller, and the flange having an extension (E1) past an envelope surface of the roller, wherein the roller crusher further comprises a scraper device as disclosed in the first aspect of this disclosure, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of at least partially removing material accumulated on the flange and/or on the envelope surface at an end portion of the roller adjacent the flange by means of the one of the at least two scrapers.

According to one embodiment of the third aspect, the method further comprises the step of rotating the rotatable multi head scraper unit such that the one of the at least two scrapers is exchanged with another one of the at least two scrapers at the end of the roller having a flange.

According to one embodiment of the third aspect, the method further comprises the step of rotating the rotatable multi head scraper unit such that the one of the at least two scrapers is moved from a first operating position to a second operating position, wherein a distance between the one of the at least two scrapers and the envelope surface as defined in an un-worn state of the one of the at least two scrapers is larger at the first operating position than at the second operating position.

Scrapers will be exposed to wear during scraping operation. Therefore, the radial extension of the scraper, i.e. the radial distance from the rotational axis of the rotatable multi-head scraper unit, will gradually crease during the life of the scraper. This will result in the build-up material at the flange to be gradually thicker with time. In other words, even if the operating scraper is always performing an efficient scraping of the enveloped surface, the scraping operation as such will not be consistent in time. By adjusting the angular position of the rotatable multi-head scraper unit, the operating scraper may be moved to a position which is closer to the enveloped surface, thereby compensating for the effect of wear on the radial extension of the scraper.

The scraper device may preferably have rotary indexing capability for selectively rotating the rotatable multi-head scraper unit between predefined angular positions. The rotary indexing capability may be advantageous as it facilitates selection of appropriate operating positions. Specifically, the rotatable multi-head scraper unit may be rotated such that the operating scraper is moved from a first operating position to a second operating position, which operating positions has different distances to the envelope surface. The rotary indexing capability may be used to define a plurality of predetermined operating positions for the operating scraper, each operating position corresponding to an associated predefined angular position of the rotatable multi head scraper unit.

According to one embodiment of the third aspect, the scraper device further comprises a drive unit arranged to provide kinetic energy to the rotation actuator for the selective rotation of the rotatable multi head scraper unit, and wherein the method further comprises rotating the rotatable multi head scraper unit by means of the drive unit.

This may be advantageous as it removes a need for a manual exchange of scrapers at the roller crusher. Apart from the benefit of reducing manual labour, it allows for initiating a scraper exchange from a distance.

According to one embodiment of the third aspect, the roller crusher further comprises a sensor system for monitoring the condition of the scraper device; and a controller operatively connected to the sensor system and to the drive unit, and wherein the method further comprises the control unit controlling the rotation of the rotatable multi head scraper unit based on output data from the sensor system.

This may be advantageous as it allows to automatically determine when there is a need for exchanging a worn-out scraper or when there is a need to move the one of the at least two scrapers from a first operating position to a second operation position. It is contemplated that this exchange or movement operation is available during operation of the roller crusher, hence removing a need for a roller crusher shut down. Moreover, the sensor system may allow for an improved prediction as to when the roller crusher has to be shut down for a replacement of a completely worn out rotatable multi head scraper unit. For example, the sensor system may be configured to determine how many scrapers of the at least two scrapers are still available for scraping.

The third aspect are generally associated with the same advantages as the first and second aspect. Moreover, the embodiments disclosed for the first aspect are equally well applicable for the third aspect.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show an example of a presently preferred embodiment of the disclosure.

FIG. 1 is a perspective view of a roller crusher according to prior art.

FIG. 2A is a schematic top view of two rollers of the roller crusher of FIG. 1.

FIG. 2B is a schematic top view of two rollers of a roller crusher of the prior art according to an alternative embodiment.

DETAILED DESCRIPTION

Figure 3A:
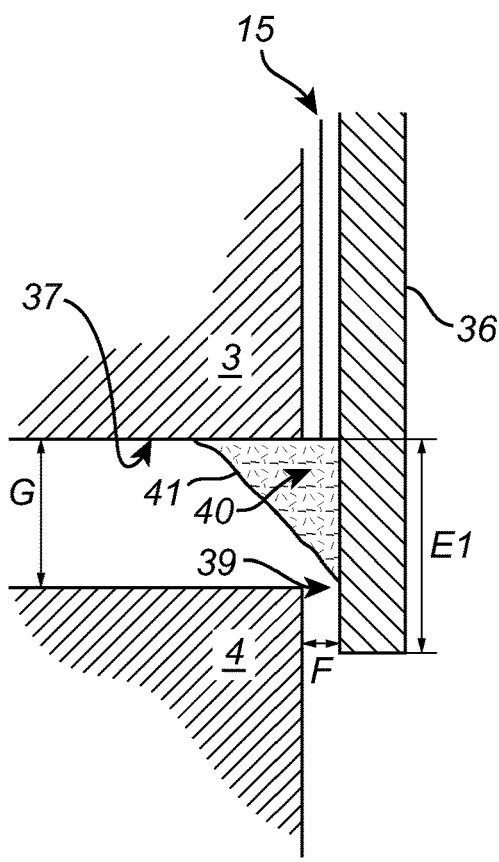
FIG. 3A is a top cross-sectional view of segments of a roller crusher according to the prior art.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

As discussed in the background part of this disclosure, the arrangement of flanges to the ends of the crushing rollers (as shown in FIG. 2A and further discussed below), either one flange in each end of one of the grinding rollers (as shown in FIG. 2A and further discussed below), or one flange on each grinding roller (as shown in FIG. 2B and further discussed below), the crushing effect along the length of the grinding rollers are maintained. However, these flanges and also the edges of opposite grinding roller are under a lot of stress and wear during operation of the roller crusher due to accumulation of grinded material in the transition between the flange and an envelope surface of the grinding roller. Prior art has suggested a scraper element for removing this accumulation of material, but an object of the present disclosure is to proceed from there and provide a scraper device with reduced maintenance time and with a simplified procedure for scraper position adjustment and replacement.

With reference to FIGS. 4 to 21, this is achieved, in full or at least in part by a scraper device 200, 200', 400, 500, 1100, 1100' and a roller crusher 1 comprising such a scraper device 200, 200', 400, 500, 1100, 1100' which scraper device 200, 200', 400, 500, 1100, 1100' comprises a rotatable multi head scraper unit 210, 210', 510, 1010, 1110 having at least two scrapers 100, 501, 601, 701, 801, 901, 1001, 1101 arranged tangentially about the rotatable multi head scraper unit 210, 210', 510, 1010, 1110 at a respective radial distance T from a rotational axis A of the rotatable multi head scraper unit 210, 210', 510, 1010, 1110. The scraper device 200, 200', 400, 500, 1100, 1100' further comprises a rotation actuator 202, 580 arranged to selectively rotate the rotatable multi head scraper unit 210, 210', 510, 1010, 1110 to allow operative use of one of the at least two scrapers 100, 501, 601, 701, 801, 901, 1001, 1101 at a time, and at least one brake arrangement B1, B2, B3, 570 configured to prevent and/or restrict rotation of the rotatable multi head scraper unit 210, 210', 510, 1010, 1110 during operation of the one of the at least two scrapers 100, 501, 601, 701, 801, 901, 1001, 1101.

The scraper device 200, 200', 400, 500, 1100, 1100' of the present disclosure provides a number of advantages, such as enabling a compact scraper arrangement, reducing maintenance time for exchange of a worn scraper, allowing for an easier replacement procedure once the scrapers needs to be replaced, allowing for a completely automated scraper exchange procedure, and allowing for adjusting a distance between the scraper which performs a scraping operation, herein termed "operating scraper", and the envelope surface of the roller by adjusting the angular position of the rotatable multi-head scraper unit.

FIG. 1 shows a roller crusher 1 according to the prior art. Such roller crusher 1 comprises a frame 2 in which a first, fixed crusher roller 3 is arranged in bearings 5, 5'. The bearing housings 35, 35' of these bearings 5, 5' are fixedly attached to the frame 2 and are thus immoveable. A second crusher roller 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rollers 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. Further, a number of hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as these are adjusting the gap width and reacting to forces occurring at the grinding rollers 3, 4 due to material fed to the roller crusher 1.

Such roller crushers work according to a technique called interparticle crushing. The crushing rollers 3, 4 rotates counter to each other as illustrated schematically in FIG. 1 using the arrows. The gap between the crushing rollers 3, 4 is adjusted by the interaction of feed load and the hydraulic system effecting the position of the second crusher roller 4. As shown in FIG. 1 and also in FIG. 2A which shows the rollers 3, 4 from above, one of the grinding rollers 3 further comprises flanges 36, 36' arranged at opposite ends of the grinding roller 3, wherein each flange 36, 36' has an extension E1 past an envelope surface 37 of the roller body of the roller 3 (see FIG. 3A), and positioned axially outward of the roller body of the opposite grinding roller 4.

Another prior art roller crusher is disclosed in e.g. WO2013/156968, in which each of the grinding rollers with bearings is arranged in interconnected arch-shaped frame sections, wherein each interconnected arch shaped frame sections are pivotably connected to a base frame. The disclosed subject matter within this disclosure is equally applicable in such a prior art roller crusher arrangement.

As also illustrated in FIG. 3A, each flange 36 is arranged on an end of the roller 3 such that an inner surface 39 of the flange 36 is located at a distance F from the end of the opposing roller 4. The distance F is necessary to avoid contact between the flange 36 and roller 4 which could lead to material damage. At the same time, the distance F should not be too large, as that increases the risk of material leaving the roller crusher through the gap thus formed. The distance F may be realized by mounting the flange 36 to the roller 3 via shims 15, best illustrated in FIG. 3A. The purpose of the flanges 36, 36' is to prevent material from exiting the gap at the end thereof, thereby forcing all material that enters the roller crusher to pass through the crushing gap to be crushed. An alternative embodiment of a roller crusher with flanges is illustrated in FIG. 2B. The only difference between the two embodiments is that the roller crusher in FIG. 2B has flange 36 disposed on the second grind roller 4' instead of the first grind roller 3', which means that each of the grinding rollers 3', 4' has one flange 36, 36' each. As readily appreciated by the person skilled in the art, the technical effect of preventing material to exit the roller crusher 1, 1' at the ends of the gap will be equally well achieved for both disclosed embodiments. Importantly, the disclosed inventive concept is equally applicable to both these embodiments.

As previously mentioned, the gap between the rollers 3, 4 can be adjusted. For crushing operation, the roller crusher 1 is preset to have a specific distance between the rollers, the so-called start-up gap G. This is illustrated in FIG. 3A. The start-up gap G is selected based on several different factors, such as the roller crusher size (i.e. grinding roller diameter), the desired properties of crushed material etc. The start-up gap G may be in the range 10 to 140 mm. However, typically, the start-up gap G is within the range 60 to 90 mm.

The roller crusher 1 further comprises a movement blocking arrangement 20 structured and arranged to limit the gap G between the rollers to a minimum gap M. There are many different ways to provide such a movement blocking arrangement 20 known in the art, and it is therefore not discussed in detail herein. One common solution, which is the solution illustrated in FIG. 1, is to provide a pair of mechanical engagement elements 20a, 20b on the bearing houses 35, 35'. The minimum gap M may be relatively small for some roller crushers and/or materials to be crushed, such as in the range 10 to 30 mm. However, typically, the minimum gap M is at least 45 mm. It is however conceivable that the minimum gap is larger, such as e.g. at least 55 mm, or at least 60 mm or at least 65 mm or at least 70 mm.

As initially described, a problem with this type of grinding assemblies is that material tend to build up at the corner 40 (see FIG. 3A) between the envelope surface 37 of the grinding roller 3 and the inner surface 39 of the flange 36, 36'. Such material build-up 41 is schematically illustrated in FIG. 3A for the roller crusher 1 of FIGS. 1 and 2A, and is generally unwanted as it generates increased local loads in this area during operation, which may cause wear, damage and/or deformation on the opposite grinding roller 4 which does not have a flange as well as on the flanges 36, 36'. To provide a solution to this problem, means for removing at least a part of this build-up material 41 is provided. The current disclosure relates to such means, in the form of a scraper device 200 which utilizes mechanical scrapers 100. The mechanical scrapers 100 will first be discussed with reference to FIGS. 3A to C, followed by a description of the scraper device 200, 200' and 300 with reference to FIGS. 3 to 10.

Figure 3B:
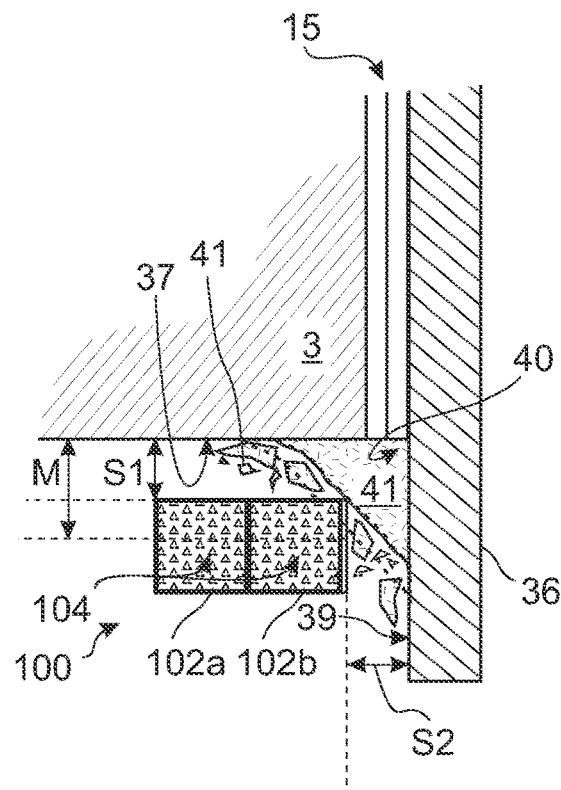
FIG. 3B is a side cross-sectional view of segments of a roller crusher according to an embodiment of the disclosure.
Figure 3C:
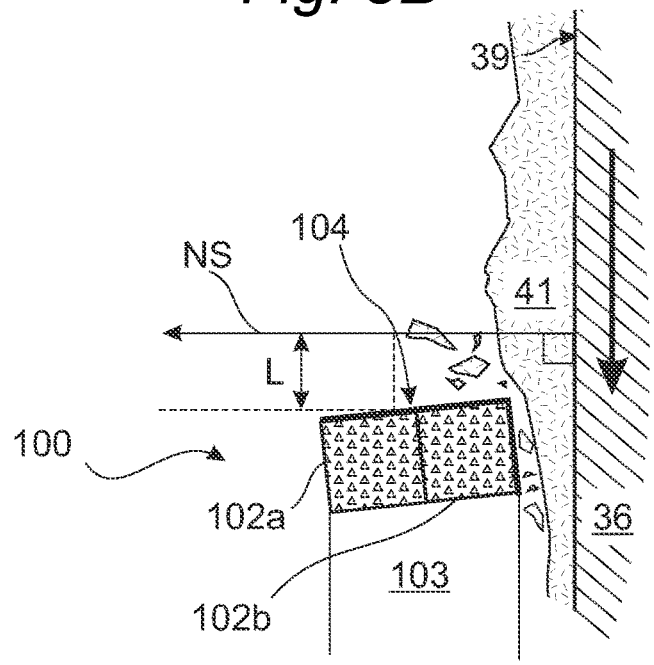
FIG. 3C is a top view of parts of a roller crusher according to an embodiment of the disclosure.

FIG. 3B illustrates a mechanical scraper 100 according to an embodiment of the disclosure in a front view. The mechanical scraper 100 is attached to a scraper device 200 which will be described in detail later but is here illustrated in isolation with respect to the grinding rollers 3, 4 to enhance clarity. The mechanical scraper 100 comprises two wear members 102a, 102b disposed at an end of the scraper 100 so as to define a scraping surface 104 generally facing the material to be removed. The statement "generally facing the material to be removed" implies that the scraping surface 104 is arranged substantially orthogonal to the tangential of the roller surface. The arrangement of the scraping surface 104 will be further discussed later. The wear members 102a, 102b are attached to scraper main body 103 (not visible in the front view of FIG. 3B but can be seen in FIG. 3C). As illustrated in FIG. 3C, which shows the scraper 100 of FIG. 3B in a top view together with parts of a roller 3 with a flange 36 when rotating towards the scraper 100 as indicated by the arrow which indicates the tangential velocity of the rotating roller 3, the wear members 102a, 102b may be arranged on the scraper main body 103 such that the scraping surface 104 of the scraper 100 is arranged to incline in a relation to a normal NS of the inner surface 39 of the flange 36, as defined in front of the scraping surface 104, and incline such that a distance L between the normal NS and the scraping surface 104 decreases towards the left in FIG. 3C. This allows for material to more easily be transported away from the corner 40 between the inner surface 39 of the flange 36 and the envelope surface 37 of the roller 3 once scraped off, thus contributing to an efficient material removal process.

The nature of the material build-up 41 and the speed at which the at least one mechanical scraper 100 and the material build-up 41 meets, tend to make material removal substantially impact-driven. Hence, instead of the scraper with time creating a carved recess in the build-up material, large surface portions of the material build-up 41 are more or less instantaneously broken off when encountering the scraper. This is schematically illustrated in FIGS. 3B and 3C. The remaining portion of the material build-up 41 has been found to present a relatively uniform outer surface. It is not necessary to remove the material build-up 41 completely. Preferably, only parts of the build-up 41 should be removed. The partial removal of the material build-up 41 will reduce overall wear of the scraper 100 as it is exposed to a significantly less degree of wear when positioned further away from the roller surface 37.

It has been realized that a preferred position of the scraper 100 may be when the scraper 100 is positioned such that a minimum roller distance S1 between the scraper 100 and the outer surface 37 of the roller 3 is at least 70% of the minimum gap M. The minimum roller distance S1 is defined in FIG. 3B. It should be noted that for the example embodiment illustrated in FIG. 3B, the scraper 100 is structured and arranged such that the distance between the scraper 100 and the outer surface 37 of the roller 3 is substantially constant. This implies that the minimum roller distance S1 will coincide with the substantially constant distance. However, for other not disclosed embodiments, the scraper may be structured and/or arranged such that the distance between the scraper 100 and the outer surface 37 of the roller 3 varies. For such an embodiment, the minimum roller distance S1 will be the shortest distance between the scraper and the outer surface 37 of the roller 3. At this position of the scraper 100 with a minimum roller distance S1, the roller crusher 1 may be in operation for economically acceptable time periods before the scraper 100 has been worn down to an extent at which the distance between the scraper 100 and the outer surface 37 of the roller 3 will become close to the minimum gap M, and the scraper 100 has to be either adjusted in position or replaced.

As illustrated in FIG. 3B, the scraper 100 is positioned at a minimum flange distance S2 from the inner surface of the flange 36. As can be seen in FIGS. 3A and 3B, this minimum flange distance S2 is larger than the distance F between the roller 4 and the inner surface 39 of the flange 36. This may appear somewhat surprising, as it can be expected that the scraper 100 may miss removing material necessary to be removed in order to completely avoid contact between roller 4 and the material build-up 41. However, positioning the scraper 100 closer to the flange 36 is associated with other disadvantages. Firstly, it increases the risk of the scraper 100 being damaged by the flange 36 and/or material build-up 41 on the flange 36, a risk that increases with decreasing distance to any moving surface. Secondly, it increases the risk of damaging the flange 36 itself. By positioning the scraper 100 at a minimum flange distance S2 being larger than the distance F, a reasonable trade-off is obtained. A sufficient amount of material is removed from the build-up material 41 at the flange 36, while keeping the scraper 100 at a safe distance from the flange 36, which results in a prolonged scraper life as well as flange life. Preferably, the scraper 100 is positioned such that a minimum flange distance S2 between the scraper 100 and an inner surface 39 of the flange 36 is 1-25 mm. More preferably, the scraper 100 is positioned such that a minimum flange distance S2 between the scraper 100 and an inner surface 39 of the flange 36 is at least 11 mm. The risk of flange damage has been found to be significantly reduced at this distance. Needless to say, flange bending is unwanted as it will allow material to slip out from the crusher gap at the sides, hence leading to parts of the material bypassing the roller crusher, with an end result that the material output from the roller crusher will not have the specified size distribution.

The scraper 100 is only schematically illustrated in FIGS. 3B and 3C to allow defining the preferred position of the scraper 100 in relation to the roller crusher 1, or more specifically, in relation to the roller envelope surface 37 and/or flange 36. Turning instead to FIGS. 4 to 21, it will be described in detail how scrapers, such as the scraper 100 of FIG. 3B, may be mounted on a scraper device 200, 200' for use on a roller crusher 1.

The scraper device 200, 200' is essentially a multi-scraper device having the capability to exchange scrapers 100 at an operating position P located at a roller envelope surface 37 or a roller 3 with a flange 36. The ability to exchange scrapers 100 are achieved by providing a rotatable multi head scraper unit 210, 210' which carries the mechanical scrapers 100. During operation of the roller crusher 1, one of the scrapers 100 is positioned in the operating position P and performs scraping of build-up material 41 present on the end of the roller 3, whereas the other scrapers 100 are positioned further away from the roller envelope surface 37 and consequently are idle scrapers not performing any scraping. Thus, only one scraper 100 of the scraping device 200 performs scraping at any point in time. Two different example embodiments of a rotatable multi head scraper unit 210, 210' will now be described with reference to FIGS. 4 and 5.

Figure 4:
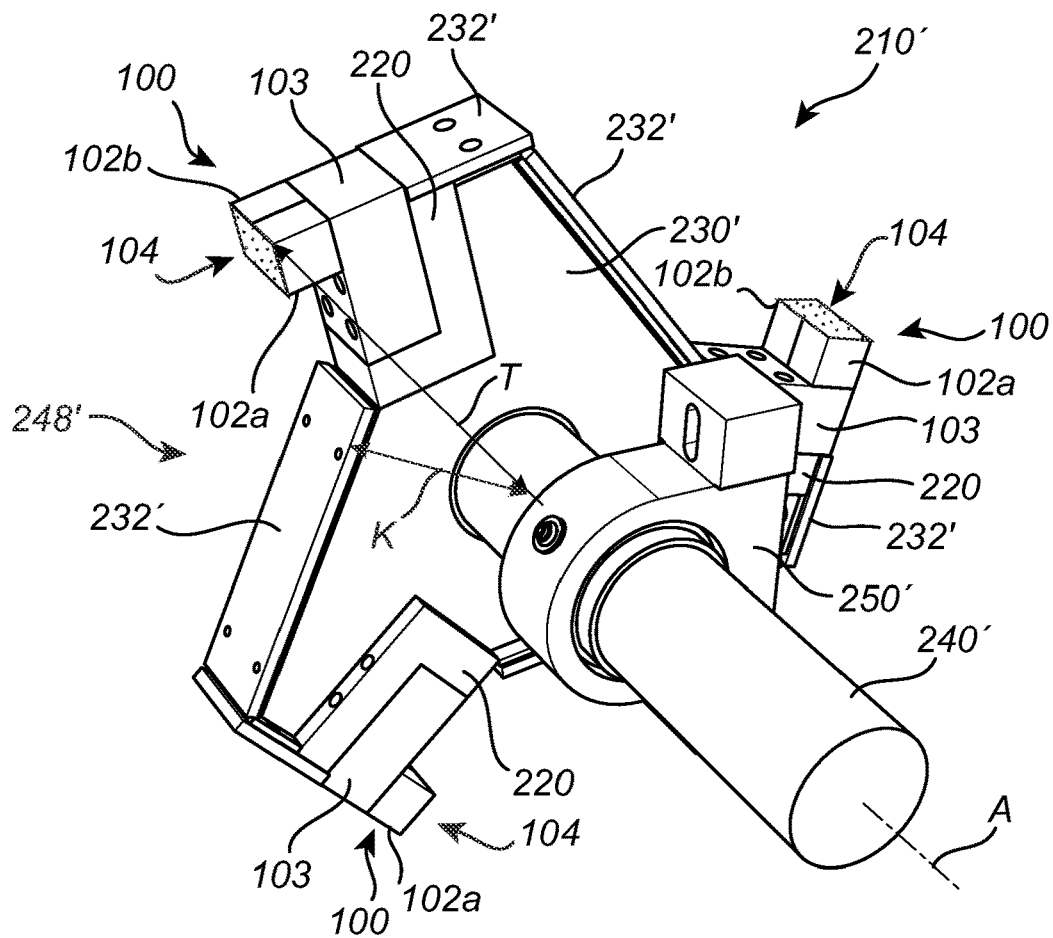
FIG. 4 is a perspective view of a rotatable multi head scraper unit according to an embodiment of the disclosure.

FIG. 4 illustrates a rotatable multi head scraper unit 210' according to a first example embodiment. The rotatable multi head scraper unit 210' has at least two scrapers 100 (for this particular example embodiment: 3 scrapers 100) arranged tangentially about the rotatable multi head scraper unit 210' at a respective radial distance T from a rotational axis A of the rotatable multi head scraper unit 210'. For the example embodiment, the scrapers 100 are mutually equidistantly spaced at 120 degrees from each other. In other words, for this non-limiting example embodiment, the rotatable multi head scraper unit 210' is symmetric. The rotatable multi head scraper unit 210' comprises a spider 230' which is attached to a rotationally arranged shaft member 240' which in turn is rotationally attached to a part of a roller crusher via a support structure 250'. As previously described, each scraper 100 comprises a scraper body 103 and two wear members 102a, 102b which together presents a scraping surface 104 indicated in FIGS. 4 and 5 as dotted areas). Each scraper 100 is releasably fastened to the spider 230' at dedicated support structures 220 by bolting. The bolting allows for an easy assembly procedure when preparing a rotatable multi head scraper unit 210' for being mounted on a roller crusher 1. The rotatable multi head scraper unit 210' further comprises wear protective elements 232' structured and arranged to protect the peripheral edges of the spider 230' from abrasive wear. During scraping operation, significant material will impact the rotatable multi head scraper unit 210' and in an absence of the wear protective elements 232', the spider 230' would risk being irreversibly damaged even before all three scrapers 100 has served their time. The rotatable multi head scraper unit 210' is attached to a shaft member 240' which is rotatably attached to support arrangement 250'. The support arrangement 250' is structured and arranged to be connected to a frame 2 of the roller crusher 1. As illustrated in FIG. 4, a periphery 248' of the rotatable multi head scraper unit 210', as seen between a pair of adjacent scrapers 100 of the two or more scrapers 100, has a radial extension K being at least 20 mm smaller than a smallest radial distance T of the pair of adjacent scrapers 100. For the example embodiment illustrated in FIG. 4, the radial distance T is the same for all three scrapers 100, and thus the smallest radial distance will be the radial distance T defined in FIG. 4. However, for alternative embodiments, a pair of adjacent scrapers may be disposed at different respective radial distances T from the rotational axis A.

The provision of a periphery 248' being at least 20 mm smaller than the smallest radial distance T of the pair of adjacent scrapers 100 may be advantageous as it makes it easier for removed build-up material 41 to leave the rotatable multi head scraper unit 210'. If the periphery 248' of the rotatable multi head scraper unit 210', as seen between the pair of adjacent scrapers 100 is too close to the smallest radial distance K, there is a risk that removed build-up material 41 may get jammed between said periphery 248' and the envelope surface 37 of the roller 3.

The smallest difference (T−K) between the radial extension K of the periphery 248' of the rotatable multi head scraper unit 210' as seen between the pair of adjacent scrapers 100, and the smallest radial distance T of the pair of adjacent scrapers 100 may be a function of roll diameter. The reason for this is that the crushing gap G typically increases with the roll diameter thereby resulting in more excessive build-up material with a larger thickness accumulated on the flange 36 and/or on the envelope surface 37 at an end portion of the roller 3 adjacent the flange 36. It is contemplated that the above-defined smallest difference must exceed the thickness of the build-up material 41. Therefore, the above-defined difference may have to be larger than 20 mm for roller crushers 1 having large crushing rolls. The radial extension may be within the range 20 to 150 mm smaller than a smallest radial distance of the pair of adjacent scrapers 100.

As readily appreciated by the person skilled in the art, the above-described feature may have less relevance for some example embodiments than for others. Specifically, for a rotatable multi head scraper unit having few scrapers, the above feature may be less relevant than for rotatable multi head scraper unit having a larger number of scrapers. The example embodiment illustrated in FIG. 4 only has three scrapers, and removed build-up material 41 may therefore be removed also if the periphery 248' were to extend further out such that K>T−20 mm.

Figure 5:
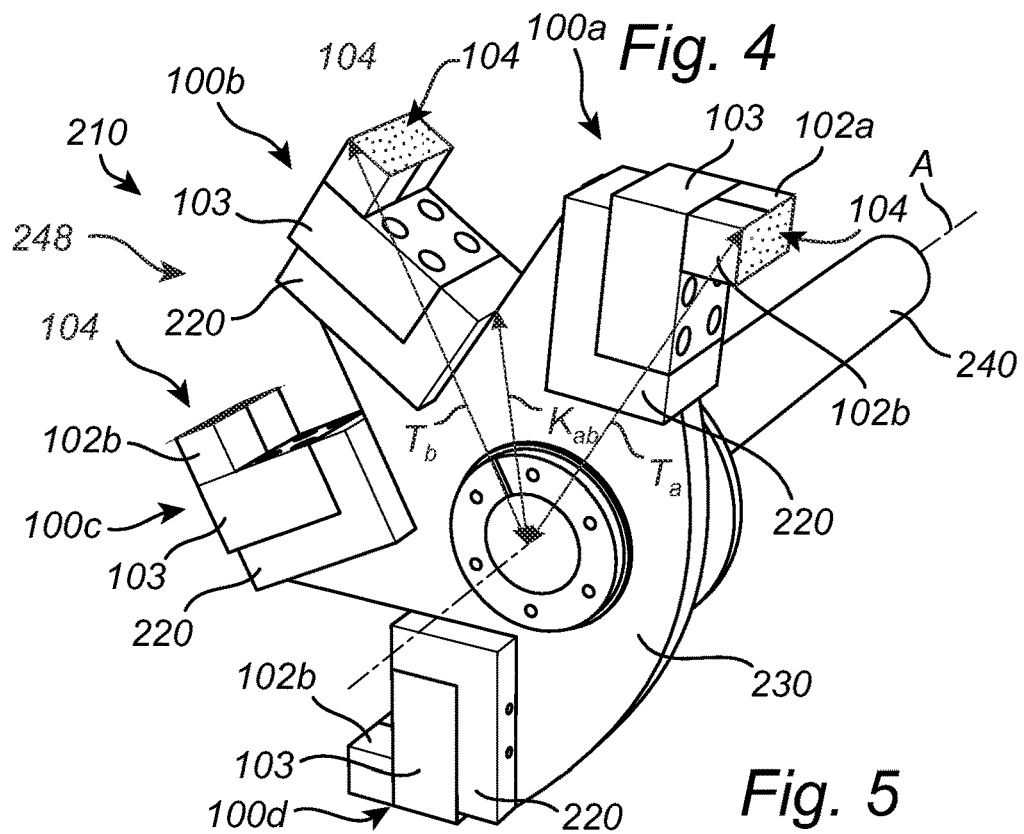
FIG. 5 is a perspective view of a rotatable multi head scraper unit according to another embodiment of the disclosure.

FIG. 5 illustrates a rotatable multi head scraper unit 210 according to a second example embodiment. The rotatable multi head scraper unit 210 also comprises at least two scrapers (for this particular example embodiment: 4 scrapers 100a, 100b, 100c and 100d) arranged tangentially about the rotatable multi head scraper unit 210 at a respective radial distance T from a rotational axis A of the rotatable multi head scraper unit 210. The scrapers 100a-d are equidistantly spaced but in contrast to the first example embodiment, the scrapers 100a-d of the second example embodiment are not mutually equidistantly spaced from each other. Instead, all four scrapers 100 are nonuniformly distributed so as to be disposed generally on one side of the rotatable multi head scraper unit 210, leaving the opposite side of the rotatable multi head scraper unit 210 free from scrapers. In other words, the rotatable multi head scraper unit 210 is asymmetric. However, the scrapers 100a-d and their associates support structures 220 may be the same as the ones illustrated in FIG. 4 for the first example embodiment and are therefore not further described here. Another way of describing the positioning of the scrapers 100a-d is in terms of a line of scrapers. When positioning a new rotatable multi head scraper unit 210 on a roller crusher 1, the rotatable multi head scraper unit 210 is arranged with respect to the roller envelope surface 37 such that scraper 100a will be positioned in the operating position P. Hence, scraper 100a will be the first scraper to perform scraping. For this reason, the scraper 100a is termed herein the "first-in-line scraper". The first-in-line scraper 100a is followed by scraper 100b and 100c and finally by scraper 100d, the later termed herein as the "last-in-line scraper". For the second example embodiment illustrated in FIG. 5, the first-in-line scraper 100a and the last-in-line scraper 100d are positioned such that these are separated with an angle of about 180 degree upstream of the first-in-line scraper 100a. Thus, whereas downstream of the first-in-line scraper 100a, there is provided both a scraper 100b and a scraper 100c, there are no scrapers arranged directly upstream of the first-in-line scraper 100a. Many alternative embodiments of the rotatable multi head scraper unit are contemplated. For example, a first-in-line scraper and a last-in-line scraper may be positioned such that these are separated with an angle of at least 120 degree upstream of the first-in-line scraper. The spider 230 of the rotatable multi head scraper unit 210 is also asymmetric and presents, on its scraper-free side, a periphery 248 presenting a rounded profile extending radially outwardly only a fraction of the distance Ta, Tb. Similar to the first example embodiment illustrated in FIG. 4, the periphery 248 of the rotatable multi head scraper unit 210, as seen between a pair of adjacent scrapers 100a, 100b of the two or more scrapers 100a-d, has a radial extension Kab being at least 20 mm smaller than a smallest radial distance Ta of the pair of adjacent scrapers 100a, 100b. For the example embodiment illustrated in FIG. 5, the radial distance Ta, Tb is somewhat different for the four scrapers 100a-d, and thus the smallest radial distance of the pair of adjacent scrapers 100a, 100b will be the radial distance Ta as a result from the scraper 100a being located somewhat closer to the rotational axis A than the scraper 100b. The advantage of the above feature is the generally the same as outlined for the first example embodiment in FIG. 4.

The provision of the asymmetrical rotatable multi head scraper unit 210 with the spider 230 shaped in this way provides an alternative way to minimize problems with wear damage. Instead of actively protecting the rotatable multi head scraper unit by means of wear protective elements as for the first example embodiment, damage is minimized for the second example embodiment by a design which minimizes the risk of material impacting on a scraper 100 which is idle and waiting to serve as operating scraper. The rotatable multi head scraper unit 210 is releasably attached to a shaft member 240. It may be beneficial to provide the releasable attachment using a quick fastener, as this will reduce time for replacement of the rotatable multi head scraper unit 210. Such a releasable fastening device may be e.g. a flange connection or a bushing. The bushing may be e.g. a tapered bushing, an XT bushing, or a QD bushing. For the second example embodiment disclosed herein, a QD bushing 234 is used. Such QD bushings 234 are well known in the art and are therefore not further described herein. The shaft member 240 is rotatably attached to a support arrangement 250 which is omitted from FIG. 5 to increase clarity but are described in detail later with reference to FIGS. 8 and 9. The support arrangement 250 is structured and arranged to be connected to a frame 2 of the roller crusher 1.

Figure 6:
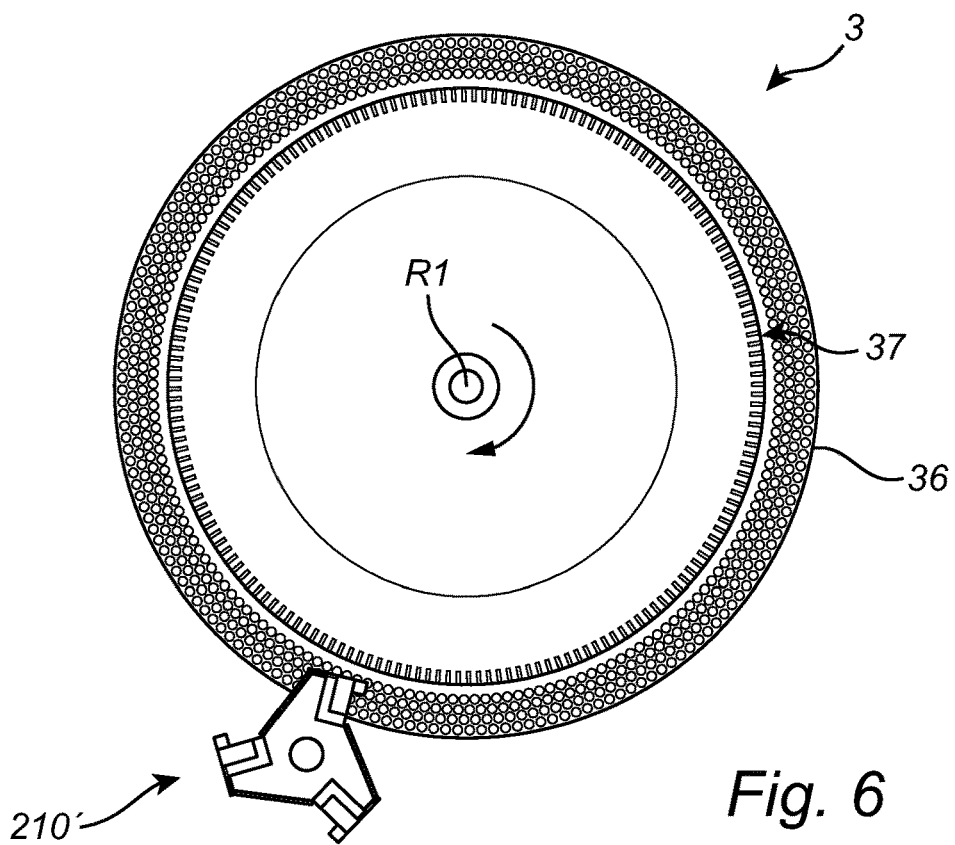
FIG. 6 is a cross-sectional side view of the rotatable multi head scraper unit of FIG. 4 arranged at a lower end of a roller with a flange according to an embodiment of the disclosure.
Figure 7:
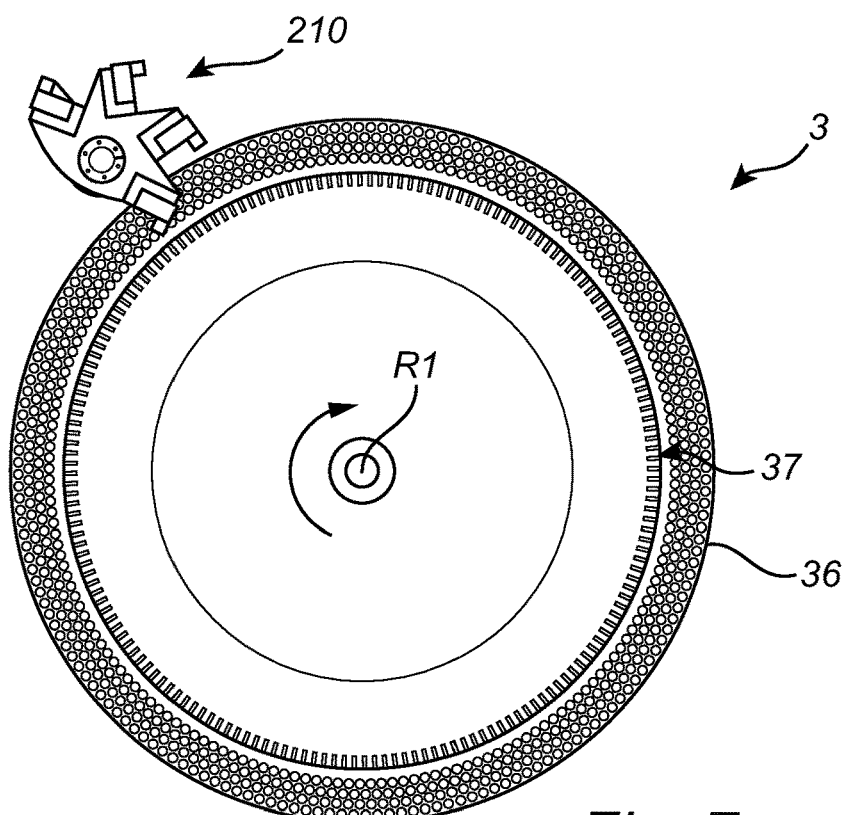
FIG. 7 is a cross-sectional side view of the rotatable multi head scraper unit of FIG. 5 arranged at an upper end of a roller with a flange according to an embodiment of the disclosure.

The rotatable multi head scraper unit 210, 210' of the inventive concept has the advantage that it can provide both an active scraper and a series of back-up scrapers at a relatively limited space at a grinding roller 3 of a roller crusher 1. It is contemplated that the rotatable multi head scraper unit 210, 210' may be arranged at different positions with respect to the grinding roller 3 dependent on the type of roller crusher 1. This is illustrated in FIG. 6 which discloses the rotatable multi head scraper unit 210' of the first example embodiment located at about seven o'clock, i.e. at a lower end of the roller 3, and in FIG. 7 which discloses the rotatable multi head scraper unit 210 of the second example embodiment located at about 11 o'clock, i.e. at an upper end of the grinding roller 3.

The rotatable multi head scraper unit 210, 210' of the inventive concept may be equipped with scrapers 100 which comprises wear members 102a, 102b which presents a scraping surface 104 that comprises a polycrystalline diamond (PCD). The wear members 102a, 102b may also be termed herein as scraping elements 102a, 102b. The polycrystalline diamond (PCD) and its advantages will be further described in detail with reference to later example embodiments in the disclosure.

Two example embodiments of the scraper device, the scraper device 200' and 200, will now be described with reference to FIGS. 8 and 9. The only difference between the two scraper embodiments is that the first embodiment, scraper device 200' in FIGS. 8A and B, is equipped with rotatable multi head scraper unit 210' of FIG. 4, whereas the second embodiment, scraper device 200 in FIGS. 9A and B, is equipped with rotatable multi head scraper unit 210 of FIG. 5. Since the two embodiments have so many features in common, they will be described together herein.

Both the rotatable multi head scraper unit 210' and the rotatable multi head scraper unit 210 may be releasably attached to the shaft member 240 by means of QD bushing 234. The shaft member 240 extends from a first end 241 at which the rotatable multi head scraper unit 210, 210' is arranged, to a second end 242 at which the shaft member 240 connects to a rotation actuator 202, which will be described in detail later.

Figure 8A:
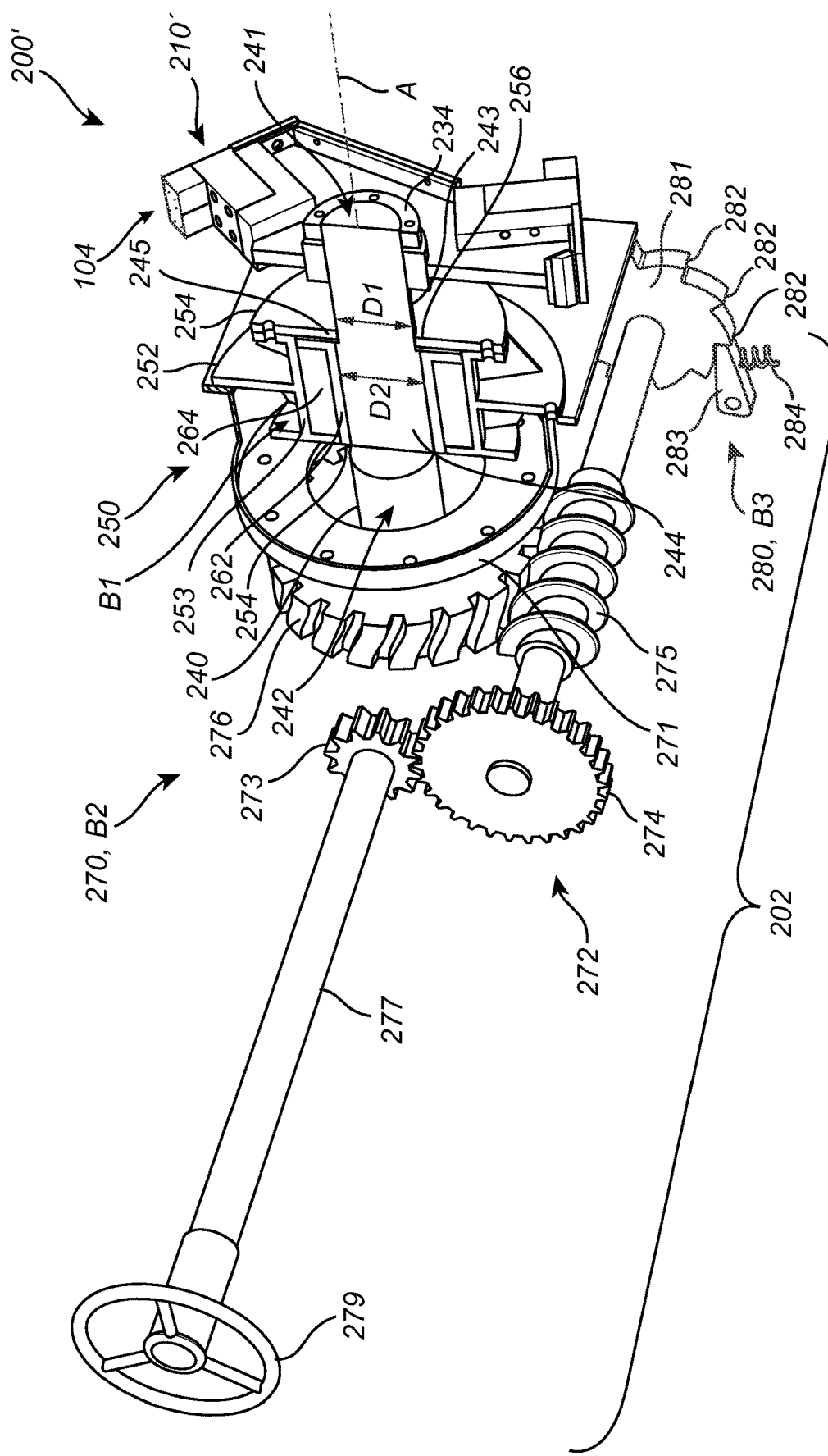
FIG. 8A is a perspective view with a partial cut-through of a scraper device carrying the rotatable multi head scraper unit of FIG. 4 according to an embodiment of the disclosure.
Figure 8B:
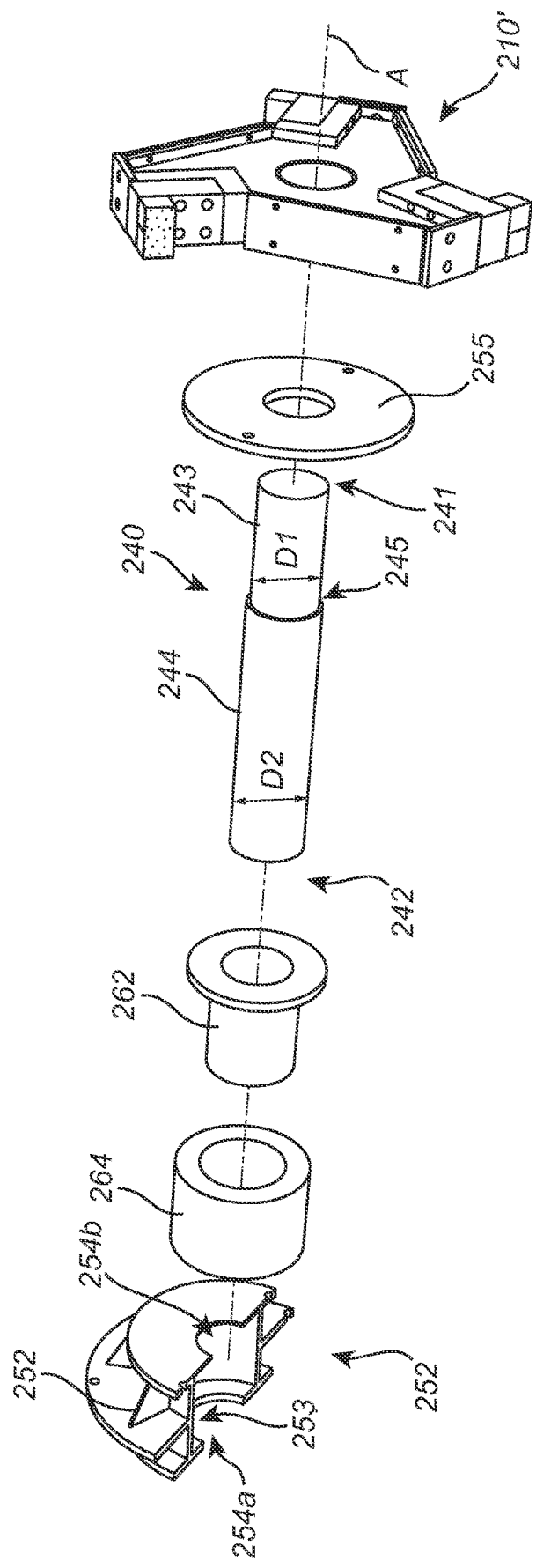
FIG. 8B is an exploded perspective view of parts of the scraper device and rotatable multi head scraper unit of FIG. 8A.
Figure 9A:
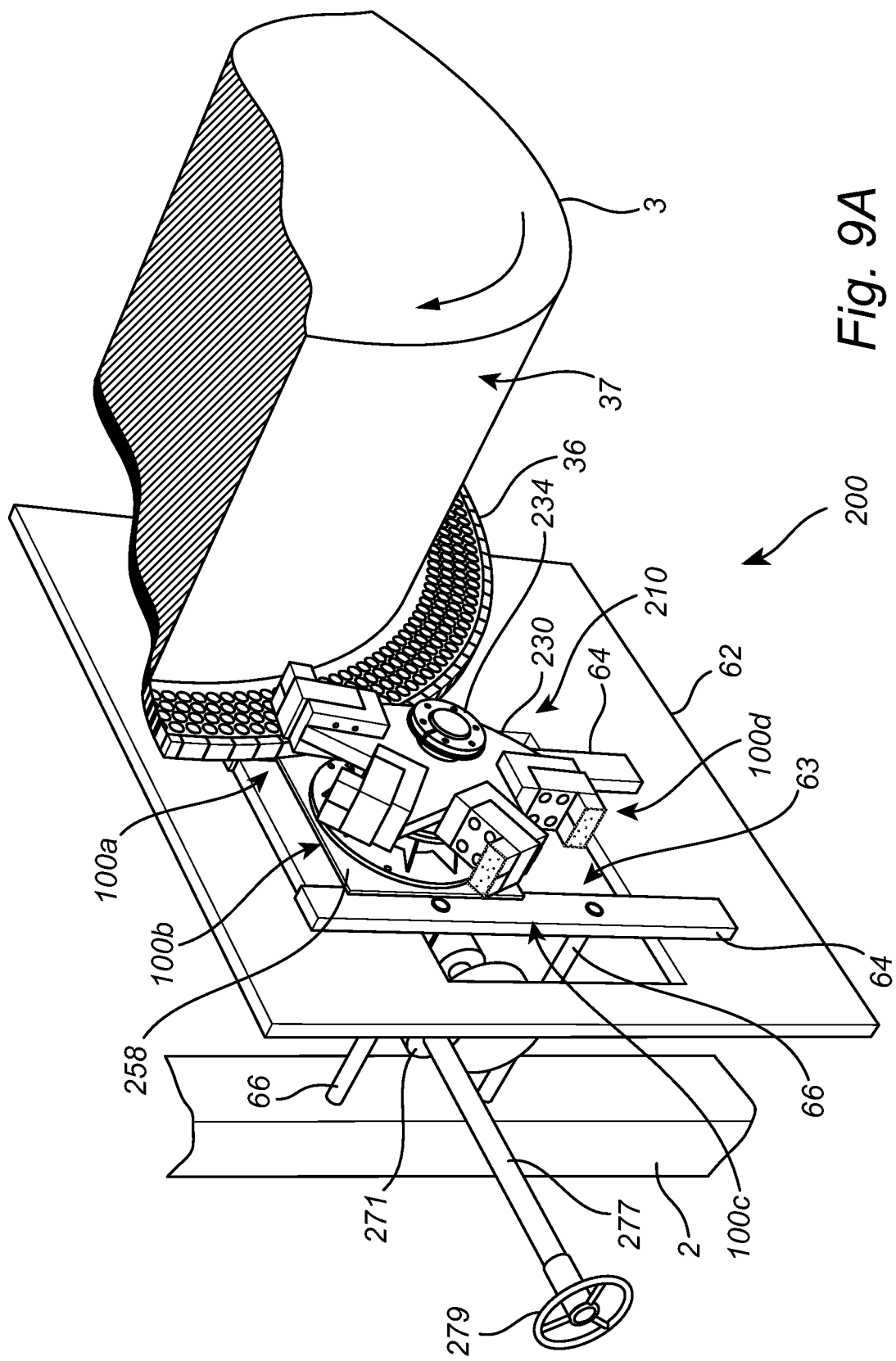
FIG. 9A is a perspective view of the scraper device of FIG. 8A but here instead carrying the rotatable multi head scraper unit of FIG. 5 according to another embodiment of the disclosure.

As illustrated in FIGS. 8A and B, the shaft member 240 is a stepped shaft. The shaft member 240 has a first shaft portion 243 which connects to the first end 241 and a second shaft portion 244 which connects to the second end 242. The first shaft portion 243 has a first shaft diameter D1 and the second shaft portion 244 has a second shaft diameter D2. The first shaft diameter D1 is smaller than the second shaft diameter D2, and the shaft member 240 presents an annular surface 245 substantially transverse to the rotational axis A at the intersection between the annular surface 245 and the first shaft portion 243. The purpose of the annular surface 245 will be described in what follows.

Figure 9B:
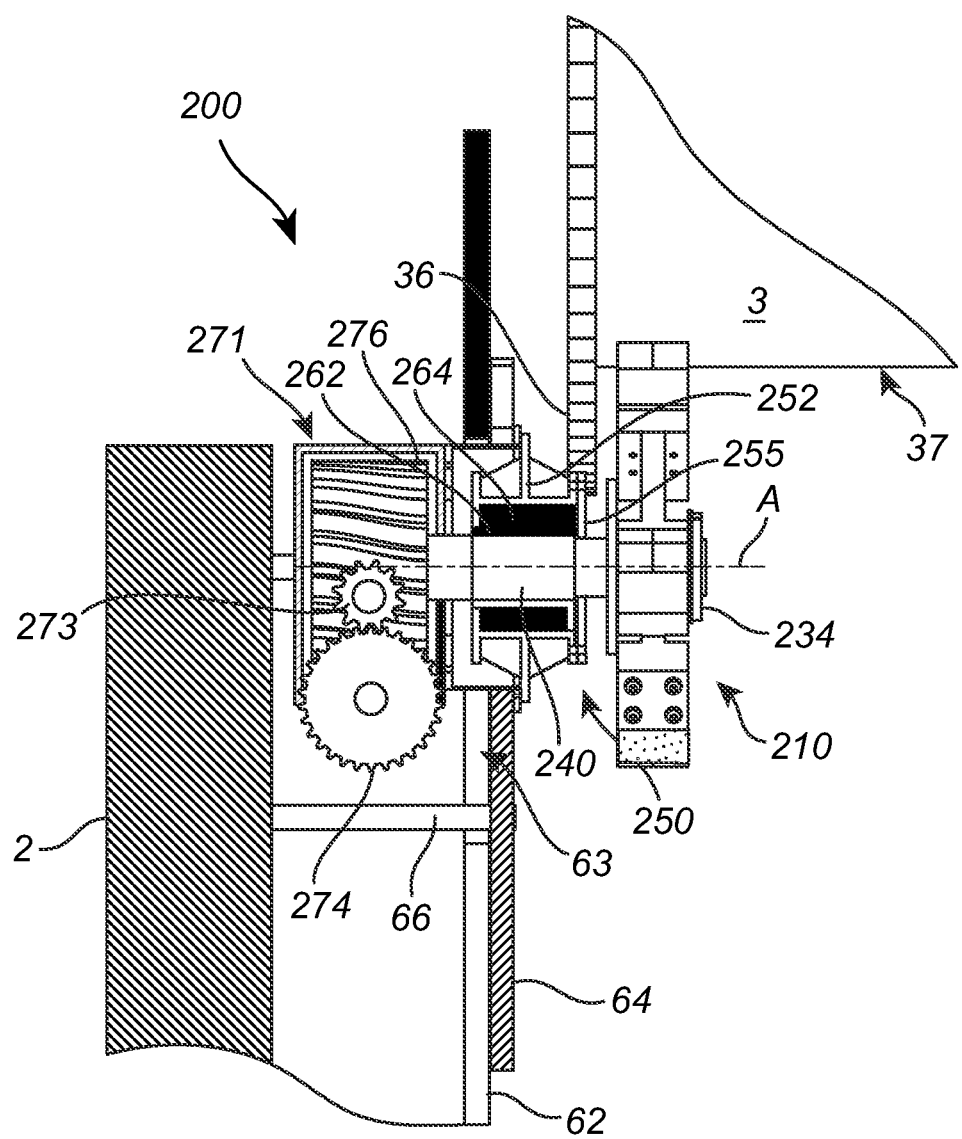
FIG. 9B is a front view with a partial cut-through of the scraper device and rotatable multi head scraper unit of FIG. 9A.

The scraper device 200', 200 further comprises a support arrangement 250 which is arranged to at least partially encircle the shaft member 240 and further arranged to be connected to a frame 2 of the roller crusher 1. The support arrangement 250 comprises a bracket 252 which is mounted onto a mounting plate 258. The mounting plane 258 is in turn connected to support structures 64 which are connected to the frame 2 of the roller crusher 1 by means of support rods 66. (see FIGS. 9A and B). Also seen in FIGS. 9A and 9B is parts of a dust enclosure 62 inside which the rotatable multi head scraper unit 210 is arranged. However, as readily appreciated by the person skilled in the art, the scraper device 200 is not supported by the dust enclosure 62. It extends through an opening 63 of the dust enclosure 62 but is fully supported by the frame 2.

The bracket 252 has through-holes 254 on opposite sides thereof, through which through-holes 254 the shaft member 240 extends. The bracket 252 presents an interior space in which is housed a first brake arrangement B1 configured to prevent and/or restrict rotation of the rotatable multi head scraper unit 210 during scraping operation by exerting a radially inwardly directed pressure onto the shaft member 240. The first brake arrangement B1 comprises a friction element 262 arranged to encircle the second shaft portion 244 of the shaft member 240 so as to be in abutment therewith. The first brake arrangement B1 further comprises a supporting element 264 which is made from an elastomeric material, such as rubber or polyurethane. The supporting element 264 encircles the friction element 262 and is arranged within a supporting structure 253 which for the example embodiment forms a part of the bracket 252. The supporting structure 253 at least partially encloses the supporting element 264 and thereby serves to spatially constrain the supporting element 264 radially outwardly and axially in the direction towards the gear box 270. The supporting element 264 is compressed from the outside by tightening bracket cap 255 to the bracket 252. This compression of the supporting element 264 will affect its elastomeric material such that it expands in other directions, i.e. axially towards the gear box 270, radially outwardly and radially inwardly towards the friction element 262. Since any expansion directed axially and radially outwardly is effectively prevented by the support structure 253, the net result will be that the supporting element 264 compresses the friction element 262 which in turn exerts a pressure onto the shaft member 240. As readily appreciated by the person skilled in the art, this will create a latent rotational resistance or damping in the mechanical system, thereby providing the first brake arrangement B1. Finally, the bracket cap 255 has a trough-hole 256 which has a smaller diameter than the diameter of the adjacently disposed through-hole 254b of the bracket 252. The diameter of the through-hole 256 is selected to match the first shaft diameter D1 of the first shaft portion 243, whereas the through-holes 254a and 254b are selected to match the second shaft diameter D2 of the second shaft portion 244. Importantly, the diameter of the through hole 256 is smaller than the second shaft diameter D2. This allows using the bracket cap 255 for retraining the shaft member 240 within the support arrangement 250 (and thereby on a roller crusher) when tightening the bracket cap 255 with respect to the bracket 252 (the shaft member 240 is retained from the opposite side by a gear box 270 which will be described in what follows).

The rotation actuator 202 comprises a gear box 270 and a maneuvering wheel 279. The maneuvering wheel 279 is attached to a drive shaft 277 of the gear box 270 and is used to supply kinetic energy in the form of rotational motion to the scraper device 200 for rotating the rotatable multi head scraper unit 210 when there is a need to exchange a worn-out scraper (such as e.g. the front-in-line scraper 100a) to a next-in-line scraper (in the example: the scraper 100b). The gear box 270 comprises a gear train 272 which mechanically interconnects the drive shaft 277 with the shaft member 240. The gear box 270 further comprises a housing 271 which supports the gear train and protects the same from foreign objects which may risk damaging the gear train 272. The housing 271 is only partly shown in FIG. 8A to enhance clarity but is illustrated also in FIGS. 9A and B. The drive train 272 comprises a drive gear 273 attached to drive shaft 277. The drive gear 273 engages first idler gear 274 which has a gear diameter being larger than the gear diameter of the drive gear 273, thereby providing a gear ratio larger than one. The first idler gear 274 is arranged on idler shaft 278 at a first end thereof and a second idler gear 275 is arranged on idler shaft 278 at a second end thereof. As illustrated in FIG. 8A, the second idler gear 275 is a worm, or sometimes: worm screw, which is a gear in the form of a screw. The second idler gear 275 engages the driven gear 276 which connects to the shaft member 240. The driven gear 276 is a worm wheel which meshes with the worm. The second idler gear 275 and the driven gear 276 are sometimes together referred to as a worm drive. A purpose of providing a worm drive in the gear box 270 is twofold: Firstly, the worm drive will allow altering the rotational axis 90 degree with respect to the shaft member 240, which may be beneficial for some applications due to e.g. space constrains. Secondly, the worm drive provides a relatively large gear ratio, which also may be beneficial as will be explained in what follows.

The (overall) gear ratio of the gear train 272 is defined as the ratio between the number of rotations of the drive gear 273 and the number of rotations of the driven gear 276. This implies that a gear ratio larger than 1 will allow a larger number of revolutions caused by applying a lower torque to the drive gear 273 to be transformed into a lower number of revolutions with a higher torque on the driven gear 276. A gear box 270 having a gear train 272 with a gear ratio larger than 1 may be beneficial for several reasons. Firstly, as previously mentioned, it provides a means for transforming a low-torque rotation to a high torque rotation. This may be advantageous as it allows to maneuver the rotatable multi head scraper unit 210 manually by hand, in the example embodiment by means of the maneuvering wheel 279. However, the gear box 270 of the scraper device 200 also serves another function: it constitutes a brake arrangement, termed herein as the second brake arrangement B2. As readily appreciated by the person skilled in the art, any gear box will provide some degree of braking, in the sense of preventing and/or restricting rotation. This function arises as a result from frictional forces and inertial forces in the drive train. However, the ability of the gear train to function as a brake increases with increasing gear ratio (which is why we tend to use the reverse gear or the first gear after having parked our cars, the reverse gear and first gear having the largest gear ratio). In other words, the gear ratio will affect the level of brake power that the gear box 270 may provide to the rotatable multi head scraper unit 210. Specifically, the brake power will increase with increasing gear ratio of the gear train 272.

Turning again to FIG. 8A which illustrates these features most clearly, the scraper device 200', 200 may further comprise a third brake arrangement B3 in the form of a ratchet arrangement 280. The ratchet arrangement 280 is disposed at an end of the idler shaft 278 and comprises a ratchet wheel 281 attached to the idler shaft 278, and a pawl 283 which is pivotably arranged in the gear box 270. The pawl 283 is biased towards the ratchet wheel 281 by means of a spring 284. The ratchet wheel 281 comprises a plurality of teeth 282 which are asymmetrical with each tooth having a moderate slope on one edge and a much steeper slope on the other edge. When the teeth 282 move in the opposite (backward) direction, the pawl 283 will catch against the steeply sloped edge of the first tooth 282 it encounters, thereby locking it against the tooth 282 and preventing any further motion in that direction.

Figure 10:
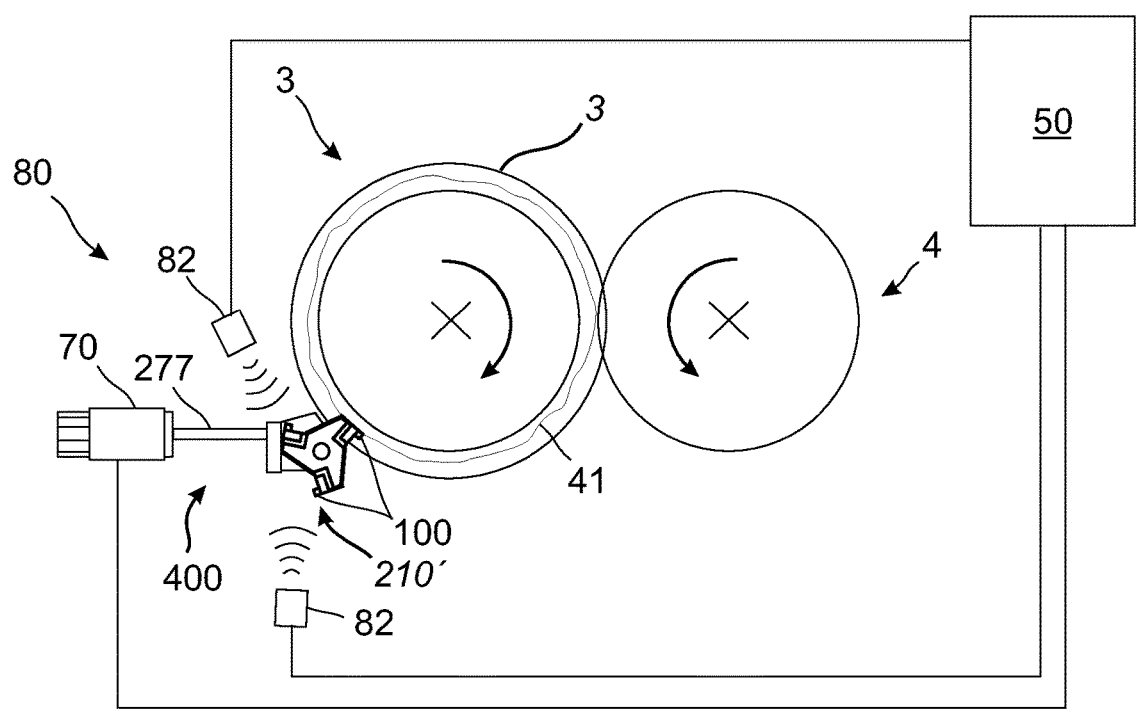
FIG. 10 is a schematic side view of parts of a roller crusher, a scraper device and a sensor system for monitoring the condition of the scraper device according to an example embodiment of the disclosure.

FIG. 10 illustrates a sensor system 80 for a roller crusher 1 used together with a scraper device 400 according to an example embodiment of the disclosure. The scraper device 400 is similar to the scraper device 200' of FIG. 8A but differs in that it further comprises a drive unit 70, in the form of an electrical motor. The drive unit 70 is attached to the drive shaft 277 replacing the manually operated manoeuvring wheel 279 of the scraper device 200'. The sensor system 80 comprises sensors 82 for monitoring the condition of the scraper device 400, and a control unit 50 operatively connected to the sensor system 80 and to the drive unit 70. The sensor system 80 monitors the condition of the rotatable multi head scraper unit 210' from two sides, as illustrated in FIG. 10. The sensors 82 may comprise e.g. optical sensors, such as e.g. laser-based optical sensors. The sensors 82 may alternatively or additionally comprise non-optical sensors such as e.g. microwave sensors, radar sensors or any other non-optical sensors suitable for the task. This is advantageous as it allows to automatically determine when there is a need for exchanging a worn-out scraper 100. It is contemplated that this exchange operation is available during operation of the roller crusher 1, hence removing a need for a roller crusher shut down. Moreover, the sensor system 80 may allow for an improved prediction as to when the roller crusher 1 has to be shut down for a replacement of a completely worn out rotatable multi head scraper unit 210'. For example, the sensor system 80 may be configured to determine how many scrapers 100 of the at least two scrapers are still available for scraping.

Finally, an aspect of the scraper devices of the disclosure will be described in detail with reference to FIG. 11, which illustrates the rotatable multi head scraper unit 210' and the roller 3 of FIG. 4. The particular roller and/or rotatable multi head scraper unit is not essential for this aspect, and this should be construed as an example embodiment only. An intrinsic advantage of the scraper device of the disclosure is that the rotatable multi-head scraper unit allows for adjusting a distance between the scraper which performs a scraping operation, i.e. the operating scraper, and the envelope surface of the roller by adjusting the angular position of the rotatable multi-head scraper unit. This built-in adjustment ability of the scraper device may allow adjusting the thickness of the build-up material allowed to remain on the envelope surface of the roller. It may also remove the need to mount all scrapers to the rotatable multi head scraper to have the same radial distance from the rotational axis. Furthermore, it may allow compensating for scraper wear, as will be explained in what follows.

Figure 11:
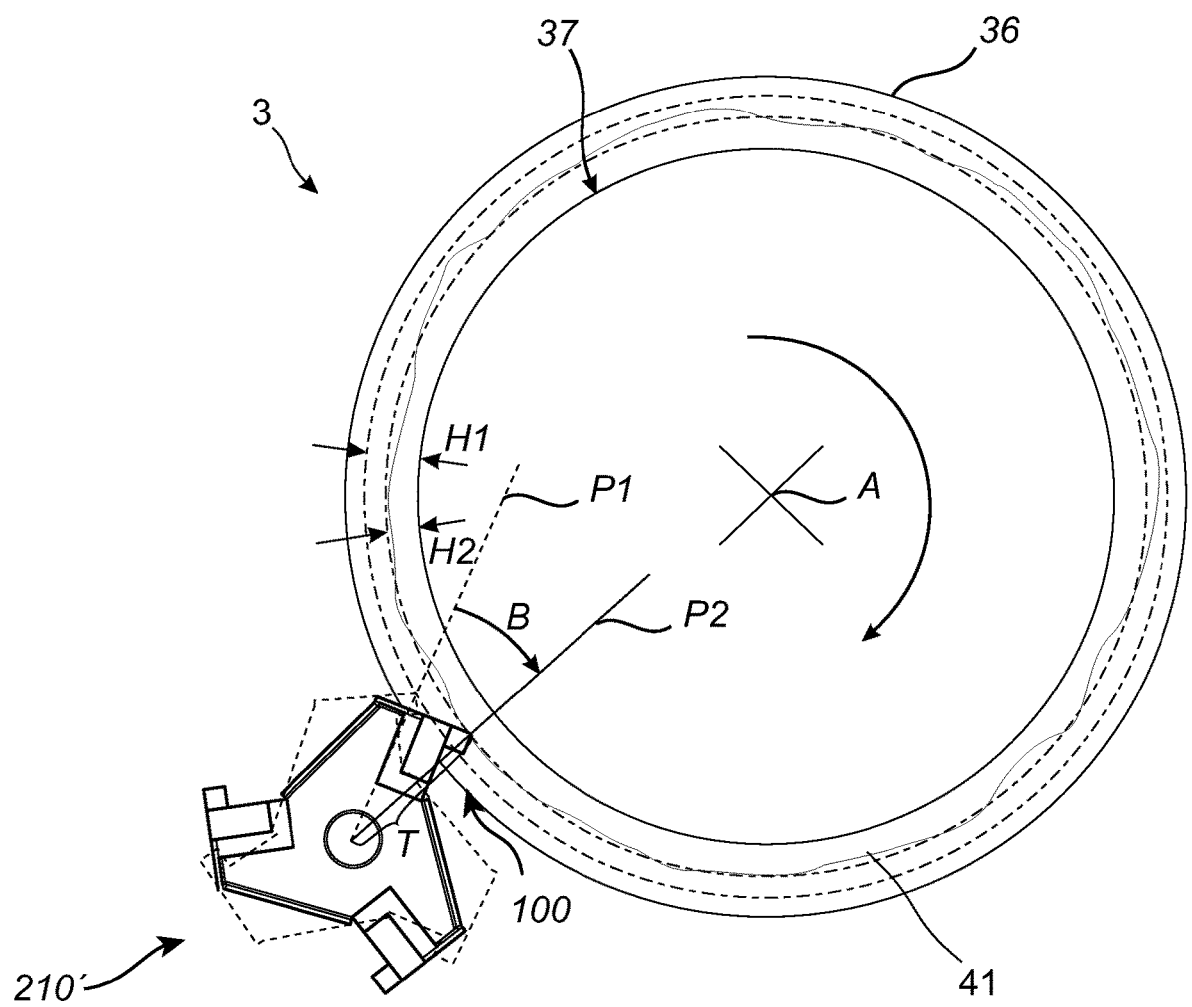
FIG. 11 is a schematic side view of a rotatable multi head scraper arranged in two different operating positions with respect to a roller according to an embodiment of the disclosure.

Scrapers, such as the scraper 100 illustrated in FIG. 11, will be exposed to wear during scraping operation. Therefore, the radial extension T of the scraper 100, i.e. the radial distance from the rotational axis A of the rotatable multi-head scraper unit 210', will gradually decrease during the life of the scraper 100. This will result in the build-up material 41 at the flange 36 to become gradually thicker with time. In other words, even if the operating scraper 100 is continuously performing an efficient scraping of build-up material 41, the scraping operation as such will not be consistent in time. By adjusting the angular position of the rotatable multi-head scraper unit 210', the operating scraper 100 may be moved to a position which is closer to the enveloped surface 37, thereby compensating for the effect of wear on the radial extension T of the scraper 100.

This is illustrated in FIG. 11 by two different operation positions P1 and P2, respectively. When the scraper 100 is first positioned in an operating position, i.e. when the rotatable multi head scraper unit 210' is selectively rotated to arrange scraper 100 to come into contact with build-up material 41, the scraper 100 is arranged at the distance H1 from the envelope surface 37 of the roller 3. This is illustrated in FIG. 11 as a first operating position P1 (indicated by line P1 defining the angular position of the scraper 100 in dashed contour). When the scraper 100 has been partially worn during operation (not shown), the rotatable multi head scraper unit 210' is selectively rotated by the angle β to a second operating position P2 at which the scraper 100 is instead arranged at a distance H2 from the envelope surface 37 of the roller 3, as defined in un-worn state of the scraper 100. It is stressed that the distances H1 and H2 are here defined for an un-worn scraper 100. As readily appreciated by the person skilled in the art, the scraper 100 will not reach the distance H2 in the second operation position P2 if being worn. Instead, the scraper 100 may in its worn state e.g. reach the distance H1, or close to the distance H1, also in the second operating position P2.

Figure 12A:
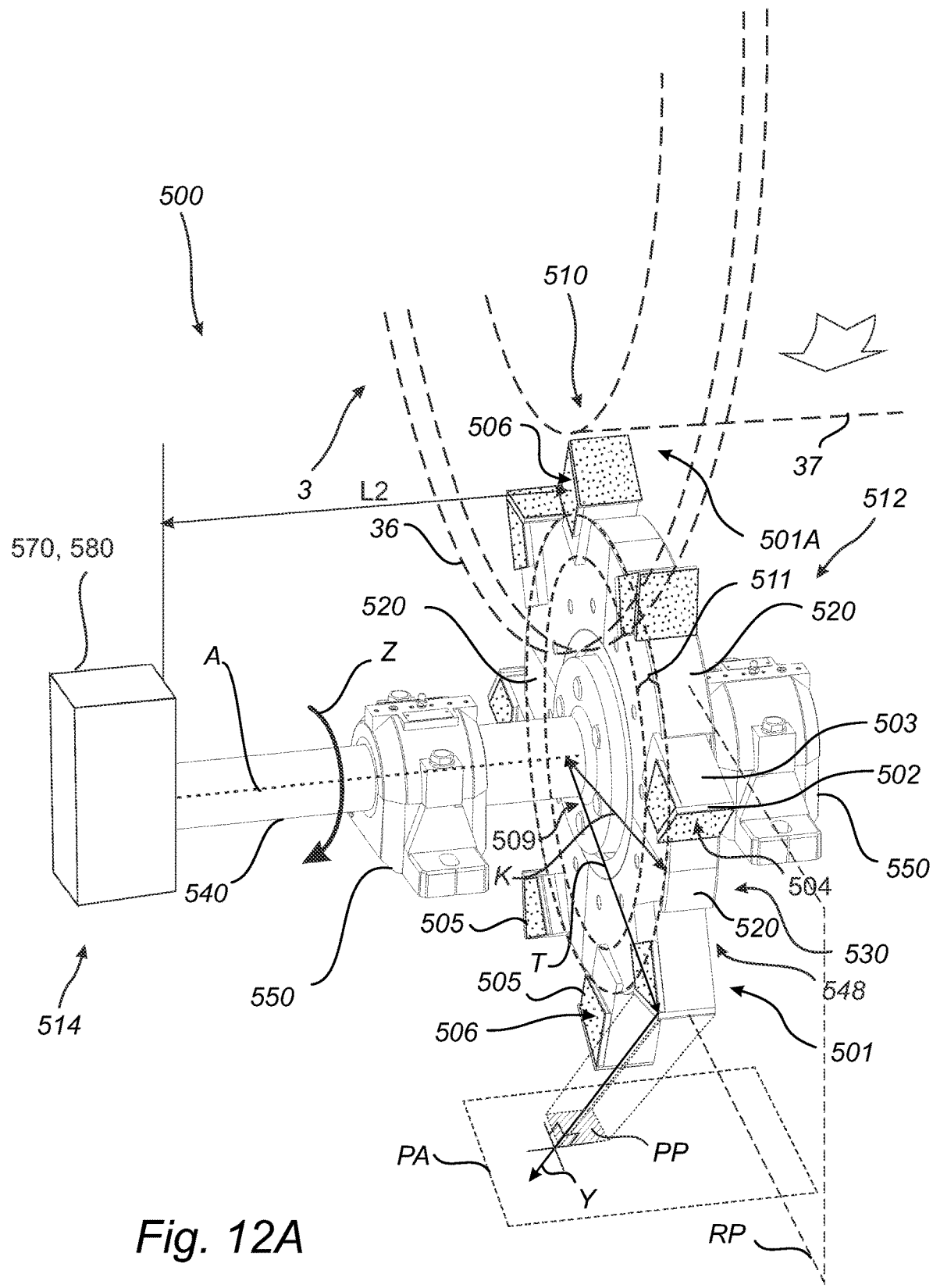
FIG. 12A is a perspective view of parts of a scraper device according to another embodiment of the disclosure.

FIG. 12A illustrates parts of a scraper device 500 according to another example embodiment. The scraper device 500 comprises a rotatable multi head scraper unit 510. The rotatable multi head scraper unit 510, which is also illustrated in isolation in FIG. 12B, has at least two scrapers 501 (for this particular example embodiment: eight scrapers 501) arranged tangentially about the rotatable multi head scraper unit 510 at a respective radial distance T from a rotational axis A of the rotatable multi head scraper unit 510. For the example embodiment, the scrapers 501 are mutually equidistantly spaced at 45 degrees from each other. In other words, for this non-limiting example embodiment, the rotatable multi head scraper unit 510 is symmetric. As illustrated in FIGS. 12A and 13B, a periphery 548 of the rotatable multi head scraper unit 510, as seen between a pair of adjacent scrapers 501 of the two or more scrapers 501, has a radial extension K being at least 20 mm smaller than a smallest radial distance T of the pair of adjacent scrapers 501. For the example embodiment illustrated in FIG. 12A, the radial distance T is the same for all eight scrapers 501, and thus the smallest radial distance will be the radial distance T defined in FIG. 12A. The rotatable multi head scraper unit 510 has an annular engagement portion 511 and each scraper 501 is arranged to the annular engagement portion 511. Each scraper 501 may be attached to the annular engagement portion 511 by bolting, or screwing, or clamping, or the like. The rotatable multi head scraper unit 510 comprises a spider 530 which is attached to a rotationally arranged shaft member 540 which in turn is rotationally attached to a part of a roller crusher via support structures, or brackets, 550.

The scraper device 500 further comprises a rotation actuator 580 arranged to selectively rotate the rotatable multi head scraper unit 510 to allow operative use of one of the at least two scrapers 501 at a time. The rotation actuator 580 is only schematically illustrated in FIG. 12A. The rotation actuator 580 may for example be the rotation actuator 202 which was previously described with reference to FIG. 8A but may alternatively be different. Alternative embodiments of the rotation actuator will be described later. The scraper device 500 further comprises at least one brake arrangement 570 configured to prevent and/or restrict rotation of the rotatable multi head scraper 510 unit during operation of the one of the at least two scrapers 501. The at least one brake arrangement 570 is only schematically indicated in FIG. 12A. The at least one brake arrangement 570 may be similar to the at least one brake arrangement B1, B2, B3 which was previously described with reference to FIG. 8A but may alternatively be different. Alternative embodiments of the at least one brake arrangement 570 will be described later.

As illustrated in FIG. 12A, the rotatable multi head scraper unit 510 is arranged at a first end 512 of the scraper device 500, and the rotation actuator 580 is arranged at a second 514, opposite, end of the scraper device 500. The rotatable multi head scraper unit 510 extends in a reference plane RP which is orthogonal to the rotational axis A. As will be apparent when viewing the drawings, the reference plane RP is indicated at different axial positions for different figures. This has been made to make it easier to understand the geometrical shape of the scrapers. However, the reference plane RP is always orthogonal to the rotational axis A.

Figure 12B:
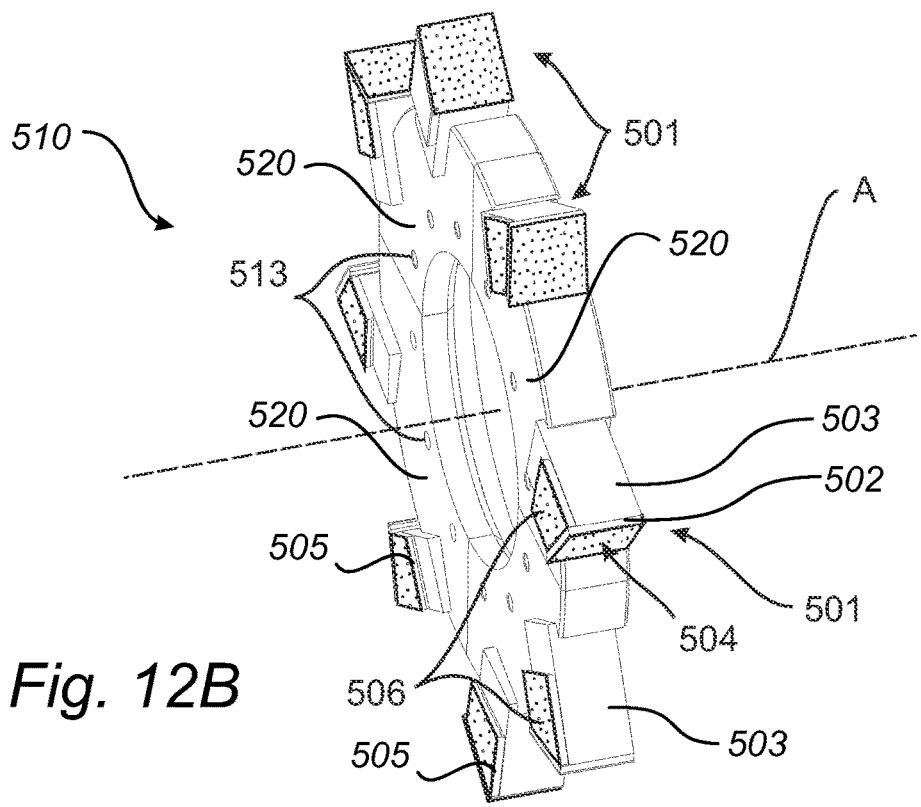
FIG. 12B is a perspective view of the rotatable multi head scraper unit of the scraper device of FIG. 12A.
Figure 12C:
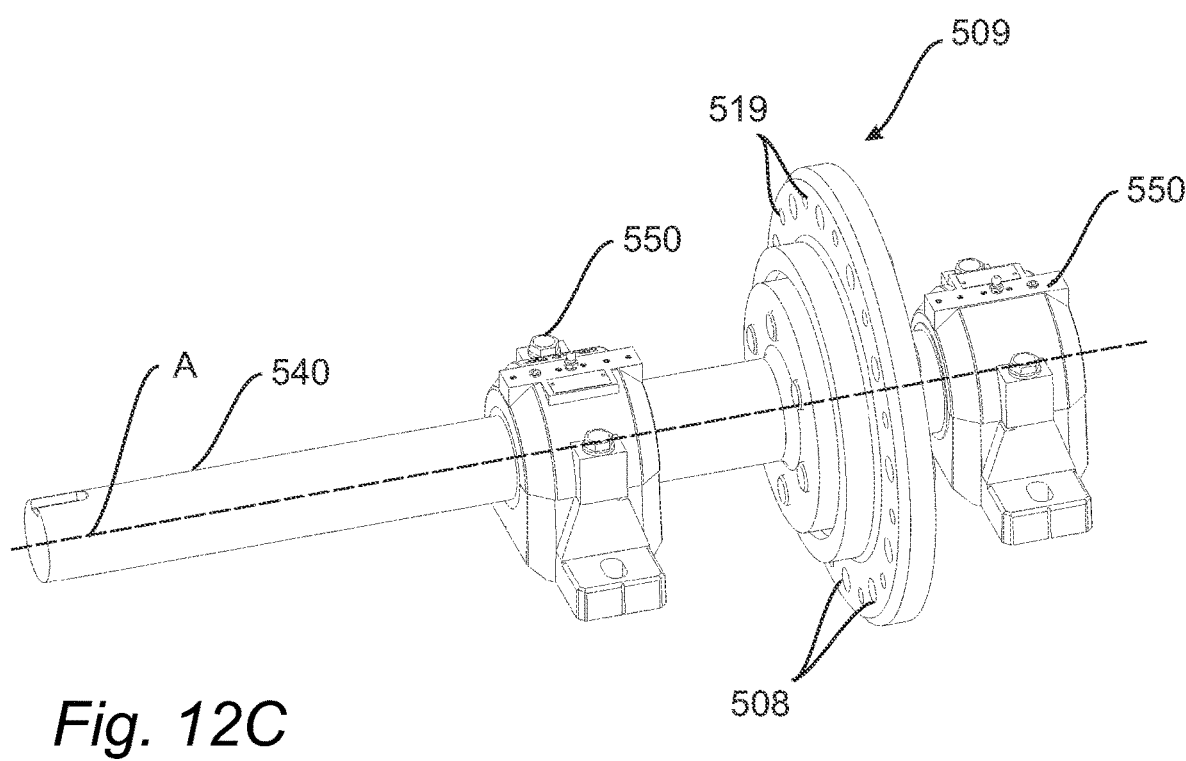
FIG. 12C is a perspective view of the scraper device of FIG. 12A where the rotatable multi head scraper unit is omitted.

As can be seen in FIGS. 12A to 12C, the spider 530 of the rotatable multi head scraper unit 510 comprises a main support structure 509 and at least two scraper support structures 520 (in the example embodiment: four scraper support structures 520). The scraper support structures 520 are releasably arranged with respect to the main support structure 509 and shaped as ring sectors which together form a ring. The releasable attachment may be realized by bolting the elements together by means of fastening bolts 518 entering through-holes 513 and being secured into threaded holes 508. The fastening bolts 518 are not visible in FIG. 12A but can be seen in FIG. 19 which illustrates another example embodiment of the rotatable multi head scraper unit which is mounted on the main support structure 509 of FIG. 12C. As illustrated in FIG. 12A, the ring presents the annular engagement portion 511. The purpose of providing two or more scraper support structures 520 is that it allows them to be individually replaced on site without having to completely dismantle the scraper device 500. There are many conceivable ways to provide scraper support structures within the scope of the disclosure. They may occur in different numbers, have different shapes, and support various numbers of scrapers. The scraper support structure 520 has a 90-degree circular ring sector design, and therefore four scraper support structures 520 are needed to completely encircle the main support structure 509 to form the annular engagement portion 511.

Each scraper 501 comprises a scraper main body 503 and a scraping element 502 which has a scraping surface 504 indicated in FIGS. 12A and 12B as dotted areas. The scraping elements 502 of the scrapers 501 has a scraping surface 504 which comprises a polycrystalline diamond (PCD).

As readily appreciated by the person skilled in the art, diamond can be one single, continuous crystal or it can be made up of many smaller crystals (polycrystal). Large, clear and transparent single-crystal diamonds are typically used as gemstones. Polycrystalline diamond (PCD) consists of numerous small grains, which are easily seen by the naked eye through strong light absorption and scattering; it is unsuitable for gems and is instead used for industrial applications such as mining and cutting tools. Polycrystalline diamond is often described by the average size (or grain size) of the crystals that make it up. Grain sizes range from nanometres to hundreds of micrometres, usually referred to as "nanocrystalline" and "microcrystalline" diamond, respectively.

For the scraper 501, the scraping element 502 further comprises a wear resistant material in which the polycrystalline diamond (PCD) is at least partly embedded. The polycrystalline diamond (PCD) may in an alternative embodiment be attached to a surface of a wear resistant material of the scraping element 502. For the example embodiment, the wear resistant material is a cemented carbide comprising Tungsten carbide and, as a binder, cobalt. The binder content may typically be 10-15 wt %. Other wear resistant materials are conceivable. Such alternative materials include other ceramic materials, such as Titanium carbides or Vanadium carbides; metal ceramics composite materials, such as cemented carbides e.g. Titanium carbide, Tungsten carbide or Vanadium carbide with cobalt as a binder; or metal matrix composite materials comprising Titanium carbide, Tungsten carbide or Vanadium carbide.

In one embodiment, the polycrystalline diamond (PCD) is embedded in Tungsten carbide, Vanadium carbide, or Titanium carbide.

An advantage of the scraping surface 504 comprising the polycrystalline diamond (PCD) is that the wear life of the scraper 501 may be considerably prolonged. Normally such scraping surfaces 504 would comprise wear resistant material such as ceramic or composite materials comprising Tungsten carbide, Titanium carbide, and Vanadium carbide, but with a scraping surface 504 comprising polycrystalline diamond (PCD), the wear life may be prolonged with up to about 50 times in comparison with only comprising e.g. a composite material comprising Tungsten carbide.

The scraping element may comprise a layer of polycrystalline diamond (PCD). The layer of polycrystalline diamond (PCD) may have a thickness of 0.4 to 3.2 mm, or 1.0 to 2.0 mm, or 1.35 to 1.8 mm, or 1.4 to 1.6 mm, or about 1.5 mm. The scraping surface of the scraper element may comprise two or more layers of polycrystalline diamond (PCD). The two or more layers may be attached to each other e.g. by adhesive. The number of layers and/or the thickness of individual layers may depend on grain size and/or the application for which it is used.

The diamond grain size of the polycrystalline diamond (PCD) of the scraping surface may be 0.8 to 30 μm, as determined by image analysis using a Scanning Electron Microscope (SEM).

The grain size of diamond may be measured by various measurement techniques, such as laser size analysers or scanning electronic microscopes (SEM). One example of a laser size analyser is a Malvern Particle size analyser equipment which is based on laser diffraction. The values determined using the laser size analyser may be the initial diamond grain size that for some embodiments may later be subjected to High Pressure High Temperature Sintering. When the diamond particles have been sintered and compacted to form the polycrystalline diamond (PCD) of the scraping surface, an image analysis by means of scanning electron microscopy is used to determine the end microstructural grain size distribution, i.e. the diamond grain size of the polycrystalline diamond (PCD) of the scraping surface.

In addition to the scraper elements 502, each of the scrapers 501 of the scraper device 500 further comprises scraping elements 505 on a surface 506 facing the rotation actuator 580, which surface 506 comprises a polycrystalline diamond (PCD). The scraping elements 505 may be similar to the scraping elements 502 already described in detail herein. It is also conceivable that the scraping elements 505 are different from the scraping elements 502. For example, the PCD of the scraping elements 502 may have different properties than the PCD of the scraping elements 505. This may be beneficial, since the scraping elements 502 will be facing generally towards the material to be removed and may thus be mostly exposed to material impact, whereas the scraping elements 505 will be oriented such that material will impinge at an angle which makes the scraping elements 505 more prone to sliding wear than impact wear. The rotatable multi head scraper unit 510 is structured and arranged such that each scraping surface 504 at least partly faces in a tangential direction Y defined at the scraper surface 504 and directed along a reference rotational direction Z of the rotatable multi head scraper unit 510. In other words, the scraping surface 504 has a projection PP in a plane PA being orthogonal to said tangential direction Y which projection PP is larger than zero. As readily appreciated by the person skilled in the art, this achieves the effect that when the scraper device 500 is arranged on a roller crusher 1, the scraping surface 504 of the active scraper (i.e. scraper 501A in FIG. 12A) may be arranged such that it at least partially faces the material to be removed. Since each scraper surface 504 is arranged generally in the same manner along the reference rotational direction Z, each of the scraping surfaces 504 may at least partly act as an impact surface when the scraper 501 having said each scraping surface 504 is the active scraper 501A.

Each scraper 501 is releasably fastened to the spider 530 at scraper support structures 520 by bolting. The bolting allows for an easy assembly procedure when preparing a rotatable multi head scraper unit 510 for being mounted on a roller crusher 1. The rotatable multi head scraper unit 510 is attached to a shaft member 540 which is rotatably attached to support arrangement 550. The support arrangement 550 is structured and arranged to be connected to a frame 2 of the roller crusher 1.

Figure 13A:
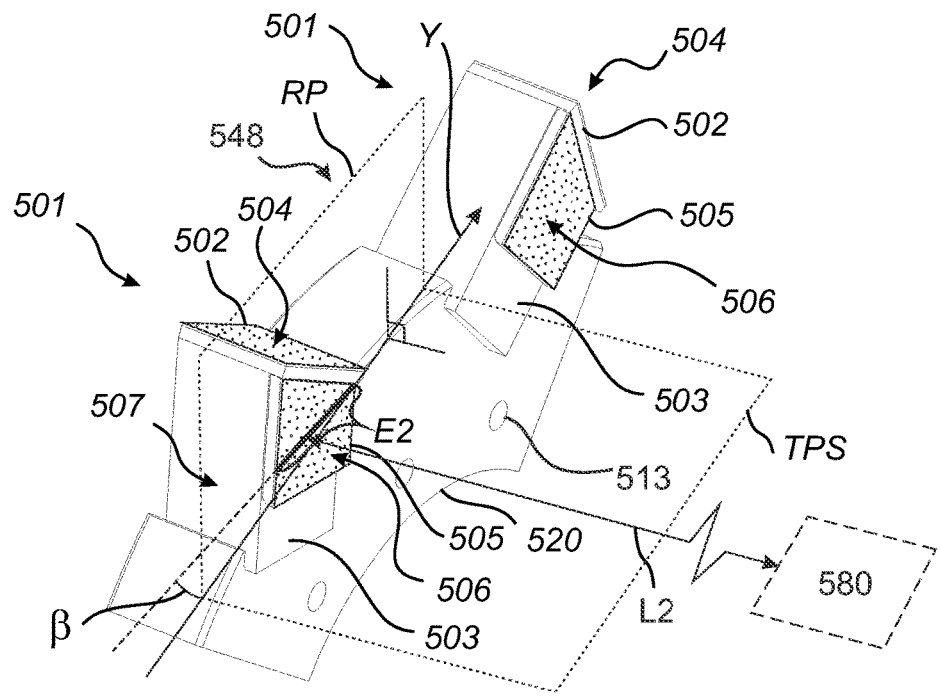
FIG. 13A is a perspective view of a part of the rotatable multi head scraper unit of FIGS. 12A and 12B.
Figure 13B:
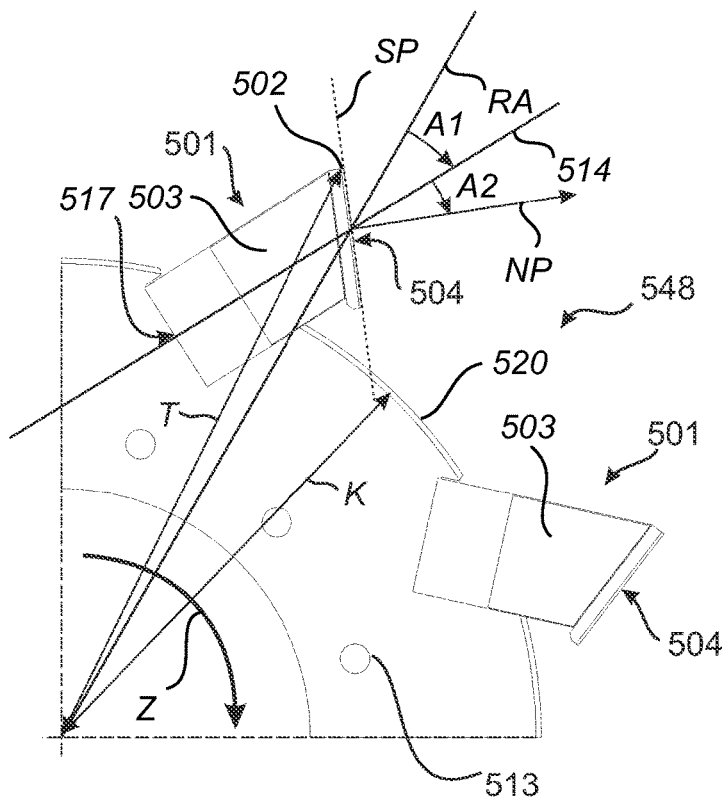
FIG. 13B is a side view of the part of a rotatable multi head scraper unit of FIG. 13A.

As best illustrated in FIG. 13A, which shows the individual scrapers 501 of the scraper device 500 in more detail, the surface 506 that faces the rotation actuator 580 has an extension E2 from the scraping element 502 tangentially towards a rear end 507 thereof. The scraper 501 is structured and arranged such that a distance L2 between the surface 506 that faces the rotation actuator 580 and the rotation actuator 580 decreases towards the scraping element 502 over at least a part of the extension E2. The distance L2 is only schematically indicated in FIG. 13A, by means of the arrow and the dashed square aiming to define the relative location of the rotation actuator 580 with respect to scraper 501. The distance L2 is however more realistically illustrated in FIG. 12A.

For the example embodiment, the surface 506 which faces the rotation actuator 580 is substantially planar. Therefore, the varying distance L2 as described hereinabove may for the scraper 501 be further expressed in terms of an angle β defined between the surface 506 which faces the rotation actuator 580 and the reference plane RP, wherein the angle β is defined within a tangential plane TPS of the scraper 501 which is orthogonal to the reference plane RP. The angle β may be 5 to 25°, or 5 to 20°, or 5 to 15°, or 8 to 12°, or 10°. The angle β, the reference plane RP and the tangential plane TPS of the scraper 501 are illustrated in FIG. 13A.

Figure 13C:
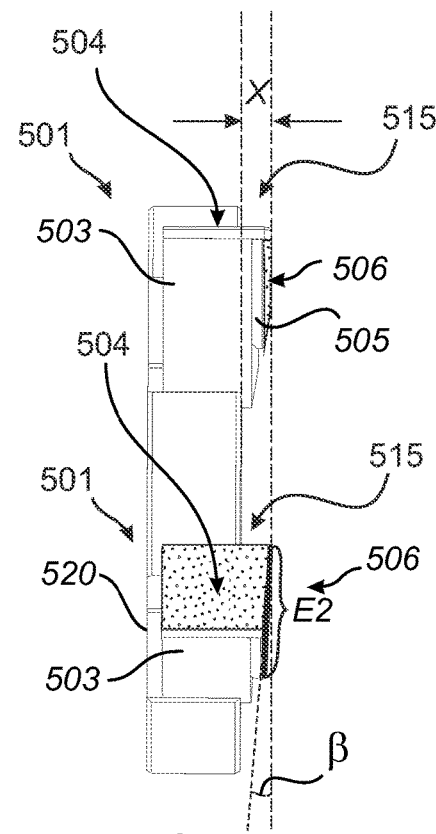
FIG. 13C is a top view of the part of a rotatable multi head scraper unit of FIG. 13A.

As can be seen in FIGS. 13A and 13C, the tangential plane TPS of the scraper 501 is parallel with the tangential direction Y of the scraper 501, as defined at the scraper surface 504 and directed along the reference rotational direction Z of the rotatable multi head scraper unit 510, and which tangential plane TPS is orthogonal to the reference plane RP. Thus, each scraper 501 of the at least two scrapers 501 have an associated tangential plane TPS, which are all angled with respect of each other as a result from the scrapers 501 being arranged tangentially about the rotatable multi head scraper unit 510.

The view in FIG. 13C, as indeed also the view in later FIGS. 14C, 15C, 16C and 17C are taken along the radial axis RA as defined in FIG. 13B.

As best illustrated in FIG. 13B, each scraper 501 extends in the reference plane RP from a bottom end 517, along a scraper axis 514 towards the scraping element 502. The scraper axis 514 forms a first acute angle A1 along the reference rotational direction Z with a radial axis RA of the rotatable multi head scraper unit 510 which radial axis RA intersects with the scraping element 502. As best illustrated in FIG. 12A, this achieves the effect that the scrapers 501 are "forward-leaning" when the scraper device is arranged in the roller crusher 1. Furthermore, each scraping surface 504 extends in a plane SP which has a normal NP which forms an acute angle A2 along the along the reference rotational direction Z with the scraper axis 514. This further aid in turning the scraping surfaces 504 towards the material to be removed when the scraping device is arranged on a roller crusher 1.

As illustrated in FIG. 12A, and in more detail in FIG. 13C, the scrapers 501 are arranged to form axial protrusions 515 on the side of the rotatable multi head scraper unit 510 that faces the rotation actuator 580. As illustrated in FIG. 13C, the protrusions 515 have axial extensions X. The axial extensions may be within the range up to 75 mm, or 5 to 50 mm or, 10 to 40 mm. This particular example embodiment only has protrusions one the side facing the rotation actuator 580 (i.e. the side which will face the flange 36 when the scraper device 500 is mounted on a roller crusher 1). It is however conceivable that the at least two scrapers are arranged to form axial protrusions on one or both sides of the rotatable multi head scraper unit. For example, the rotatable multi head scraper unit 210 illustrated in FIG. 5 has scrapers 100a, 100b 100c which clearly protrudes out from the spider 230 on both sides thereof. An advantage with this is that, upon arranging and operating the scraper device 500 on a roller crusher 1, the material removed will, as soon as it has flown past along the surface 506 of the scraper 501 which faces the rotation actuator 580 (and thereby the flange 36 when mounted on the roller crusher 1), easily be removed via the wider gap between the inner surface 39 of the flange 36 and the remaining part of the rotatable multi head scraper unit 510 (for the example embodiment, the remaining part will be the main support structure 509 and the scraper support structures 520), and flow towards the centre of the roller 3 instead of being squeezed and compacted between the rotatable multi head scraper unit 510 and the inner surface 39 of the flange 36. The scraper device according to the disclosure may be embodied in many different ways. In what follows, a number of alternative embodiments of a scraper assembly will be described in detail with reference to FIGS. 14 to 17. A scraper assembly 600, 700, 800, 900 is here defined as one scraper support structure 620 and its associated scrapers 601, 701, 801, 901. Each of these scraper assemblies 600, 700, 800, 900 may be fastened to the main support structure 509 illustrated in FIG. 12C. Providing the same interface for different scraper assembly versions allows for varying both the number of scrapers on the rotatable multi head scraper unit and the structure and characteristics of the individual scrapers attached to the scraper support structures.

FIGS. 14A to 14E illustrates a scraper assembly 600 according to an alternative embodiment of the disclosure. The scraper assembly 600 includes a scraper support structure 620 and two scrapers 601 connected to each other. The scraper support structure 620 is similar to the previously described scraper support structure 520 in that it has the same interface for attachment to the main support structure 509, and that it has the same 90-degree circle sector form factor. Thus, the scraper support structure 620 provides the same releasable attachment as scraper support structure 520 realized by means of fastening bolts 518 entering through-holes 613 and being secured into threaded holes 508 of the main support structure 509. The scraper support structure 620 also has through openings 614 distributed in between the through-holes 613. The purpose of the through-openings 614 will be described later with reference to FIGS. 19 to 21. Similar to previous example embodiments, the periphery 648 as seen between a pair of adjacent scrapers 601 has a radial extension K being at least 20 mm smaller than a smallest radial distance T of the pair of adjacent scrapers 601 (see FIG. 14B). For the example embodiment, the radial distance T is the same for all eight scrapers 601, and thus the smallest radial distance will be the radial distance T defined in FIG. 14B. The advantage of the above feature is the generally the same as outlined for the first example embodiment in FIG. 4.

Figure 14A:
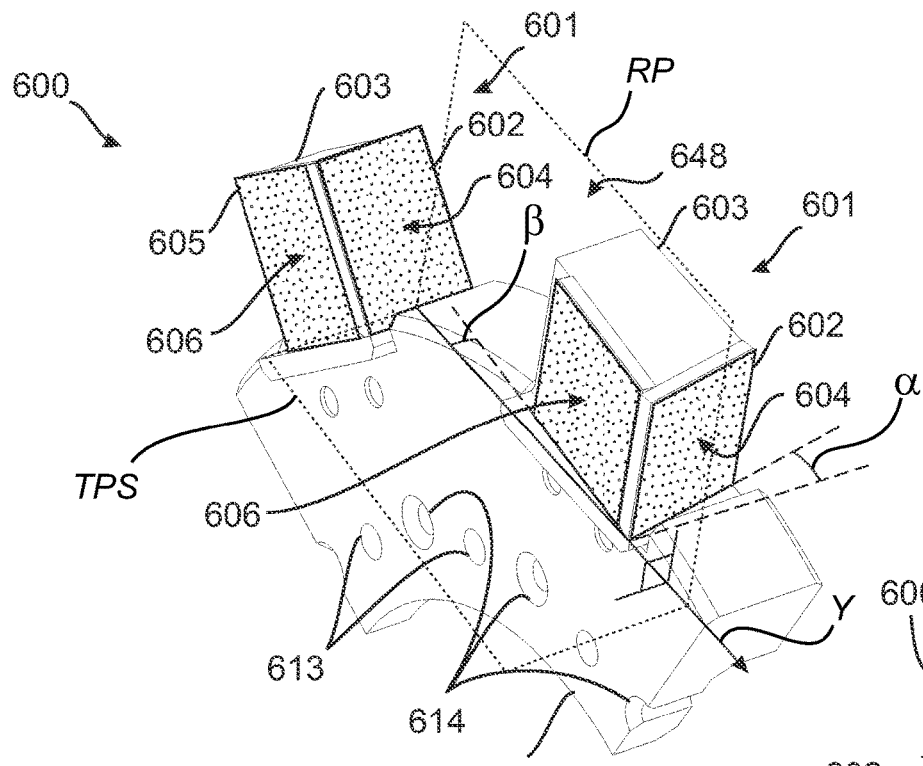
FIG. 14A is a perspective view of a part of a rotatable multi head scraper unit according to another embodiment of the disclosure.
Figure 14B:
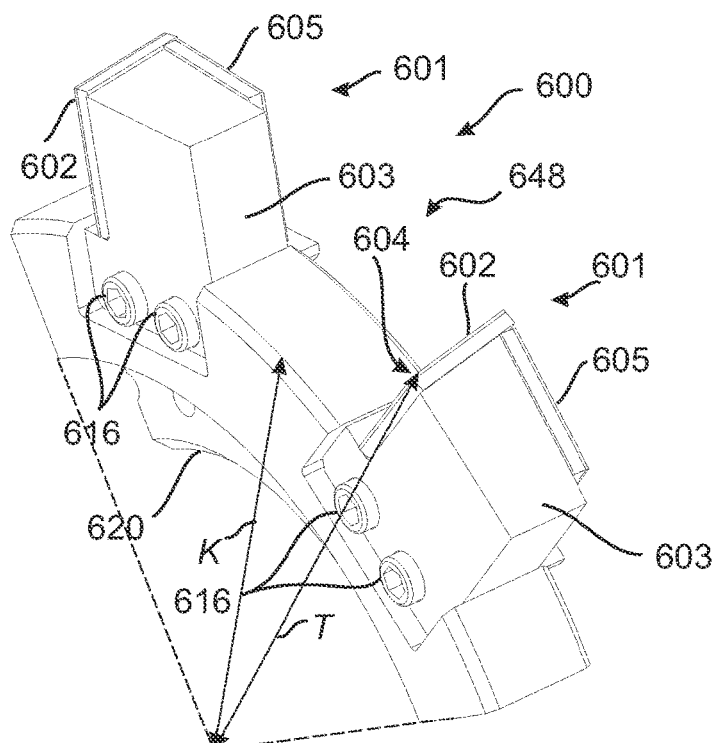
FIG. 14B is a side view of the part of a rotatable multi head scraper unit of FIG. 14A.
Figure 14C:
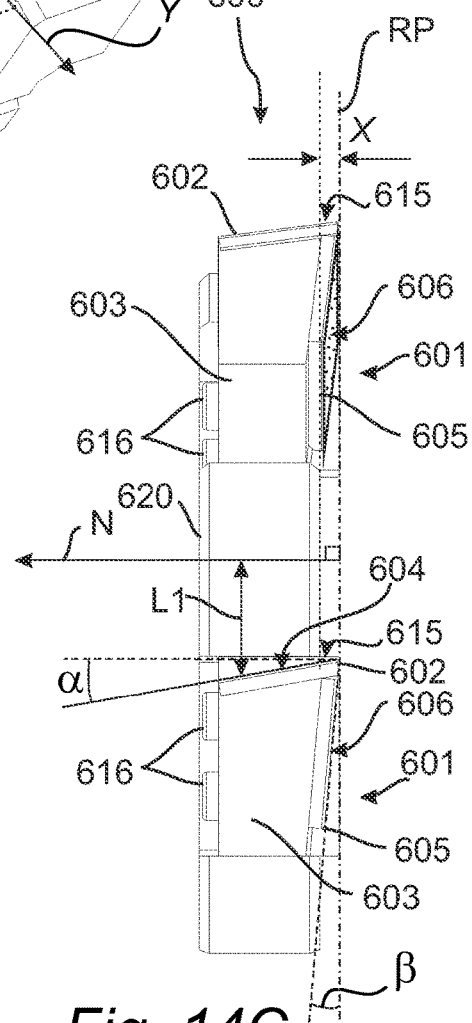
FIG. 14C is a top view of the part of a rotatable multi head scraper unit of FIG. 14A.
Figure 14D:
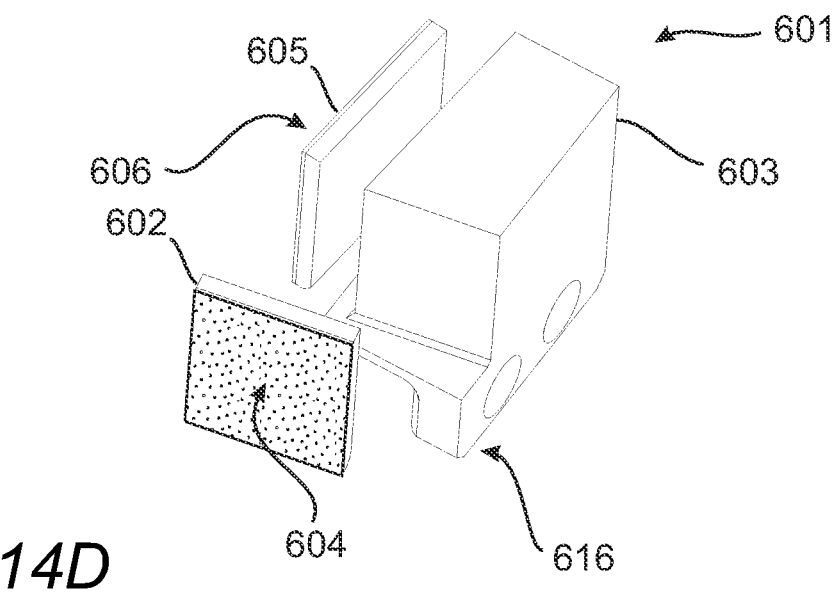
FIG. 14D is an exploded view of a scraper which forms a part of the rotatable multi head scraper unit of FIG. 14A.
Figure 14E:
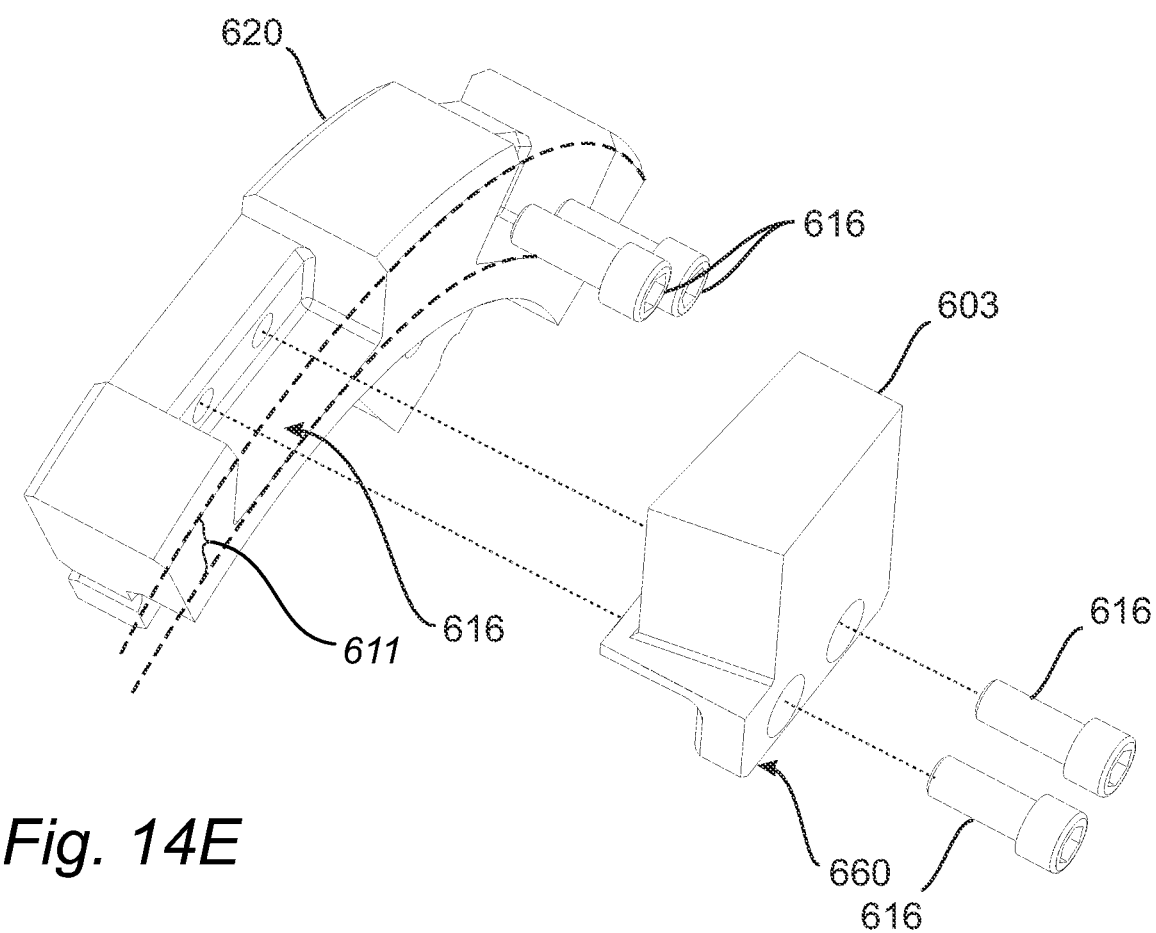
FIG. 14E is an exploded view of a scraper support structure and a scraper main body which forms a part of the rotatable multi head scraper unit of FIG. 14A.

Each scraper 601 is releasably arranged in the annular engagement portion 611 by a geometrical locking engagement. The releasable arrangement of the scrapers 601 on the scraper support structure 620 is best illustrated in FIG. 14E. As can be seen in FIG. 14E, the geometrical locking engagement is at least partly defined by a protruding structure 660 of the scraper 601 being inserted into an associated recess 662 of the annular engagement portion 611, wherein the protruding structure 660 and the associated recess 662 has complementary shapes. The recesses 662 of the annular engagement portion 611 are defined on a side surface of the scraper support structure 620. The protruding structure 660 forms a part of the scraper main body 603, whereas recess 662 forms a part of the scraper support structure 620. The scrapers 601 are releasably attached to the scraper support structure 620 by means of fastening bolts 616 (see FIG. 14E).

Furthermore, the scrapers 601 structurally differs from the scrapers 501. In particular, the scraping surface 604 is not oriented the same way. The scraping surface 604 is arranged to incline in a relation to a normal N of the reference plane RP, as defined in front of the scraping surface 604, and incline such that a distance L1 between the normal N and the scraping surface decreases towards the rotation actuator 580 (i.e. directed to the left in FIG. 14C. Please see FIG. 12A and replace scraper support structures 520 with scraper support structures 620). This particular feature has been described earlier in somewhat different words for one scraper with reference FIG. 3.

For the example embodiment, the scraping surface 604 is substantially planar. Therefore, the varying distance L1 as described hereinabove may for the scraper 601 be further expressed in terms of an angle α defined between the scraping surface 604 and the normal N of the reference plane RP, wherein the angle α is defined within a tangential plane TPS of the scraper 601 which is orthogonal to the reference plane RP. This is illustrated in FIGS. 14A and 14C. This angle α may be 1 to 15°, or 2 to 10°, or 3 to 8°, or 4 to 6°, or 5°.

The scraper 601 shares some features with the already described scraper 501. In particular, the scraper 601 also further comprises scraper elements 605 on a side thereof. The scraper elements 605 comprises a surface 606 which comprises polycrystalline diamond (PCD). The scraper 601 is structured and arranged such that the surface 606 forms an angle β between the surface 606 which faces the rotation actuator 580 and the reference plane RP, wherein the angle β is defined within a tangential plane TPS of the scraper 601 which is orthogonal to the reference plane RP. A yet further similarity is that the scrapers 601 are arranged to form axial protrusions 615 on the side of the rotatable multi head scraper unit. As illustrated in FIG. 14C, the protrusions 615 have axial extensions X. The axial extensions X may be within the range up to 75 mm, or 5 to 50 mm, or 10 to 40 mm. Although the above disclosed ranges are currently preferred, it is contemplated that axial extensions X could also be larger than 75 mm. The axial extension may depend on the roller crusher 1, the operating conditions and the material to be crushed etc. Thus, the axial extension X must be chosen based on parameters such as, but not limited to, the crushing gap G, the size of the crushing rolls 3, 4, and the size of the build-up material 41 to be removed. A bigger material build-up 41 may require a bigger axial extension X.

Figure 15A:
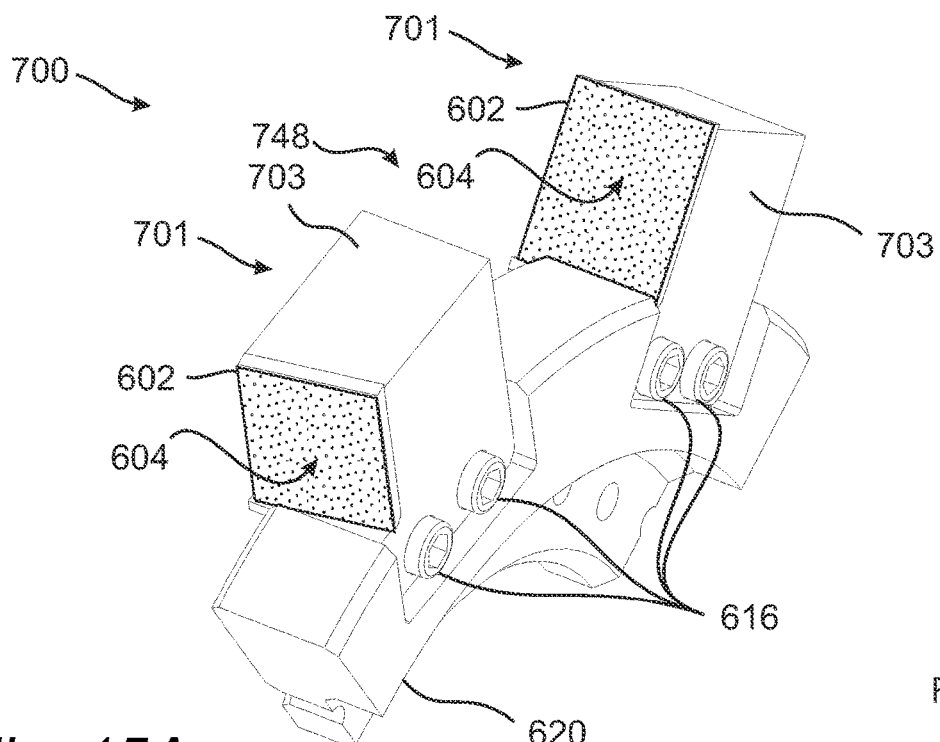
FIG. 15A is a perspective view of a part of a rotatable multi head scraper unit according to another embodiment of the disclosure.
Figure 15B:
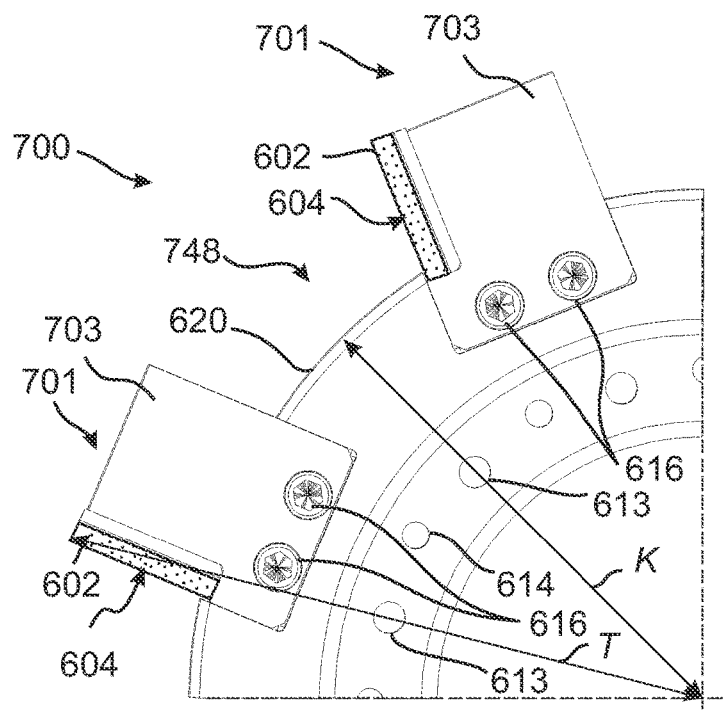
FIG. 15B is a side view of the part of a rotatable multi head scraper unit of FIG. 15A.
Figure 15C:
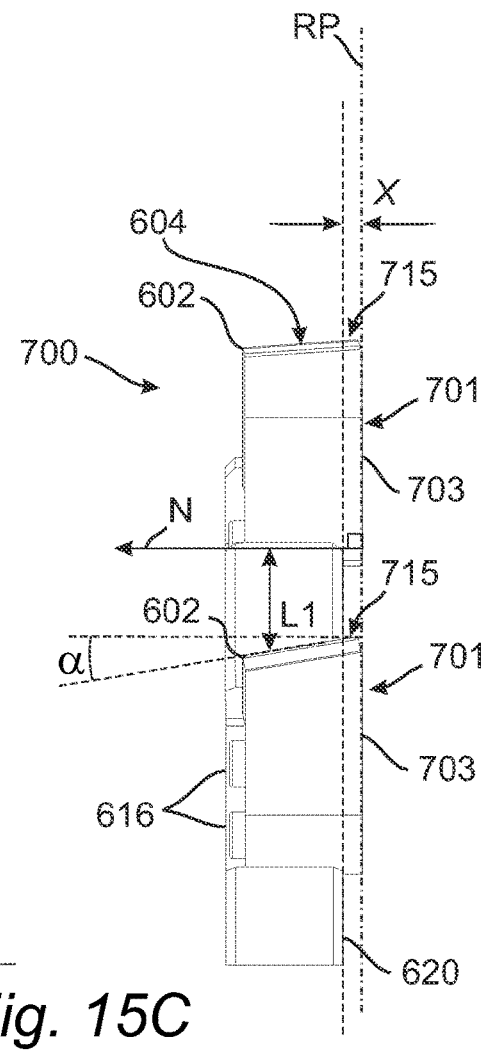
FIG. 15C is a top view of the part of a rotatable multi head scraper unit of FIG. 15A.

FIGS. 15A to 15C illustrate a scraper assembly 700 according to another example embodiment of the disclosure. The scraper assembly 700 is similar to already described scraper assembly 600 and will therefore only be briefly described herein. Like reference characters refer to like elements and have been earlier described herein. The scraper assembly 700 comprises previously described scraper support structure 620 and two scrapers 701. The scrapers 701 differs from the already described scrapers 601 in that they do not have dedicated scraper elements on the side of the scraper main body 703. Furthermore, the scraper 701 does not have the angled side surface, i.e. the angle β=0 (see FIG. 14A). To provide an appropriate form factor, the scraper main body 703 is thus somewhat thicker than the scraper main body 603. The scrapers 701 are arranged to form axial protrusions 715 on the side of the rotatable multi head scraper unit. As illustrated in FIG. 15C, the protrusions 715 have axial extensions X. The axial extensions X may be within the range up to 75 mm, or 5 to 50 mm, or 10 to 40 mm. For the example embodiment of FIG. 15A to C, the axial extension X is 15 mm. Similar to previous example embodiments, the periphery 748 as seen between a pair of adjacent scrapers 701 has a radial extension K being at least 20 mm smaller than a smallest radial distance T of the pair of adjacent scrapers 701 (see FIG. 15B). For the example embodiment, the radial distance T is the same for all eight scrapers 701, and thus the smallest radial distance will be the radial distance T defined in FIG. 15B. The advantage of the above feature is the generally the same as outlined for the first example embodiment in FIG. 4.

Figure 16A:
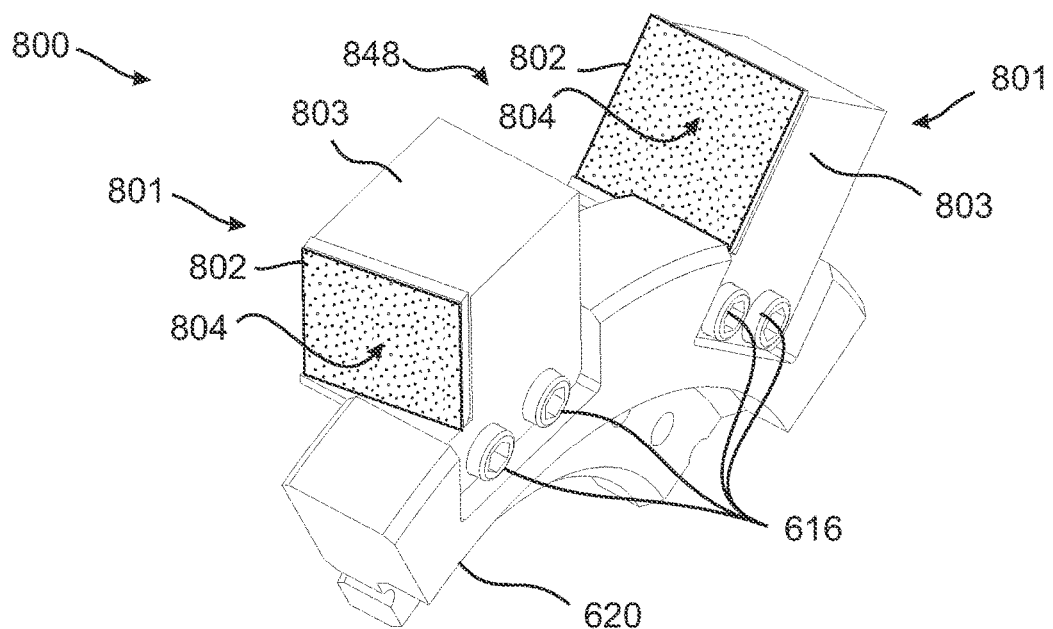
FIG. 16A is a perspective view of a part of a rotatable multi head scraper unit according to another embodiment of the disclosure.
Figure 16B:
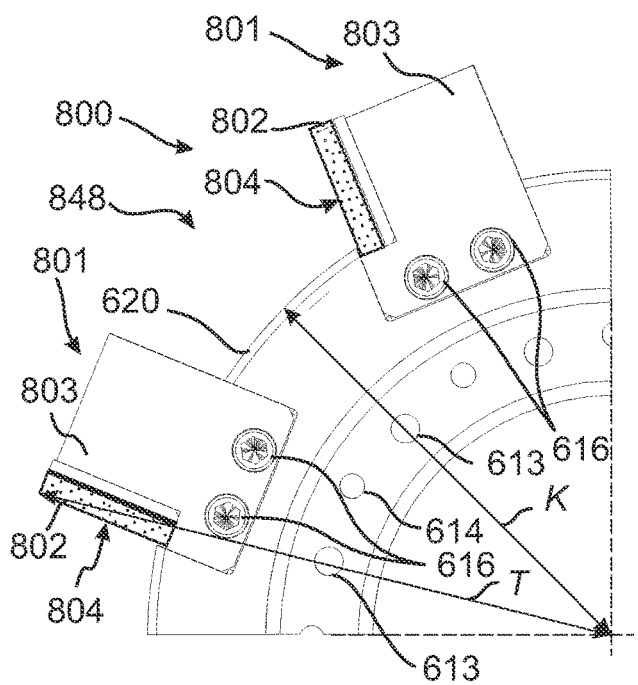
FIG. 16B is a side view of the part of a rotatable multi head scraper unit of FIG. 16A.
Figure 16C:
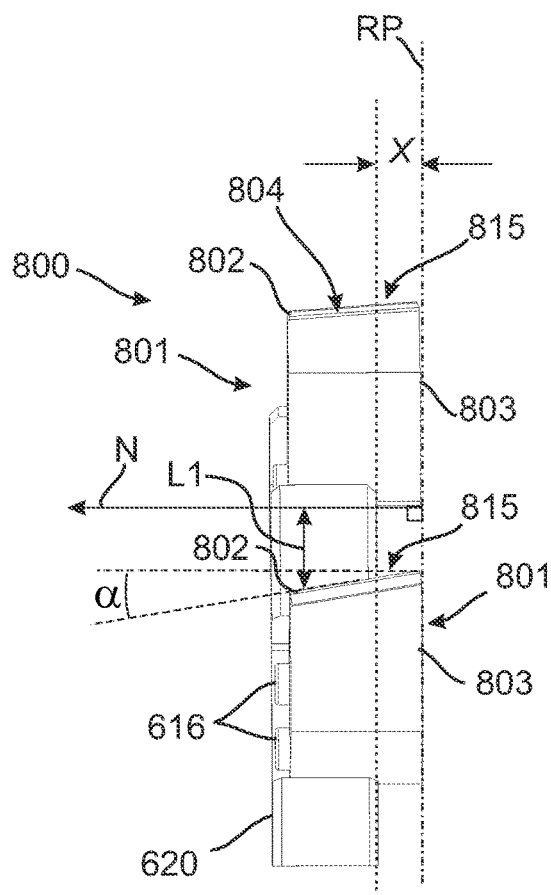
FIG. 16C is a top view of the part of a rotatable multi head scraper unit of FIG. 16A.

FIGS. 16A to 16C illustrate a scraper assembly 800 according to another example embodiment of the disclosure. The scraper assembly 800 is similar to already described scraper assembly 700 and will therefore only be briefly described herein. Like reference characters refer to like elements and have been earlier described herein. The main difference between the scraper assembly 800 and the scraper assembly 700 is that the scrapers 801 of the scraper assembly 800 are wider. This allows providing protrusions 815 having a considerably larger axial extension X. For the example embodiment of FIG. 16A to C, the axial extension X is 40 mm. To accommodate the wider form factor, both the scraper main body 803 and the scraper element 802 are larger than the scraper main body 703 and the scraper element 702 in FIGS. 15A to 15C. Similar to previous example embodiments, the periphery 848 as seen between a pair of adjacent scrapers 801 has a radial extension K being at least 20 mm smaller than a smallest radial distance T of the pair of adjacent scrapers 801 (see FIG. 16B). For the example embodiment, the radial distance T is the same for all eight scrapers 801, and thus the smallest radial distance will be the radial distance T defined in FIG. 16B. The advantage of the above feature is the generally the same as outlined for the first example embodiment in FIG. 4.

Figure 17A:
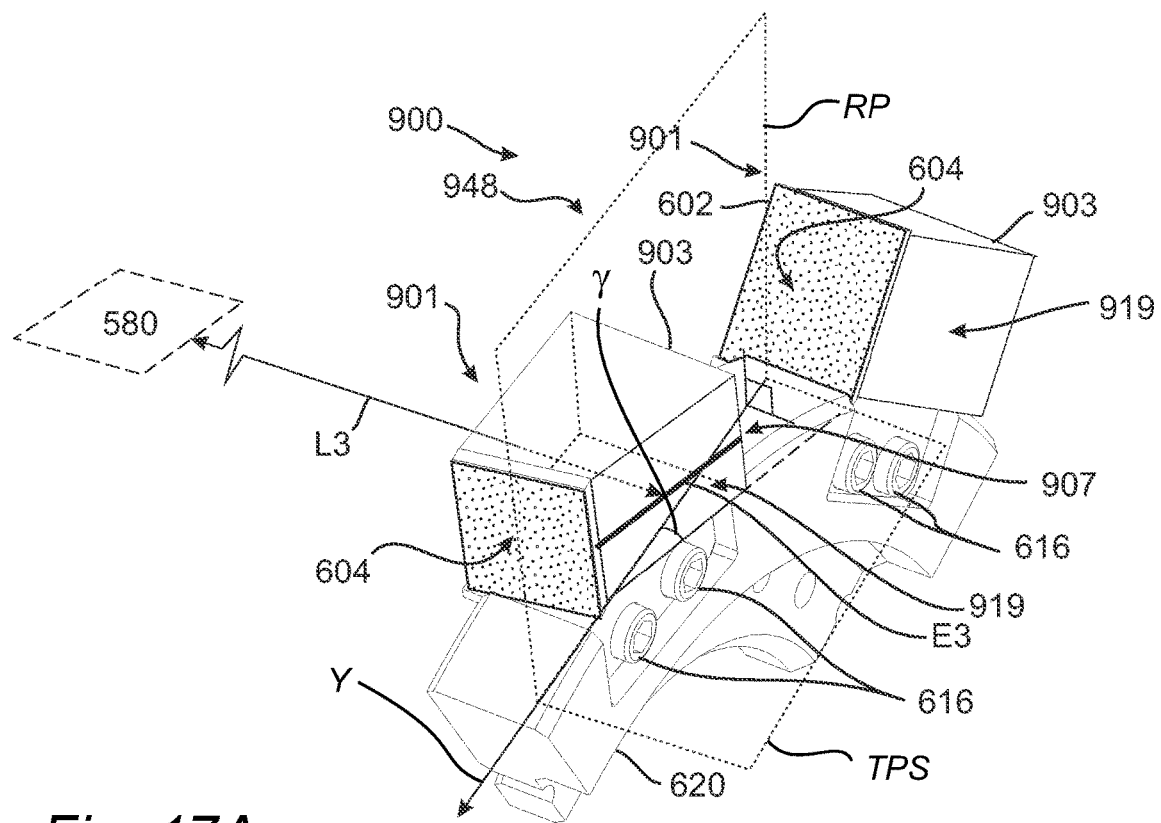
FIG. 17A is a perspective view of a part of a rotatable multi head scraper unit according to another embodiment of the disclosure.
Figures 17B, 17C:
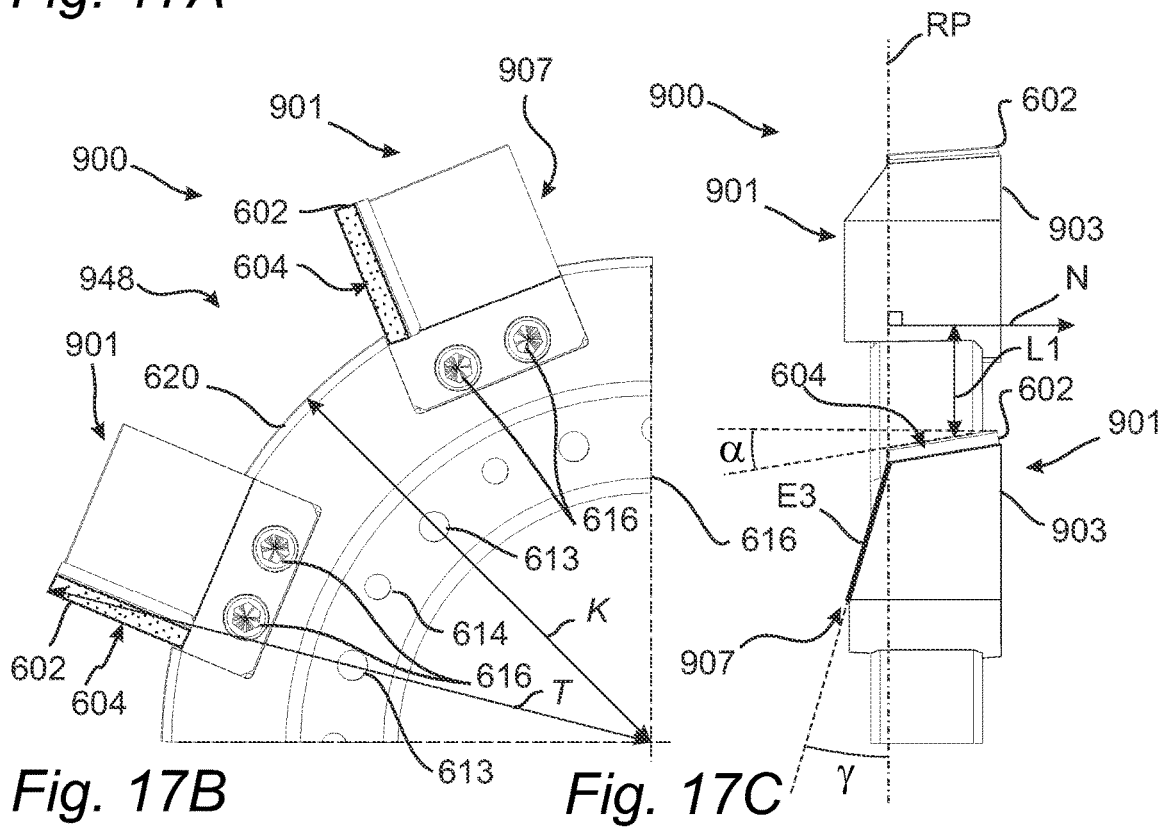
FIG. 17B is a side view of the part of a rotatable multi head scraper unit of FIG. 17A.
FIG. 17C is a top view of the part of a rotatable multi head scraper unit of FIG. 17A.

FIGS. 17A to 17C illustrate a scraper assembly 900 according to another example embodiment of the disclosure. The scraper assembly 900 is similar to already described scraper assembly 700 and will therefore only be briefly described herein. Like reference characters refer to like elements and have been earlier described herein. The scraper assembly 900 comprises scrapers 901 and already described scraper support structure 620. The scraper 901 differs from already described scrapers 701 in that the scraper 901 has a surface 919 which is angled with respect to the reference plane RF. The surface 919 is oriented such that, when the scraper assembly 900 is mounted onto the main support structure 509 and the scraper device is mounted on a roller crusher, the surface 919 will face away from the flange 36. Thus, as readily appreciated by the person skilled in the art, the surface 919 will also face away from the rotation actuator 580 (sec FIG. 12A). Thus, in other words, the scraper 901 has a surface 919 which faces away from the rotation actuator 580, which surface 919 has an extension E3 from its scraping element 602 tangentially towards a rear end 907 thereof, wherein the scraper 901 is structured and arranged such that a distance L3 between the surface 919 facing away from the rotation actuator 580 and the rotation actuator 580, decreases towards the scraping element 902 over at least a part of the extension E3. As readily appreciated by the person skilled in the art, a distance L3 defined between the surface 919 which faces away from the rotation actuator 580 and the rotation actuator 580 itself must inevitably be defined as going through the scraper 901 which presents said surface 919. In the context of defining the distance L3, the term "surface" should thus be construed as a mathematical or geometrical surface. This is clearly illustrated in FIG. 17A where the distance L3 is marked as a solid line outside of the scraper 901 and a dotted line inside the scraper 901.

For the example embodiment, the surface 919 which faces away from the rotation actuator 580 is substantially planar. Therefore, the varying distance L3 as described hereinabove may for the scraper 901 be further expressed in terms of an angle γ defined between the surface 919 which faces away from the rotation actuator 580 and the normal N of the reference plane RP, wherein the angle γ is defined within a tangential plane TPS of the scraper 901 which is orthogonal to the reference plane RP. The angle γ may be 1 to 45°, or 1 to 40°, or 1 to 30°, or 5 to 45°, or 5 to 25°, or 5 to 20°, or 5 to 15°, or 8 to 12°, or 10°. The angle γ, the reference plane RP and the tangential plane TPS of the scraper 901 are illustrated in FIGS. 17A and 17C. Similar to previous example embodiments, the periphery 948 as seen between a pair of adjacent scrapers 901 has a radial extension K being at least 20 mm smaller than a smallest radial distance T of the pair of adjacent scrapers 901 (see FIG. 17B). For the example embodiment, the radial distance T is the same for all eight scrapers 901, and thus the smallest radial distance will be the radial distance T defined in FIG. 17B. The advantage of the above feature is the generally the same as outlined for the first example embodiment in FIG. 4.

Figure 18C:
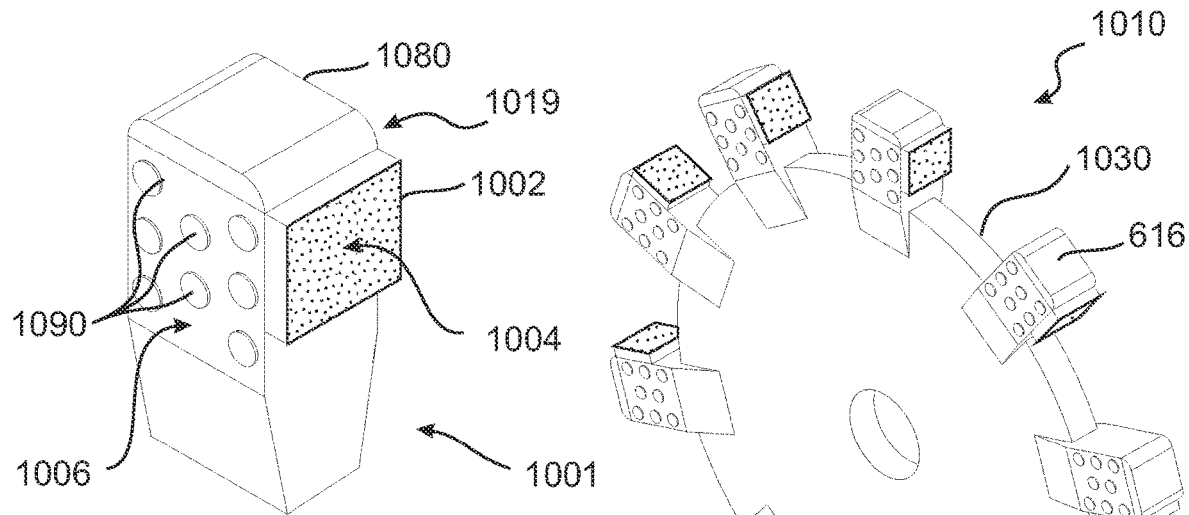
FIG. 18C is a perspective view of a scraper forming a part of the rotatable multi head scraper unit of FIGS. 18A and 18B.
Figure 18B:
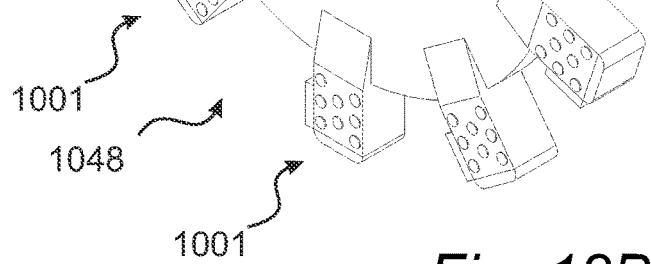
FIG. 18B is a perspective view of the rotatable multi head scraper unit of FIG. 18A.
Figure 18A:
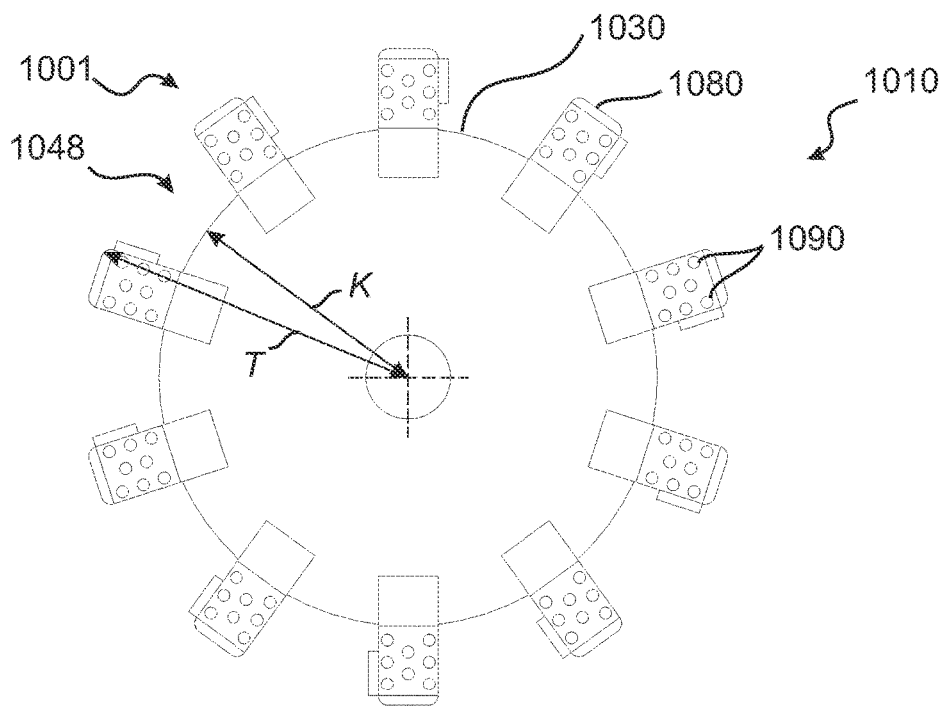
FIG. 18A is a side view of a rotatable multi head scraper unit according to another embodiment of the disclosure.

FIGS. 18A and 18B illustrate yet another example embodiment of the disclosure. In this case, the figures illustrate a rotatable multi head scraper unit 1010 which comprises a spider 1030 arranged to be mounted onto a shaft, such as the shaft 240, 540 of previously disclosed example embodiment of the scraper device. The rotatable multi head scraper unit 1010 differs from previously described embodiments in that it comprises scrapers 1001 which has a surface 1019 facing away from the rotation actuator 580 and a surface 1006 which faces the rotation actuator 580, and wherein at least one of the surface 1019 facing away from the rotation actuator and the surface 1006 facing the rotation actuator comprises ceramic inserts 1090. Arranging ceramic inserts on these surfaces 1006, 1019 will prolong the wear life of the scrapers 1001. Similar to previous example embodiments, the periphery 1048 as seen between a pair of adjacent scrapers 1001 has a radial extension K being at least 20 mm smaller than a smallest radial distance T of the pair of adjacent scrapers 1001 (see FIG. 18A). For the example embodiment, the radial distance T is the same for all ten scrapers 1001, and thus the smallest radial distance will be the radial distance T defined in FIG. 18B. The advantage of the above feature is the generally the same as outlined for the first example embodiment in FIG. 4.

Figure 19:
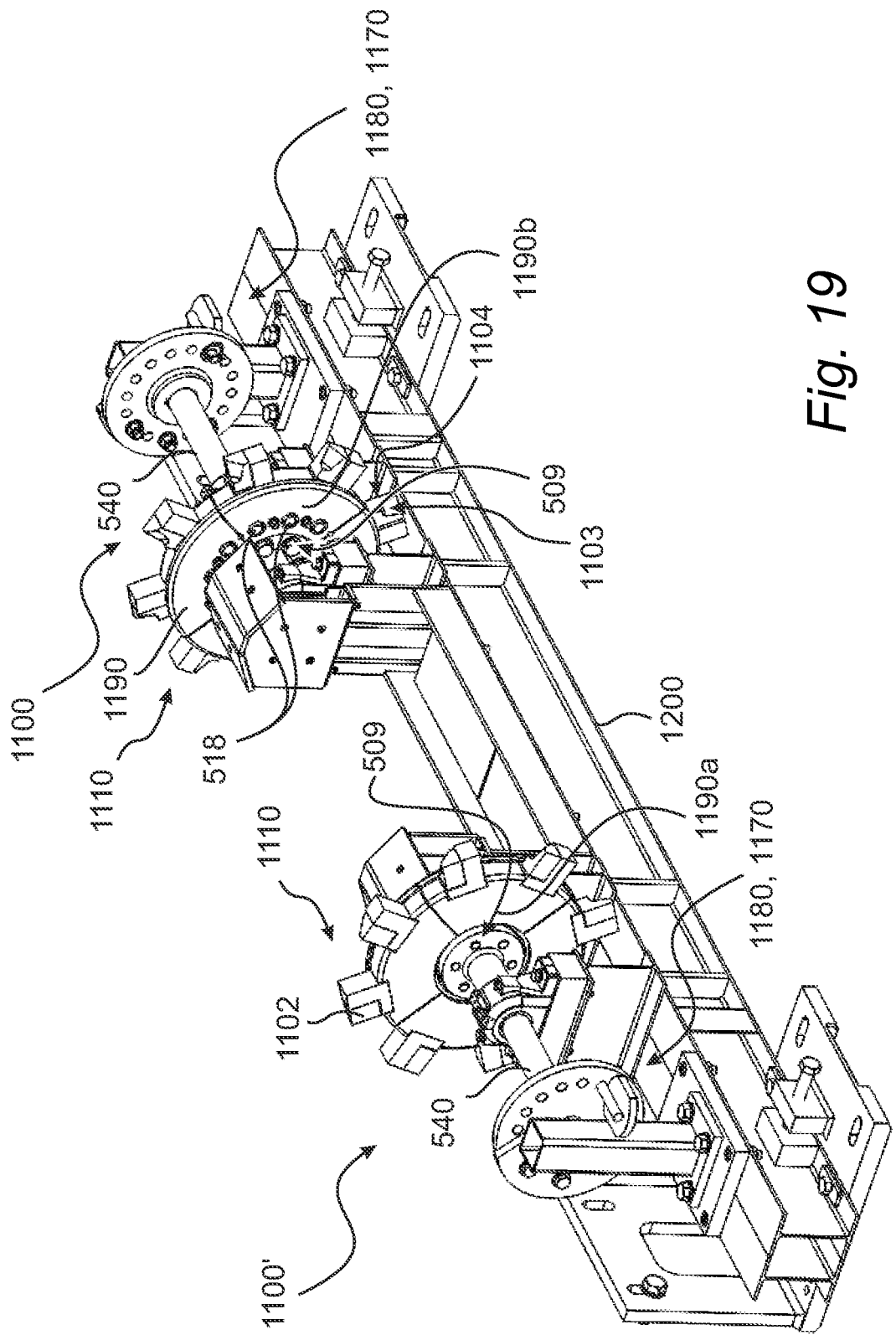
FIG. 19 is a perspective view of two scraper devices according to another example embodiment of the disclosure, situated on opposite sides of a frame of a roller crusher.

FIG. 19 illustrates a complete assembly of two scraper devices 1100, 1100' according to the disclosure when arranged on a frame 1200 of a roller crusher 1. The scraper devices 1000 and 1000' are nearly identical. The only difference between them is that the rotatable multi head scraper units 1110 are mounted in an opposite manner to the rotatable multi head scraper units 1110' to allow the scraping surfaces 1104 of the scrapers 1101 to face in the same direction in spite of the scraper devices 1000, 1000' being arranged in a mirrored manner.

Figure 20:
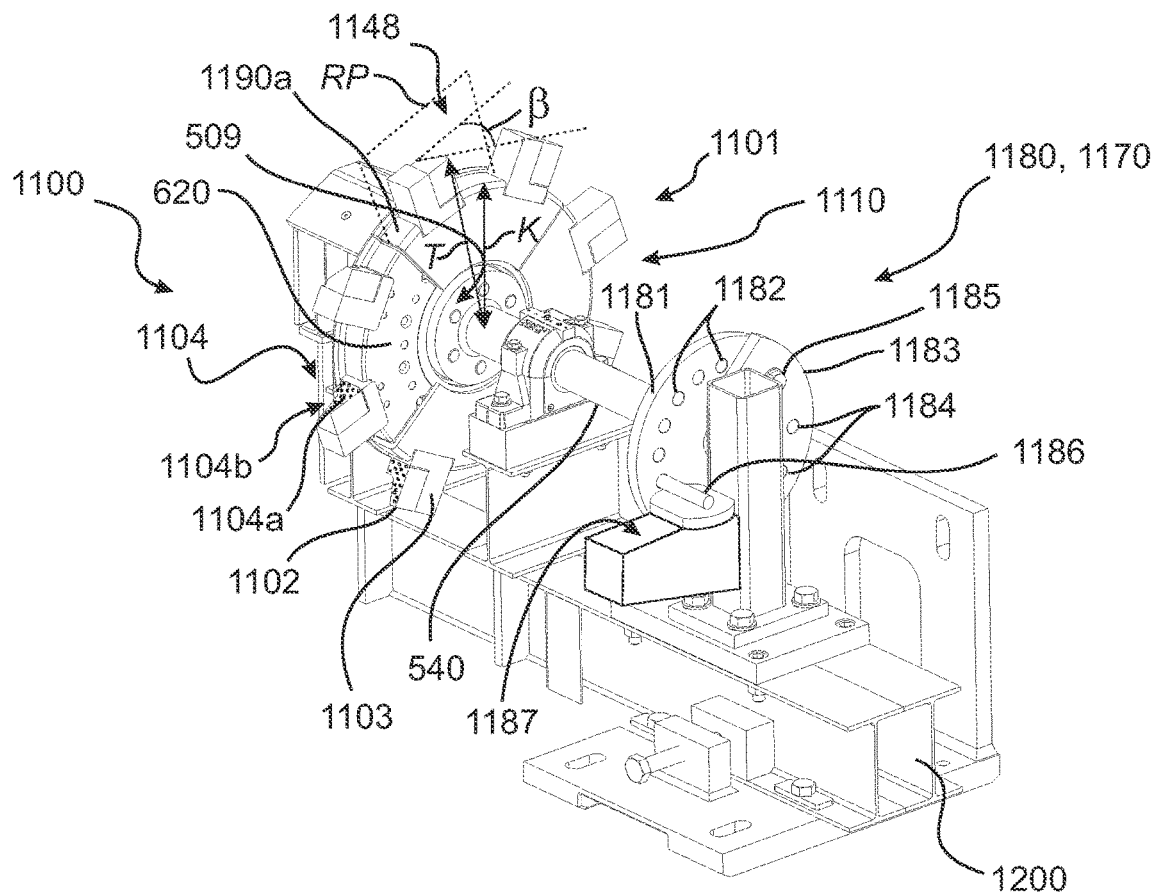
FIG. 20 is a perspective enlarged view of one of the scraper devices of FIG. 19.

FIG. 20 illustrates the scraper device 1100 in more detail. The rotatable multi head scraper unit 1110 comprises four scraper support structures 620 (same as described with reference to earlier example embodiments) each carrying two scrapers 1101, which means that the rotatable multi head scraper unit 1110 comprises eight scrapers 1101. The scraper support structures 620 are mounted on main support structure 509 which in turn is mounted onto shaft member 540 (see also FIG. 12C). The scraper support structures 620 are covered by wear shields 1190a, 1190b which will be further described later with reference to FIG. 21. In FIG. 20, one of the four wear shields 1190b have been removed to reveal the scraper support structures 620 on the inside. Similar to previous example embodiments, the periphery 1148 as seen between a pair of adjacent scrapers 1101 has a radial extension K being at least 20 mm smaller than a smallest radial distance T of the pair of adjacent scrapers 1101 (see FIG. 20). For the example embodiment, the radial distance T is the same for all eight scrapers 1101, and thus the smallest radial distance will be the radial distance T defined in FIG. 20. The advantage of the above feature is the generally the same as outlined for the first example embodiment in FIG. 4.

The scraping elements 1102 are different from previously disclosed embodiment in that they are thicker and present a scraping surface 1104 which has a front portion 1104a and a rear portion 1104b which interconnect each other. The front portion 1104a is arranged upstream of the rear portion 1104b such that the front portion 1104a will meet the material to be removed from the roller 3 first. When the scraper device 1100 is arranged on a roller crusher 1, the front portion 1104a will be arranged closer to the flange 36 than the rear portion 1104b. This may be advantageous as it allows creating very strong impact forces on localized regions of the material build-up on the roller 3 with the flange 36 by means of the front portion 1104a, thereby increasing the likelihood of breaking away larger portions of material. The rear portion 1104b may then step in and aid in further removing material from the roller 3 and/or conveying the already removed material away from the flange 36. The front portion 1104a may comprise polycrystalline diamond (PCD). The rear portion 1104b may also comprise polycrystalline diamond (PCD). As can be seen in FIG. 20, the rear portion 1104b is angled in relation to the front portion 1104a. Specifically, the rear portion 1104b is substantially planar and faces away from the rotation actuator 1180. The angle γ may therefore be defined between the surface 1104b which faces away from the rotation actuator 1180 and the reference plane RP as defined earlier (see also FIG. 20). The angle γ is for the example embodiment 45°.

As can be seen in FIG. 20, another difference between the scraper device 1100 and previously described example embodiments of the scraper device is that the rotation actuator 1180 and the braking arrangement 1170 are different. The rotation actuator 1180 is provided by means of a first structure 1181 having a first set of through-holes 1182 and a second structure 1183, having a second set of through-holes 1184. The first structure 1181 is connected to the rotatable multi-head scraper unit 1110 via shaft member 540 and the second structure 1183 is connected to the frame 1200 of the roller crusher 1. One or more bolts 1185 and a restrictor 1186 is also provided. The through-holes 1182 of the first structure 1181 are arranged such that they overlap with at least some of the through-holes 1184 of the second structure 1183 at predefined angular positions along a periphery of the first 1181 and second 1183 structures. The bolts 1185 and the restrictor 1186 may be received in at least some of the through-holes 1182, 1184 to define a particular angular position of the rotatable multi head scraper unit 1110 of the scraper device 1100. The rotation actuator 1180 is actuated by manually removing the bolts 1185 and the restrictor 1186 and manually rotating the first structure 1181 in relation to the second structure 1183 one or more angular positions until an unworn scraper 1101 enters into position to become the active scraper. The manual rotation may be achieved by means of a wrench tool (not shown) designed to fit into two or more of the through-holes 1182 of the first structure 1181. This process is facilitated in that the second structure 1183 has a smaller form factor than the first structure 1181, which allows easier access to the first structure 1181 with the wrench tool. To make it easier to find the angular position at which through-holes 1182, 1184 overlap, the retainer 1186 may be inserted in one of the through-holes 1182 of the first structure 1181. An abutment surface 11187 defined on the frame 1200 in such a manner that a correct overlap between the through-holes 1182, 1184 is reached when the retainer 1186 comes into abutment with the abutment surface 1201. After the correct angular position has been reached, the bolts 185 are inserted into one or more overlapping through-holes 1182, 1184 for securing the first structure 1181 to the second structure 1183, which marks the end of the actuation process. Alternatively, a hydraulic cylinder or any other suitable means may be used. The above-described approach is for example purposes only. The person skilled in the art are well aware of alternative approaches which may be used to achieve said manual rotation.

As readily appreciated by the person skilled in the art, the braking arrangement 1170 is for this example embodiment provided by the same structural features as the rotation actuator 1180. Specifically, the braking arrangement 1170 is for this example embodiment a locking arrangement 1170 which is configured to selectively lock the rotation of the rotatable multi head scraper unit 1110 during operation of the one of the at least two scrapers 1101. The locking arrangement 1170 is releasable and is provided by means of the first 1181 and second 1183 structures manually locking to each other by means of the bolts 1185. In other words, the locking arrangement 1170 is arranged to rotationally lock the first 1181 and second 1183 structures in relation to each other by inserting one or more bolts 1185 through overlapping associated ones of the first set of though-holes 1182 and the second set of though-holes 1184. Thus, the locking arrangement 1170 is releasable.

Figure 21:
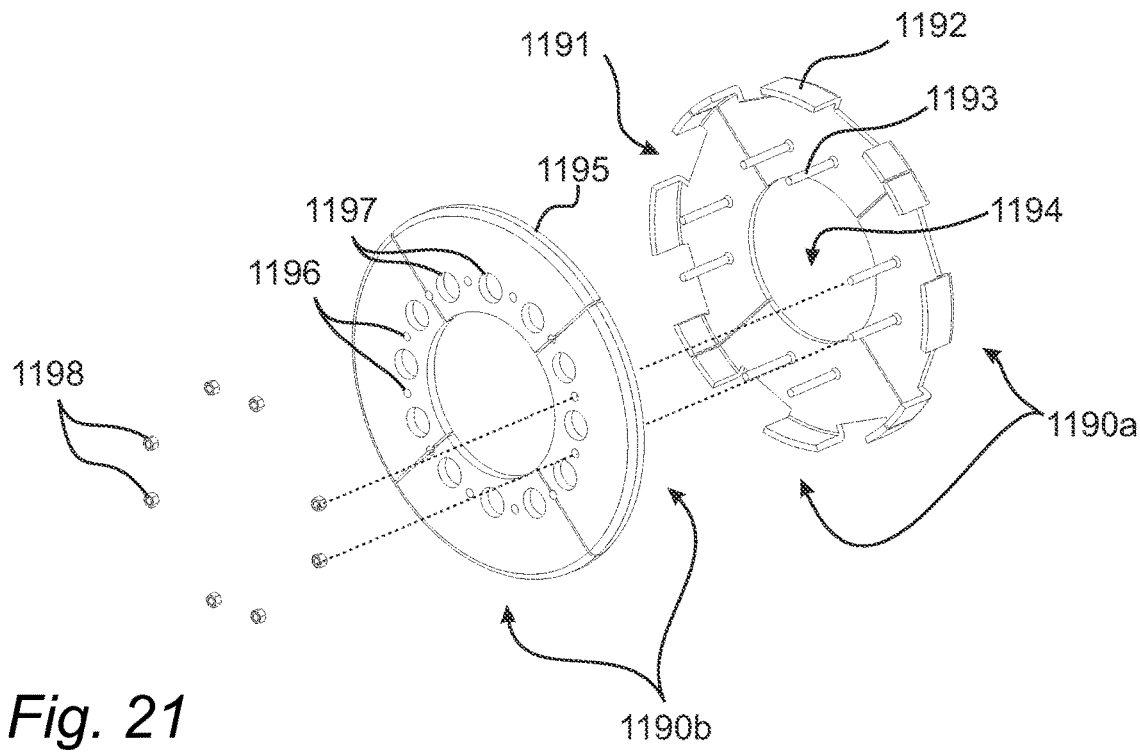
FIG. 21 is a perspective view of wear shields for a rotatable multi head scraper unit according to an example embodiment of the disclosure.

FIG. 21 illustrates the aforementioned wear shields 1190a, 1190b in isolation. The purpose of the wear shields 1190a, 1190b is to protect the rotatable multi head scraper unit 1110 from wear during use on a roller crusher 1. The wear shields 1190a, 1190b comprises a first set of wear shields 1190a and a second set of wear shields 1190b. Each of these sets includes two or more wear shields 1190a, 1190b. As for the scraper support structure 620, the wear shields 1190a, 1190b are shaped as circular ring sectors which together form circular rings, one on each side of the rotatable multi head scraper unit 1110. The wear shields of the first set of wear shields 1190a have openings 1191 mutually distributed along a periphery thereof. These openings 1191 are structures to allow the scrapers 1101 to protrude out through the wear shields 1190a, 1190b (see FIG. 20). Between each of these openings 1191 edge walls 1192 are provided. These edge walls 1192 may protrude both radially and axially as best illustrated in FIG. 21. The wear shields of the first set of wear shields 1190a may further have threaded rods 1193 protruding out from an inside facing surface. When assembled together, the first set of wear shields 1190a together define a central opening 1194 for allowing the shaft member 540 to pass through the first set of wear shields 1190a. The second set of wear shields 1190b has edge walls 1195 along a periphery thereof. These edge walls 1195 protrude axially. The wear shields 1190a, 1190b are designed such that, ones assembled on the rotatable multi head scraper unit 1110, the edge walls 1192 will meet the edge walls 1195 to form a continuous shield for protecting inner parts of the rotatable multi head scraper unit 1110 at the periphery thereof. The second set of wear shields 1190b further comprises through-holes 1196 which are aligned geometrically to allow receiving a respective one of the threaded rods 1193 of the first set of wear shields 160a-c. Finally, the second set of wear shields 1190b has access openings 1197 which are aligned such that they allow accessing the fastening bolts 118, as best illustrated in FIG. 19. The wear shields 1190a, 1190b are designed such that they are mountable onto the rotatable multi head scraper unit 1110 after the scrapers 1101 have been mounted thereon. This is achieved by inserting the threaded rods 1193 of a wear shield of the first set of wear shields 1190a into through openings 614 of the scraper support structure 620 (see e.g.

FIGS. 14A and 15B) and into through holes 519 of the main support structure 508 (see FIG. 12C). Each through opening 614 and a corresponding one of the through-holes 519 are positioned such that they coaxially align with each other, and with an associated one of the threaded rods 1193 of the first set of wear shields 1190a. Once every wear shield of the first set of wear shields 1190a has been inserted into place, the second set of wear shields 1190b are assembled from the other side of the main support structure 509 by allowing each of the threaded rods 1193 to penetrate through an associated through-hole 1196. Finally, fastening nuts 1198 are used to secure the first set of wear shields 1190a to the second set of wear shields 1190b.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed, from a study of the drawings, the disclosure, and the appended claims.

EMBODIMENTS

Embodiment 1. A scraper device for a roller crusher, comprising
a rotatable multi head scraper unit having at least two scrapers arranged tangentially about the rotatable multi head scraper unit at a respective radial distance from a rotational axis of the rotatable multi head scraper unit;
a rotation actuator arranged to selectively rotate the rotatable multi head scraper unit to allow operative use of one of the at least two scrapers at a time; and
at least one brake arrangement configured to prevent and/or restrict rotation of the rotatable multi head scraper unit during operation of the one of the at least two scrapers,
wherein each of the at least two scrapers comprises a scraping element having a scraping surface which scraping surface comprises a polycrystalline diamond (PCD) and wherein the rotatable multi head scraper unit is structured and arranged such that each scraping surface at least partly faces in a tangential direction defined at the scraper surface and directed along a reference rotational direction of the rotatable multi head scraper unit.

Embodiment 2. The scraper device as claimed in Embodiment 1, wherein the scraping element further comprises a wear resistant material in which the polycrystalline diamond (PCD) is at least partly embedded.

Embodiment 3. The scraper device as claimed in Embodiment 2, wherein the wear resistant material is one from the list of: a ceramic material, a metal ceramic composite material, and a metal matrix composite material.

Embodiment 4. The scraper device as claimed in any one of Embodiment 1 to 3, wherein the rotatable multi head scraper unit is arranged at a first end of the scraper device, and the rotation actuator is arranged at a second, opposite, end of the scraper device, and wherein the rotatable multi head scraper unit extends in a reference plane which is orthogonal to the rotational axis.

Embodiment 5. The scraper device as claimed in Embodiment 4, wherein each of the at least two scrapers has a surface facing the rotation actuator, which surface comprises a polycrystalline diamond (PCD).

Embodiment 6. The scraper device as claimed in Embodiment 4 or 5, wherein each scraping surface of the at least two scrapers is arranged to incline in a relation to a normal of the reference plane, as defined in front of the scraping surface, and incline such that a distance between the normal and the scraping surface decreases towards the rotation actuator.

Embodiment 7. The scraper device as claimed in any one of Embodiment 4 to 6, wherein each of the at least two scrapers has a surface facing away from the rotation actuator, which surface has an extension from its scraping element tangentially towards a rear end thereof, wherein the scraper is structured and arranged such that a distance between the surface facing away from the rotation actuator and the rotation actuator decreases towards the scraping element over at least a part of the extension.

Embodiment 8. The scraper device as claimed in any one of Embodiment 4 to 7, wherein each of the at least two scrapers has a surface facing the rotation actuator, which surface has an extension from the scraping element tangentially towards a rear end thereof, wherein the scraper is structured and arranged such that a distance between the surface facing the rotation actuator and the rotation actuator decreases towards the scraping element over at least a part of the extension.

Embodiment 9. The scraper device as claimed in any one of Embodiment 1 to 8, wherein the at least two scrapers are arranged to form axial protrusions on one or both sides of the rotatable multi head scraper unit.

Embodiment 10. The scraper device as claimed in Embodiment 9, wherein the axial protrusions have axial extensions within the range up to 75 mm, or 5 to 50 mm, or 10 to 40 mm.

Embodiment 11. The scraper device as claimed in any one of Embodiment 4 to 10, wherein each scraper of the at least two scrapers extends in the reference plane along a scraper axis towards the scraping element, and wherein the scraper axis forms a first acute angle along a reference rotational direction with a radial axis of the rotatable multi head scraper unit which radial axis intersects with the scraping element.

Embodiment 12. The scraper device as claimed in Embodiment 11, wherein each scraping surface of the at least two scrapers extends in a plane which has a normal which forms an acute angle along the reference direction with the scraper axis.

Embodiment 13. The scraper device as claimed in Embodiment 4, wherein each of the at least two scrapers has a surface facing away from the rotation actuator and a surface facing the rotation actuator, and wherein at least one of the surface facing away from the rotation actuator and the surface facing the rotation actuator comprises ceramic inserts.

Embodiment 14. A scraper device according to any one of Embodiment 1 to 12, wherein the rotatable multi head scraper unit has an annular engagement portion and wherein each scraper of the at least two scrapers is releasably arranged to the annular engagement portion.

Embodiment 15. A scraper device according to Embodiment 14, wherein the rotatable multi head scraper unit further comprises a main support structure and at least two scraper support structures, wherein the at least two scraper support structures are releasably arranged with respect to the main support structure and shaped as circular ring sectors which together form a circular ring, and which circular ring presents the annular engagement portion.

Embodiment 16. A scraper device according to Embodiment 14 or 15, wherein each scraper of the at least two scrapers is releasably arranged in the annular engagement portion by a geometrical locking engagement.

Embodiment 17. A scraper device according to Embodiment 16, wherein the geometrical locking engagement is at least partly defined by a protruding structure of the scraper being inserted into an associated recess of the annular engagement portion, wherein the protruding structure and the associated recess has complementary shapes.

Embodiment 18. A scraper device according to Embodiment 17, wherein the associated recess of the annular engagement portion is defined on a side surface thereof.

Embodiment 19. A scraper device according to Embodiment 17 or 18, wherein each scraper of the at least two scrapers comprises a scraper main body, and wherein the protruding structure forms a part of the scraper main body.

Embodiment 20. A scraper device according to any one of Embodiment 1 to 19, further comprising wear shields structured and arranged to protect at least parts of the rotatable multi head scraper unit.

Embodiment 21. The scraper device according to any one of Embodiment 1 to 20, wherein the rotatable multi head scraper unit is releasably arranged in the scraper device, to allow exchange of the rotatable multi head scraper unit.

Embodiment 22. The scraper device according to any one of Embodiment 1 to 21, wherein the at least one brake arrangement comprises a locking arrangement configured to selectively lock the rotation of the rotatable multi head scraper unit during operation of the one of the at least two scrapers.

Embodiment 23. The scraper device according to any one of Embodiment 1 to 22, wherein the scraper device has rotary indexing capability for selectively rotating the rotatable multi head scraper unit between predefined angular positions.

Embodiment 24. The scraper device according to any one of Embodiment 1 to 23, wherein a periphery of the rotatable multi head scraper unit, as seen between a pair of adjacent scrapers of the two or more scrapers, has a radial extension being at least 20 mm smaller than a smallest radial distance of the pair of adjacent scrapers.

Embodiment 25. A roller crusher having two generally parallel rollers arranged to rotate in opposite directions, and separated by a gap, each roller having two ends, the roller crusher comprising:
a flange attached to one of the ends of one of the rollers, the flange extending in a radial direction of the roller, and the flange having an extension (E) past an envelope surface of the roller,
wherein the roller crusher further comprises a scraper device according to any one of Embodiment 1 to 24, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller to thereby at least partially allow removal of material accumulated on the flange and/or on the envelope surface at an end portion of the roller adjacent the flange.

Embodiment 26. The roller crusher according to Embodiment 25, wherein the roller crusher comprises two flanges attached to opposite ends of one of the rollers, and wherein a respective scraper device according to claim 1 is arranged at each end of the roller with the flanges.

Embodiment 27. A method for operating a roller crusher for grinding granular material, wherein the roller crusher has two generally parallel rollers arranged to rotate in opposite directions, and separated by a gap, each roller having two ends, the roller crusher comprising:
a flange attached to one of the ends of one of the rollers, the flange extending in a radial direction of the roller, and the flange having an extension (E) past an envelope surface of the roller,
wherein the roller crusher further comprises a scraper device according to any one of Embodiment 1 to 25, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of:
at least partially removing material accumulated on the flange and/or on the envelope surface at an end portion of the roller adjacent the flange by means of the one of the at least two scrapers.

The invention claimed is:

1. A roller crusher having two generally parallel rollers arranged to rotate in opposite directions, and separated by a gap, each roller having two ends, the roller crusher comprising:
a flange attached to one of the ends of one of the rollers, the flange extending in a radial direction of the roller, and the flange having an extension (E) past an envelope surface of the roller; and
a scraper device comprising:
a rotatable multi head scraper unit having at least two scrapers arranged tangentially about the rotatable multi head scraper unit at a respective radial distance from a rotational axis of the rotatable multi head scraper unit;
a rotation actuator arranged to selectively rotate the rotatable multi head scraper unit to allow operative use of one of the at least two scrapers at a time; and
at least one brake arrangement configured to prevent and/or restrict rotation of the rotatable multi head scraper unit during operation of the one of the at least two scrapers,
wherein each of the at least two scrapers comprises a scraping element having a scraping surface which scraping surface comprises a polycrystalline diamond (PCD) and wherein the rotatable multi head scraper unit is structured and arranged such that each scraping surface at least partly faces in a tangential direction defined at the scraper surface and directed along a reference rotational direction of the rotatable multi head scraper unit,
wherein the rotatable multi head scraper unit is arranged such that one of the at least two scrapers, by the rotation actuator, is selectively positionable at the end of the roller having the flange, and, by the at least one brake arrangement, is prevented and/or restricted to move relative to the roller to thereby at least partially allow removal of material accumulated on the flange and/or on the envelope surface at an end portion of the roller adjacent the flange.

2. The roller crusher as claimed in claim 1, wherein the scraping element further comprises a wear resistant material in which the polycrystalline diamond (PCD) is at least partly embedded.

3. The roller crusher as claimed in claim 2, wherein the wear resistant material is one from the list of: a ceramic material, a metal ceramic composite material, and a metal matrix composite material.

4. The roller crusher as claimed in claim 1, wherein the rotatable multi head scraper unit is arranged at a first end of the scraper device, and the rotation actuator is arranged at a second, opposite, end of the scraper device, and wherein the rotatable multi head scraper unit extends in a reference plane which is orthogonal to the rotational axis.

5. The roller crusher as claimed in claim 4, wherein each of the at least two scrapers has a surface facing the rotation actuator, which surface comprises a polycrystalline diamond (PCD).

6. The roller crusher as claimed in claim 4, wherein each scraping surface of the at least two scrapers is arranged to incline in a relation to a normal of the reference plane, as defined in front of the scraping surface, and incline such that a distance between the normal and the scraping surface decreases towards the rotation actuator.

7. The roller crusher as claimed in claim 4, wherein each of the at least two scrapers has a surface facing away from the rotation actuator, which surface has an extension from its scraping element tangentially towards a rear end thereof, wherein the scraper is structured and arranged such that a distance between the surface facing away from the rotation actuator and the rotation actuator decreases towards the scraping element over at least a part of the extension.

8. The roller crusher as claimed in claim 4, wherein each of the at least two scrapers has a surface facing the rotation actuator, which surface has an extension from the scraping element tangentially towards a rear end thereof, wherein the scraper is structured and arranged such that a distance between the surface facing the rotation actuator and the rotation actuator decreases towards the scraping element over at least a part of the extension.

9. The roller crusher as claimed in claim 1, wherein the at least two scrapers are arranged to form axial protrusions on one or both sides of the rotatable multi head scraper unit.

10. The roller crusher as claimed in claim 9, wherein the axial protrusions have axial extensions within a range up to 75 mm.

11. The roller crusher as claimed in claim 4, wherein each scraper of the at least two scrapers extends in the reference plane along a scraper axis towards the scraping element, and wherein the scraper axis forms a first acute angle along a reference rotational direction with a radial axis of the rotatable multi head scraper unit which radial axis intersects with the scraping element.

12. The roller crusher as claimed in claim 11, wherein each scraping surface of the at least two scrapers extends in a plane which has a normal which forms an acute angle along the reference direction with the scraper axis.

13. The roller crusher as claimed in claim 4, wherein each of the at least two scrapers has a surface facing away from the rotation actuator and a surface facing the rotation actuator, and wherein at least one of the surface facing away from the rotation actuator and the surface facing the rotation actuator comprises ceramic inserts.

14. The roller crusher according to claim 1, wherein the rotatable multi head scraper unit has an annular engagement portion and wherein each scraper of the at least two scrapers is releasably arranged to the annular engagement portion.

15. The roller crusher according to claim 14, wherein the rotatable multi head scraper unit further comprises a main support structure and at least two scraper support structures, wherein the at least two scraper support structures are releasably arranged with respect to the main support structure and shaped as circular ring sectors which together form a circular ring, and which circular ring presents the annular engagement portion.

16. The roller crusher according to claim 14, wherein each scraper of the at least two scrapers is releasably arranged in the annular engagement portion by a geometrical locking engagement.

17. The roller crusher according to claim 16, wherein the geometrical locking engagement is at least partly defined by a protruding structure of the scraper being inserted into an associated recess of the annular engagement portion, wherein the protruding structure and the associated recess has complementary shapes.

18. The roller crusher according to claim 17, wherein the associated recess of the annular engagement portion is defined on a side surface thereof.

19. The roller crusher according to claim 17, wherein each scraper of the at least two scrapers comprises a scraper main body, and wherein the protruding structure forms a part of the scraper main body.

20. The roller crusher according to claim 1, further comprising wear shields structured and arranged to protect at least parts of the rotatable multi head scraper unit.

21. The roller crusher according to claim 1, wherein the rotatable multi head scraper unit is releasably arranged in the scraper device, to allow exchange of the rotatable multi head scraper unit.

22. The roller crusher according to claim 1, wherein the at least one brake arrangement comprises a locking arrangement configured to selectively lock the rotation of the rotatable multi head scraper unit during operation of the one of the at least two scrapers.

23. The roller crusher according to claim 1, wherein the scraper device has rotary indexing capability for selectively rotating the rotatable multi head scraper unit between predefined angular positions.

24. The roller crusher according to claim 1, wherein a periphery of the rotatable multi head scraper unit, as seen between a pair of adjacent scrapers of the two or more scrapers, has a radial extension being at least 20 mm smaller than a smallest radial distance of the pair of adjacent scrapers.

25. The roller crusher according to claim 1, wherein the roller crusher comprises two flanges attached to opposite ends of one of the rollers, and wherein a respective scraper device according to claim 1 is arranged at each end of the roller with the flanges.

26. A method for operating a roller crusher for grinding granular material, wherein the roller crusher has two generally parallel rollers arranged to rotate in opposite directions, and separated by a gap, each roller having two ends, the roller crusher comprising:
a flange attached to one of the ends of one of the rollers, the flange extending in a radial direction of the roller, and the flange having an extension (E) past an envelope surface of the roller,
wherein the roller crusher further comprises a scraper device comprising:
a rotatable multi head scraper unit having at least two scrapers arranged tangentially about the rotatable multi head scraper unit at a respective radial distance from a rotational axis of the rotatable multi head scraper unit;
a rotation actuator arranged to selectively rotate the rotatable multi head scraper unit to allow operative use of one of the at least two scrapers at a time; and
at least one brake arrangement configured to prevent and/or restrict rotation of the rotatable multi head scraper unit during operation of the one of the at least two scrapers, wherein each of the at least two scrapers comprises a scraping element having a scraping surface which scraping surface comprises a polycrystalline diamond (PCD) and wherein the rotatable multi head scraper unit is structured and arranged such that each scraping surface at least partly faces in a tangential direction defined at the scraper surface and directed along a reference rotational direction of the rotatable multi head scraper unit, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of:

at least partially removing material accumulated on the flange and/or on the envelope surface at an end portion of the roller adjacent the flange by means of the one of the at least two scrapers.

* * * * *